United States Patent
Furuichi

(10) Patent No.: US 12,219,363 B2
(45) Date of Patent: Feb. 4, 2025

(54) INFORMATION PROCESSING APPARATUS, INFORMATION PROCESSING METHOD, AND INFORMATION PROCESSING TERMINAL APPARATUS

(71) Applicant: Sony Group Corporation, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 627 days.

(21) Appl. No.: 17/414,327

(22) PCT Filed: Dec. 20, 2019

(86) PCT No.: PCT/JP2019/050209
§ 371 (c)(1),
(2) Date: Jun. 16, 2021

(87) PCT Pub. No.: WO2020/137922
PCT Pub. Date: Jul. 2, 2020

(65) Prior Publication Data
US 2022/0070677 A1    Mar. 3, 2022

(30) Foreign Application Priority Data
Dec. 27, 2018   (JP) ................. 2018-246308

(51) Int. Cl.
*H04W 16/02*    (2009.01)
*H04W 16/14*    (2009.01)
(Continued)

(52) U.S. Cl.
CPC .......... *H04W 16/02* (2013.01); *H04W 16/14* (2013.01); *H04W 28/20* (2013.01); *H04W 28/24* (2013.01);
(Continued)

(58) Field of Classification Search
CPC ..... H04W 16/02; H04W 16/14; H04W 28/20; H04W 28/24; H04W 72/0453; H04W 72/566; H04W 88/12
See application file for complete search history.

(56) References Cited

U.S. PATENT DOCUMENTS

2010/0105332 A1\* 4/2010 McHenry .............. H04W 16/14
                                                                        455/62
2015/0080010 A1    3/2015 Wei
(Continued)

FOREIGN PATENT DOCUMENTS

EP    2 608 592 A1    6/2013
EP    2 757 821 A1    7/2014
(Continued)

OTHER PUBLICATIONS

International Search Report and Written Opinion mailed on Mar. 3, 2020, received for PCT Application PCT/JP2019/050209, Filed on Dec. 20, 2019, 8 pages including English Translation.
(Continued)

*Primary Examiner* — Dinh Nguyen
(74) *Attorney, Agent, or Firm* — XSENSUS LLP

(57) ABSTRACT

An information processing apparatus includes: a first acquiring section that acquires identification information and information related to a region, the identification information being for identifying a type of information related to secondary use of a frequency band used by a first wireless system; a second acquiring section that acquires information accumulated in association with control related to secondary use of the frequency band by one or more second wireless systems that make secondary use of the frequency band; a generator that generates information related to secondary use of the frequency band on the basis of information acquired by the first acquiring section and the second
(Continued)

acquiring section; and a notifying section that reports the information related to the secondary use generated by the generator.

16 Claims, 28 Drawing Sheets

(51) Int. Cl.
    *H04W 28/20*     (2009.01)
    *H04W 28/24*     (2009.01)
    *H04W 72/0453*     (2023.01)
    *H04W 72/566*     (2023.01)

(52) U.S. Cl.
    CPC ..... *H04W 72/0453* (2013.01); *H04W 72/566* (2023.01)

(56) References Cited

U.S. PATENT DOCUMENTS

| | | | |
|---|---|---|---|
| 2016/0056908 A1* | 2/2016 | Sun | H04W 72/0453 370/329 |
| 2021/0227567 A1* | 7/2021 | Zhu | H04W 72/23 |

FOREIGN PATENT DOCUMENTS

| | | | | |
|---|---|---|---|---|
| JP | 2009-200773 A | 9/2009 | | |
| JP | 2016-213672 A | 12/2016 | | |
| WO | 2013/021596 A1 | 2/2013 | | |
| WO | 2013/161280 A1 | 10/2013 | | |
| WO | WO-2015180106 A1 * | 12/2015 | ............ | H04W 24/10 |

OTHER PUBLICATIONS

Wireless Innovation Forum, "Requirements for Commercial Operation in the U.S. 3550-3700 MHz Citizens Broadband Radio Service Band", Working Document WINNF-TS-0112, Version V1.4.1, Jan. 16, 2018, pp. 1-72.
Wireless Innovation Forum, "Signaling Protocols and Procedures for Citizens Broadband Radio Service (CBRS): Spectrum Access System (SAS)—SAS Interface Technical Specification", Document WINNF-TS-0096, Version 1.2.0, Oct. 20, 2017, pp. 1-36.
Wireless Innovation Forum, "Signaling Protocols and Procedures for Citizens Broadband Radio Service (CBRS): Spectrum Access System (SAS)—Citizens Broadband Radio Service Device (CBSD), Interface Technical Specification", Document WINNF-TS-0016, Version V1.2.1, Jan. 3, 2018, pp. 1-52.
Wireless Innovation Forum, "CBRS Certified Professional Installer Accreditation Technical Specification", Document WINNF-TS-0247, Version V1.0.0, Oct. 16, 2017, pp. 1-14.
"White Space Database Provider (WSDB) Contract", Available Online At: https://www.ofcom.org.uk/_data/assetspdf_file/0026/84077/white_space_database_contract_for_operational_use_of_wsd, 2015, pp. 1-125.
Wireless Innovation Forum, "Operations for Citizens Broadband Radio Service (CBRS): Priority Access License (PAL) Database Technical Specification", Document WINNF-TS-0245, Version V1.0. 0, Jul. 26, 2017, pp. 1-7.
CEPT ECC, "Technical and Operational Requirements for the Operation of White Space Devices under Geo-Location Approach", ECC Report 186, Jan. 2013, pp. 1-181.
"Citizens Broadband Radio Service", Electronic Code of Federal Regulations, 47 C.F.R Part 96. Available Online At: https://www.ecfr.gov/cgi-bin/text-idx?node=pt47.5.96#se47.5.96, Sep. 26, 2019, 13 pages.
IEEE, "Coexistence Methods for Geo-Location Capable Devices Operating under General Authorization", IEEE Computer Society, Std 802.19.1a™, Sep. 28, 2017, pp. 1-293.

* cited by examiner

INFORMATION PROCESSING APPARATUS, INFORMATION PROCESSING METHOD, AND INFORMATION PROCESSING TERMINAL APPARATUS

CROSS-REFERENCE TO RELATED APPLICATIONS

The present application is based on PCT filing PCT/JP2019/050209, filed Dec. 20, 2019, which claims priority to JP 2018-246308, filed Dec. 27, 2018, the entire contents of each are incorporated herein by reference.

TECHNICAL FIELD

The present disclosure relates to an information processing apparatus, an information processing method, and an information processing terminal apparatus.

BACKGROUND ART

An issue of depletion of radio wave resources (radio resources) allocable to wireless systems (wireless apparatuses) has emerged. It is difficult to newly allocate radio wave resources to wireless systems because all radio wave bands are already used by existing wireless systems (wireless apparatuses). Hence, more effective use of radio wave resources by utilization of a cognitive radio technology has begun to attract attention in recent years. The cognitive radio technology uses temporal and spatial free radio waves (White Space) of the existing wireless systems to secure radio wave resources.

CITATION LIST

Patent Literature

PTL 1: Japanese Unexamined Patent Application Publication No. 2016-213672

Non-Patent Literature

NPTL 1: WINNF-TS-0247-V1.0.0 CBRS Certified Professional Installer Accreditation Technical Specification.
NPTL 2: WINNF-TS-0016-V1.2.1 Signaling Protocols and Procedures for Citizens Broadband Radio Service (CBRS): Spectrum Access System (SAS)—Citizens Broadband Radio Service Device (CBSD) Interface Technical Specification
NPTL 3: ECC Report 186, Technical and operational requirements for the operation of white space devices under geo-location approach, CEPT ECC, 2013 January
NPTL 4: White Space Database Provider (WSDB) Contract, available at https://www.ofcom.org.uk/_data/assets/pdf_file/0026/84077/white_space_database_contract_for_operational_use_of_wsds.pdf
NPTL 5: WINNF-TS-0096-V1.2.0 Signaling Protocols and Procedures for Citizens Broadband Radio Service (CBRS): Spectrum Access System (SAS)—SAS Interface Technical Specification
NPTL 6: WINNF-TS-0112-V1.4.1 Requirements for Commercial Operation in the U.S. 3550-3700 MHz Citizens Broadband Radio Service Band
NPTL 7: IEEE Std 802.19.1aTM-2017 "Coexistence Methods for Geo-location Capable Devices Operating under General Authorization"
NPTL 8: 47 C.F.R Part 96 Citizens Broadband Radio Service, https://www.ecfr.gov/cgi-bin/text-idx?node=pt47.5.96#se47.5.96
NPTL 9: WINNF-TS-0245-V1.0.0 Operations for Citizens Broadband Radio Service (CBRS): Priority Access License (PAL) Database Technical Specification

SUMMARY OF THE INVENTION

Problems to be Solved by the Invention

However, simply using free radio waves does not necessarily enable effective use of radio wave resources. For example, to achieve effective use of radio wave resources, it is desirable to allow many people who take consideration or the like of use of free radio waves (e.g., people who are planning to newly install base stations) to know how free radio waves are used at present. However, it is not easy to allow many other people to know use situations of free radio waves while various subjects having different intentions use free radio waves.

Hence, the present disclosure proposes an information processing apparatus, an information processing method, and an information processing terminal apparatus that enable efficient use of radio wave resources.

Means for Solving the Problems

To solve the above issue, an information processing apparatus according to one embodiment of the present disclosure includes: a first acquiring section that acquires identification information and information related to a region, the identification information being for identifying a type of information related to secondary use of a frequency band used by a first wireless system; a second acquiring section that acquires information accumulated in association with control related to secondary use of the frequency band by one or more second wireless systems that make secondary use of the frequency band; a generator that generates information related to secondary use of the frequency band on the basis of information acquired by the first acquiring section and the second acquiring section; and a notifying section that reports the information related to the secondary use generated by the generator.

MODES FOR CARRYING OUT THE INVENTION

Figure 1:
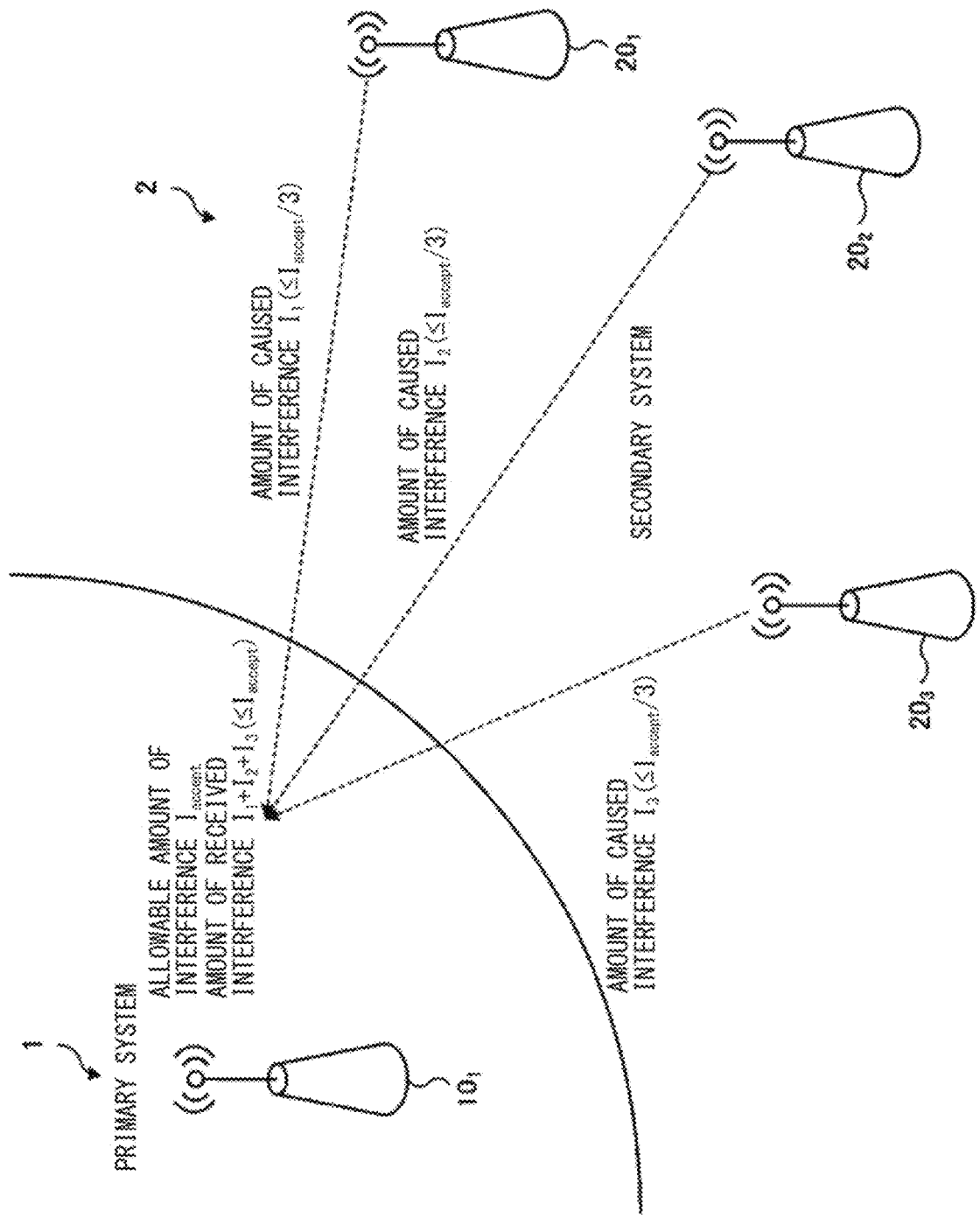
FIG. 1 is an explanatory diagram illustrating a distribution example of an interference margin to communication apparatuses constituting a secondary system.

Hereinafter, embodiments of the present disclosure are described in detail with reference to the accompanying drawings. It is to be noted that, in the following embodiments, repeated description is omitted for the same components by assigning the same reference signs.

Further, in the present specification and drawings, a plurality of components having substantially the same functional configuration are distinguished by adding different numbers to the end of the same reference sign in some cases. For example, a plurality of components having substantially the same functional configuration are distinguished as necessary, like communication control apparatuses $40_1$ and $40_2$. It is to be noted that only the same reference sign is assigned to a plurality of components having substantially the same functional configuration in a case where there is no particular need to distinguish them. For example, in a case where there is no particular need to distinguish the communication control apparatuses $40_1$ and $40_2$, they are simply referred to as communication control apparatuses 40.

Further, the present disclosure will be described in the following order of items.

1. Introduction
   1-1. Control of Wireless System for Achievement of Frequency Sharing
   1-2. Overview of Present Embodiment
   1-3. Terms Related to Frequency and Sharing
2. Configuration of Communication System
   2-1. Overall Configuration of Communication System
   2-2. Configuration of Base Station Apparatus
   2-3. Configuration of Terminal Apparatus
   2-4. Configuration of Communication Control Apparatus
   2-5. Configuration of Proxy Apparatus
   2-6. Configuration of Server Apparatus
   2-7. Configuration of External Apparatus
3. Interference Model
4. Primary System Protection Method
   4-1. Interference Margin Simultaneous Distribution Type
   4-2. Interference Margin Sequential Distribution Type
5. Description of Procedures
   5-1. Registration Procedure
   5-2. Available-Frequency Information Query Procedure
   5-3. Frequency Utilization Permission Procedure
   5-4. Frequency Utilization Notification
   5-5. Supplement to Procedures
   5-6. Procedures Related to Terminal Apparatus
   5-7. Procedure Occurring Between Communication Control Apparatuses
6. Discovery-related Operation
   6-1. Assumed Scenario
   6-2. Information Processing Apparatus
   6-3. Discovery Procedure
   6-4. Available-Frequency Information
   6-5. Maximum Allowable Transmission Power Range at Available Frequency 6-6. Recommended-Frequency Information
6-7. Recommended Transmission Power Range at Recommended Frequency
6-8. Use Prohibited-Frequency Information
6-9. Recommended-Installation Position Information
6-10. External Entity-related Implementation Example
6-11. Use Examples
7. Modification Examples
7-1. Modification Examples Related to System Configuration
7-2. Other Modification Examples
8. Conclusion

1. INTRODUCTION

In recent years, an issue of depletion of radio wave resources (e.g., frequencies) allocable to wireless systems has emerged. However, it is difficult to newly allocate radio wave resources because all radio wave bands are already used by existing wireless systems. Hence, more effective use of radio wave resources by utilization of a cognitive radio technology has begun to attract attention in recent years.

The cognitive radio technology utilizes temporal and spatial free radio waves (White Space) of the existing wireless systems (e.g., dynamic frequency sharing (DSA: Dynamic Spectrum Access)) to secure radio wave resources. For example, in the United States, legislation and standardization of CBRS (Citizens Broadband Radio Service) utilizing a frequency sharing technology have been accelerating with the aim of opening to the public a Federal use band (3.55-3.70 GHz), which overlaps with frequency bands known worldwide as 3GPP bands 42 and 43.

It is to be noted that the cognitive radio technology contributes not only to the dynamic frequency sharing but also to an improvement in efficiency of frequency utilization by wireless systems. For example, ETSI EN 303 387 and IEEE 802 19.1-2014 specify a coexistence technology between wireless systems that use free radio waves.

1-1. Control of Wireless System for Achievement of Frequency Sharing

In general, in frequency sharing, national and local regulatory authorities (NRA: National Regulatory Authority) make it compulsory to protect a wireless system (primary system) of a primary user (primary user) licensed or authorized for the use of a frequency band. Typically, the NRA provides an allowable interference reference value for the primary system, and demands that interference caused by sharing by a wireless system (secondary system) of a secondary user (secondary user) fall below the allowable interference reference value.

To achieve frequency sharing, for example, a communication control apparatus (e.g., a frequency management database) controls communication of the secondary system so as not to cause fatal interference to the primary system. The communication control apparatus is an apparatus that manages communication, etc. of a communication apparatus. For example, the communication control apparatus is an apparatus (system) for management of radio wave resources (e.g., frequencies), such as a GLDB (Geo-location Database) or a SAS (Spectrum Access System). In the present embodiment, the communication control apparatus corresponds to a communication control apparatus 40 to be described later. The communication control apparatus 40 will be described in detail later.

Here, the primary system refers to, for example, a system (e.g., an existing system) that uses a predetermined frequency band preferentially over another system such as the secondary system. Further, the secondary system refers to, for example, a system that makes secondary use (e.g., dynamic frequency sharing) of the frequency band used by the primary system. The primary system and the secondary system may each include a plurality of communication apparatuses or one communication apparatus. The communication control apparatus distributes interference tolerance (also referred to as an interference margin) of the primary system to one or more communication apparatuses constituting the secondary system so that aggregated interference (Interference Aggregation) caused to the primary system by the one or more communication apparatuses does not exceed the interference tolerance. In this case, the interference tolerance may be an amount of interference predetermined by an operator of the primary system or a public organization, etc. that manages radio waves. In the following description, the term "interference margin" refers to the interference tolerance. Further, the aggregated interference is sometimes referred to as aggregated interference power.

FIG. 1 is an explanatory diagram illustrating a distribution example of an interference margin to communication apparatuses constituting the secondary system. In the example of FIG. 1, a communication system 1 is the primary system and a communication system 2 is the secondary system. The communication system 1 includes a wireless communication apparatus $10_1$, etc. Further, the communication system 2 includes base station apparatuses $20_1$, $20_2$, $20_3$, etc. It is to be noted that although the communication system 1 is provided with only one wireless communication apparatus 10 in the example of FIG. 1, the communication system 1 may be provided with a plurality of wireless communication apparatuses 10. Further, although the communication system 2 is provided with three base station apparatuses 20 in the example of FIG. 1, the communication system 2 may be provided with less than three or more than three base station apparatuses 20. Further, the wireless communication apparatus provided in the communication system 2 may not necessarily be a base station apparatus. It is to be noted that although only one primary system (the communication system 1 in the example of FIG. 1) and only one secondary system (the communication system 2 in the example of FIG. 1) are illustrated in the example of FIG. 1, the primary system and the secondary system may each be a plurality of systems.

The wireless communication apparatus $10_1$ and the base station apparatuses $20_1$, $20_2$, and $20_3$ are each able to transmit and receive radio waves. An amount of interference allowed by the wireless communication apparatus $10_1$ is $I_{accept}$. Further, amounts of interference caused by the base station apparatuses $20_1$, $20_2$, and $20_3$ to a predetermined protection point of the communication system 1 (primary system) are amounts of caused interference $I_1$, $I_2$, and $I_3$, respectively. Here, the protection point is an interference calculation reference point for protection of the communication system 1.

The communication control apparatus distributes the interference margin $I_{accept}$ to the plurality of base station apparatuses 20 so that the aggregated interference to the predetermined protection point of the communication system 1 (amount of received interference $I_1+I_2+I_3$ illustrated in FIG. 1) does not exceed the interference margin $I_{accept}$. For example, the communication control apparatus distributes the interference margin $I_{accept}$ to the respective base station apparatuses 20 so that the amounts of caused interference $I_1$, $I_2$, and $I_3$ are each $I_{accept}/3$. Alternatively, the communication control apparatus distributes the interference margin $I_{accept}$ to the respective base station apparatuses 20 so that the amounts of caused interference $I_1$, $I_2$, and $I_3$ are each equal to or less than $I_{accept}/3$. Needless to say, a method of distributing the interference margin is not limited to this example.

The communication control apparatus calculates maximum transmission power allowed for each base station apparatus 20 (hereinafter referred to as maximum allowable transmission power) on the basis of the amount of interference distributed (hereinafter referred to as amount of distributed interference). For example, the communication control apparatus calculates the maximum allowable transmission power of each base station apparatus 20 by back-calculating from the amount of distributed interference, on the basis of propagation loss, antenna gain, etc. Then, the communication control apparatus notifies each base station apparatus 20 of information about the calculated maximum allowable transmission power.

1-2. Overview of Present Embodiment

To achieve effective use of radio wave resources, it is desirable to allow many people to know situations of secondary use of free radio waves (free frequencies). For example, allowing a person who is planning to newly install a base station (e.g., a mobile network operator, a private network operator, etc.) to know how free radio waves (free frequencies) are used at present makes it possible to install a base station more efficiently, and as a result, it is possible to achieve more efficient use of radio wave resources.

However, it is assumed that a subject that makes secondary use of free radio waves (free frequencies) is strongly reluctant to disclose all secondary use information of free radio waves possessed by the subject to the public. For example, it is assumed that operator information of a secondary use system of free radio waves and information corresponding to know-how of the operator (e.g., secondary use system installation information, etc.) are information a secondary user of free radio waves is strongly reluctant to disclose.

If the secondary use information is not disclosed, there is a possibility that true effective use of radio wave resources is not achieved. In contrast, if the secondary user is forced to disclose all secondary use information, there is a possibility that a willingness to use free radio waves is reduced and use of free radio waves is not promoted.

Accordingly, in the present embodiment, highly valuable secondary use information is disclosed to the public while keeping confidentiality of information. Specifically, instead of pinpoint secondary use information that allows a general user to know detailed information of each base station, secondary use information about a search range (a designated area or a designated space) having a predetermined size designated by the general user is disclosed to the public.

For example, an information processing apparatus according to the present embodiment acquires designation information for designating an area or a space together with identification information for identifying a plurality of pieces of secondary use information related to secondary use of radio waves of a frequency band used by the primary system. Then, the information processing apparatus generates secondary use information in a designated area or a designated space designated by the designation information. The secondary use information is a designated piece of secondary use information designated by the identification information from among the plurality of pieces of secondary use information. Then, the information processing apparatus transmits the generated secondary use information to an external monitor apparatus. Various examples of the external monitor apparatus (hereinafter also referred to as an "external apparatus") are assumed, such as OA&M (Operation, Administration and Maintenance) in a cellular system, and a web browser.

Thus, it is possible to disclose highly valuable secondary use information for the general user while paying attention not to disclose the know-how, etc. of the secondary user. As a result, efficient use of radio wave resources is achieved. It is to be noted that in the following description, operation of searching secondary use information in a designated area or a designated space by the information processing apparatus is sometimes referred to as discovery.

1-3. Terms Related to Frequency and Sharing

It is to be noted that, in the present embodiment, the primary system (the communication system 1) and the secondary system (the communication system 2) are assumed to be in a dynamically frequency sharing environment. Hereinafter, the present embodiment will be described taking as an example the CBRS legally prepared by the FCC (Federal Communications Commission) of the U.S. It is to be noted that the communication system 1 and the communication system 2 of the present embodiment are not limited to the CBRS.

Figure 2:
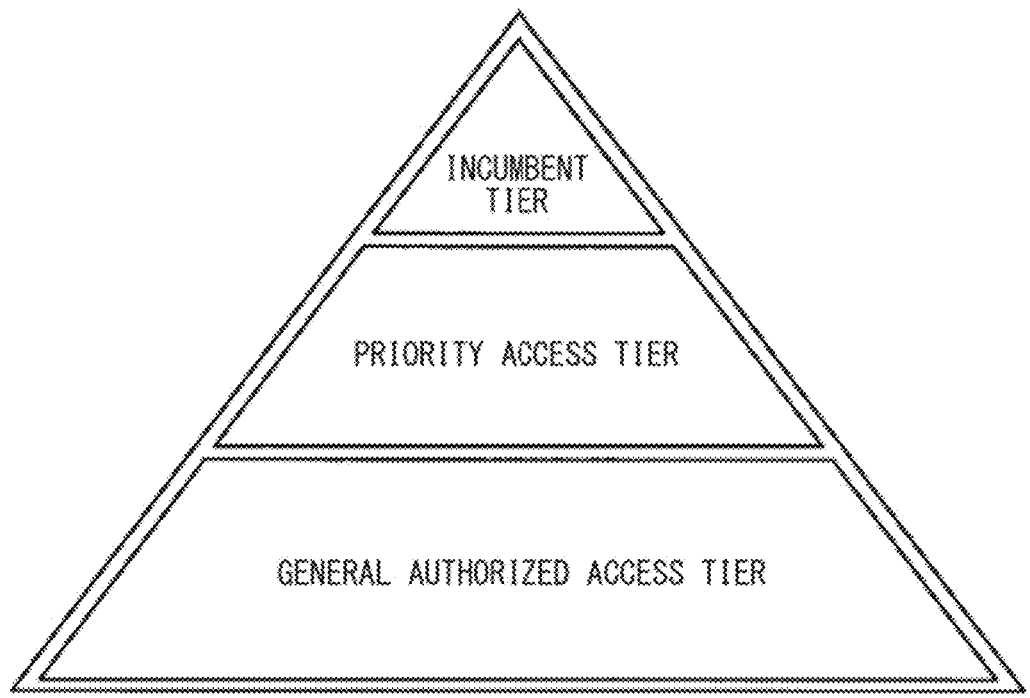
FIG. 2 is an explanatory diagram illustrating a hierarchical structure in CBRS.

FIG. 2 is an explanatory diagram illustrating a hierarchical structure in the CBRS. As illustrated in FIG. 2, each of users of a frequency band is classified into one of three groups. This group is called "tier". As the respective three groups, a hierarchical structure including an incumbent tier (Incumbent Tier), a priority access tier (Priority Access Tier), and a general authorized access tier (General Authorized Access Tier) is defined. In this hierarchical structure, the priority access tier (Priority Access Tier) is located higher than the general authorized access tier (General Authorized Access Tier), and the incumbent tier (Incumbent Tier) is located higher than the priority access tier. Taking the CBRS as an example, a system (existing system) located in the incumbent tier serves as the primary system, and a system located in the general authorized access tier and the priority access tier serves as the secondary system.

The incumbent tier (Incumbent Tier) is a group including existing users of the shared frequency band. In the CBRS, the Department of Defense (DOD: Department of Defense), a fixed satellite operator, and a grandfathered wireless broadband licensee (GWBL: Grandfathered Wireless Broadband Licensee) are defined as existing users. The "Incumbent Tier" is not requested to avoid or suppress interference with the "Priority Access Tier" and "the GAA (General Authorized Access) Tier" with lower priority. Further, the "Incumbent Tier" is protected against interference from the "Priority Access Tier" and the "GAA Tier". That is, the user of the "Incumbent Tier" is able to use the frequency band without considering the presence of other groups.

The priority access tier (Priority Access Tier) is a group including users with a license called PAL (Priority Access License). The "Priority Access Tier" is requested to avoid or suppress interference with the "Incumbent Tier" with higher priority than the "Priority Access Tier", but is not requested to avoid or suppress interference with the "GAA Tier" with lower priority. Further, the "Priority Access Tier" is not protected against interference from the "Incumbent Tier"

with higher priority, but is protected against interference from the "GAA Tier" with lower priority.

The general authorized access tier (GAA Tier) is a group including all other users that do not belong to the "Incumbent Tier" and the "Priority Access Tier" described above. The "GAA Tier" is requested to avoid or suppress interference with the "Incumbent Tier" and the "Priority Access Tier" with higher priority. Further, the "GAA Tier" is not protected against interference from the "Incumbent Tier" and the "Priority Access Tier" with higher priority. That is, the "GAA Tier" is a "tier" that is legislatively requested of opportunistic (opportunistic) frequency utilization.

It is to be noted that the hierarchical structure is not limited to these definitions. Although the CBRS is generally referred to as a 3Tier structure, it may be a 2Tier structure. Typical examples include 2Tier structures such as LSA (Licensed Shared Access) and TVWS (TV band White Space). The LSA adopts a structure equivalent to combination of the "Incumbent Tier" and the "Priority Access Tier". In addition, the TVWS adopts a structure equivalent to combination of the "Incumbent Tier" and the "GAA Tier". Further, four or more Tiers may be present. Specifically, for example, an intermediate tier corresponding to the "Priority Access Tier" may be further assigned priority, etc. Further, for example, the "GAA Tier" may similarly be assigned priority, etc.

Figure 3:
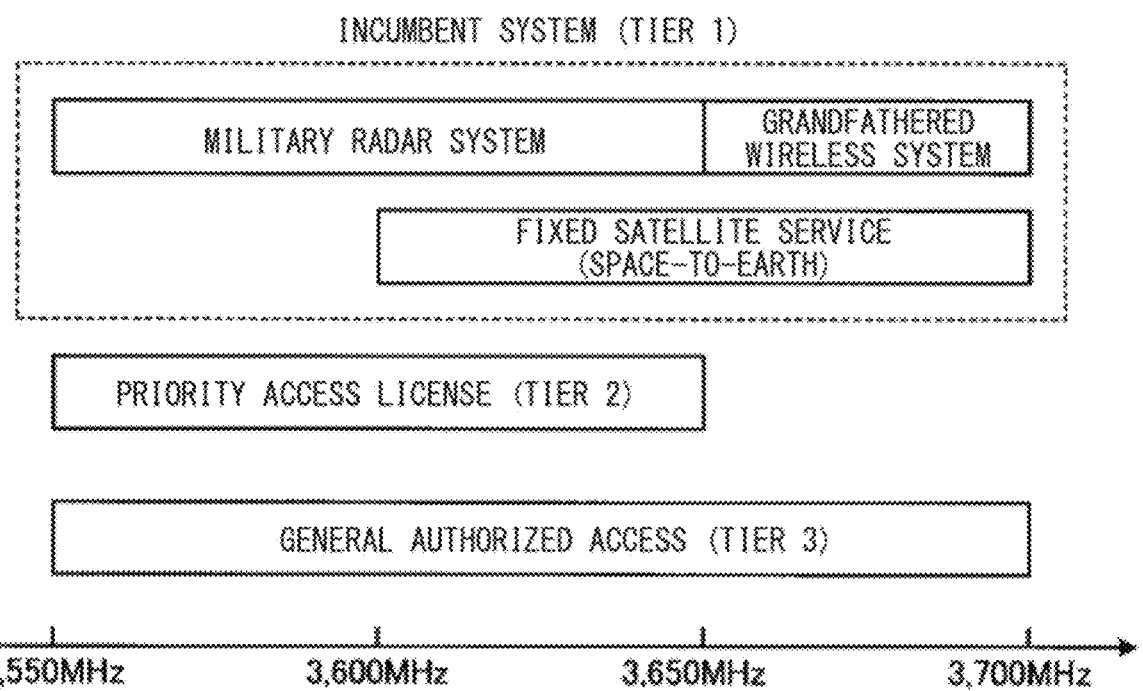
FIG. 3 is an explanatory diagram illustrating bands of the CBRS.

FIG. 3 is an explanatory diagram illustrating bands of the CBRS. Taking the above CBRS as an example, the primary system is a military radar system (Military Radar System), a grandfathered wireless system (Grandfathered Wireless System), or fixed satellite service (space to earth) (Fixed Satellite Service (space-to-earth)). Here, the military radar system is typically a ship-based radar. Further, the secondary system is a wireless network system including a base station and a terminal called a CBSD (Citizens Broadband Radio Service Device) and a EUD (End User Device). Priority is further present for the secondary system, and priority access license (PAL: Priority Access License) enabling licensed use of the shared band and substantially unlicensed general authorized access (GAA: General Authorized Access) are defined. A tier 1 (Tier 1) illustrated in FIG. 3 corresponds to the incumbent tier illustrated in FIG. 2. Further, a tier 2 (Tier 2) illustrated in FIG. 3 corresponds to the priority access tier illustrated in FIG. 2. In addition, a tier 3 (Tier 3) illustrated in FIG. 3 corresponds to the general authorized access tier illustrated in FIG. 2.

It is to be noted that the primary system (the communication system 1) of the present embodiment is not limited to the example illustrated in FIG. 3. Another type of wireless system may be used as the primary system (the communication system 1). For example, another wireless system may be used as the primary system, depending on the country/region/frequency band to which the present embodiment is applied. For example, the primary system may be a television broadcasting system, such as a DVB-T (Digital Video Broadcasting-Terrestrial) system. The primary system may also be a wireless system called a FS (Fixed System). It may also be frequency sharing in another frequency band. For example, typical examples may include LSA and TVWS (TV band White Space). The primary system may also be a cellular communication system such as LTE (Long Term Evolution) or NR (New Radio). The primary system may also be an aeronautical radio system, such as ARNS (Aeronautical Radio Navigation Service). Needless to say, the primary system is not limited to the above wireless system and may be another type of wireless system.

Further, the free radio waves (White Space) used by the communication system 2 is not limited to radio waves of the Federal use band (3.55-3.70 GHz). The communication system 2 may use radio waves of a frequency band different from the Federal use band (3.55-3.70 GHz) as free radio waves. For example, if the primary system (the communication system 1) is a television broadcasting system, the communication system 2 may be a system that uses TV white space as free radio waves. Here, the TV white space refers to a frequency band that is not used by the television broadcasting system among frequency channels allocated to the television broadcasting system (primary system). In this case, the TV white space may be a channel that is not used depending on the region.

Further, the relationship between the communication system 1 and the communication system 2 is not limited to a frequency sharing relationship with the communication system 1 as the primary system and the communication system 2 as the secondary system. The relationship between the communication system 1 and the communication system 2 may be a network coexistence (Network Coexistence) relationship between identical or different wireless systems using the same frequency.

In general, in frequency sharing, the existing system using a target band is referred to as the primary system, and the system of the secondary user is referred to as the secondary system. However, in a case of applying the present embodiment to an environment other than a frequency sharing environment, these (the primary system and the secondary system) may be replaced with a system expressed by another term. For example, a macrocell in a HetNet may be used as the primary system, and a small cell or a relay station may be used as the secondary system. Further, a base station may be used as the primary system, and a Relay UE or Vehicle UE present in its coverage and implementing D2D or V2X may be used as the secondary system. The base station is not limited to a fixed type, and may be a portable/mobile type. In such a case, for example, the communication control apparatus provided by the present invention may be provided in a base station, a relay station, a Relay UE, or the like.

It is to be noted that the term "frequency" appearing in the following description may be replaced with another term. For example, the term "frequency" may be replaced with terms such as "resource," "resource block," "resource element," "channel," "component carrier," "carrier," and "subcarrier", and terms having meanings similar to these.

2. CONFIGURATION OF COMMUNICATION SYSTEM

Hereinafter, the communication system 2 according to an embodiment of the present disclosure will be described. The communication system 2 is a wireless communication system that performs wireless communication by making secondary use of radio waves used by the communication system 1 (first wireless system). For example, the communication system 2 is a wireless communication system that performs dynamic frequency sharing by using free radio waves of the communication system 1. The communication system 2 uses a predetermined wireless access technology (Radio Access Technology) to provide wireless services to a user or an apparatus of the user.

Here, the communication system 2 may be a cellular communication system such as W-CDMA (Wideband Code Division Multiple Access), cdma2000 (Code Division Multiple Access 2000), LTE, or NR. In the following description, the "LTE" is assumed to include LTE-A (LTE-Advanced), LTE-A Pro (LTE-Advanced Pro), and EUTRA (Evolved Universal Terrestrial Radio Access). Further, the "NR" is assumed to include a NRAT (New Radio Access Technology) and FEUTRA (Further EUTRA). It is to be noted that the communication system 2 is not limited to a cellular communication system. For example, the communication system 2 may be another wireless communication system, such as a wireless LAN (Local Area Network) system, a television broadcasting system, an aeronautical radio system, or a space radiocommunication system.

In the present embodiment, the communication system 1 is the primary system and the communication system 2 is the secondary system. As described above, the communication system 1 and the communication system 2 may each be a plurality of systems. It is to be noted that, although the communication system 1 includes one wireless communication apparatus 10 (the wireless communication apparatus $10_1$ illustrated in FIG. 1) in the example of FIG. 1, it may include a plurality of wireless communication apparatuses 10. The wireless communication apparatus 10 may have the same configuration as the base station apparatus 20 or a terminal apparatus 30 to be described later.

2-1. Overall Configuration of Communication System

The communication system 2 typically includes the following entities.
Communication apparatus (e.g., base station apparatus or proxy apparatus)
Terminal apparatus
Communication control apparatus It is to be noted that, in the following description, the entity to be the communication apparatus is assumed to be the base station apparatus 20 and/or a proxy apparatus 50. However, the entity to be the communication apparatus is not limited to the base station apparatus 20 and the proxy apparatus 50, and may be another communication apparatus (e.g., the terminal apparatus 30 and the communication control apparatus 40). Further, the external apparatus described above may or may not be a portion of the communication system 2. Further, the terminal apparatus 30 may be regarded as the external apparatus.

Figure 4:
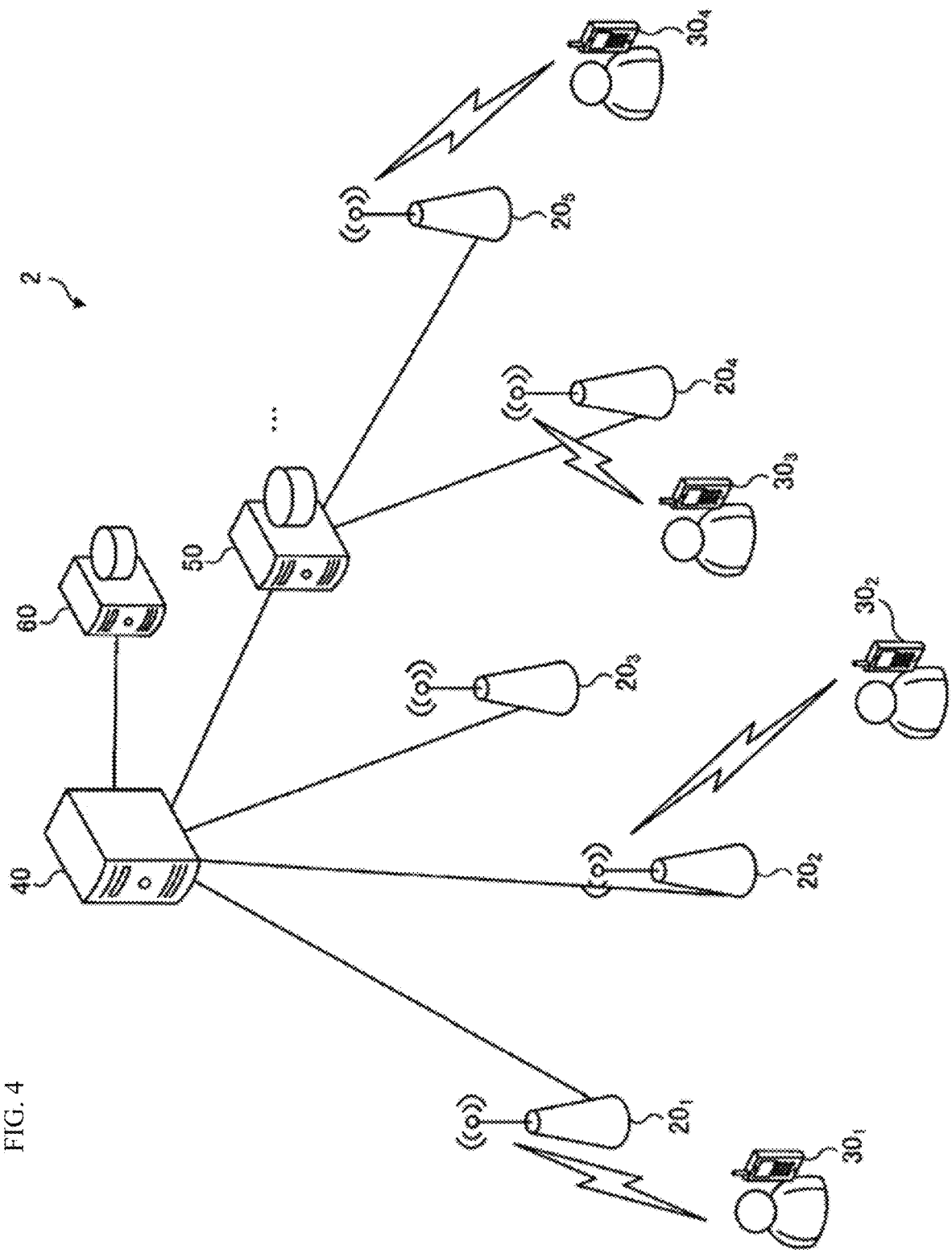
FIG. 4 is a diagram illustrating a configuration example of a communication system according to an embodiment of the present disclosure.

FIG. 4 is a diagram illustrating a configuration example of the communication system 2 according to the embodiment of the present disclosure. The communication system 2 includes the base station apparatus 20, the terminal apparatus 30, the communication control apparatus 40, the proxy apparatus 50, and the server apparatus 60. The communication system 2 provides wireless services to the user or an apparatus of the user by cooperative operation of apparatuses (e.g., a communication apparatus such as a wireless communication apparatus) constituting the communication system 2. The wireless communication apparatus refers to an apparatus with a wireless communication function, and corresponds to the base station apparatus 20 and the terminal apparatus 30 in the example of FIG. 4.

It is to be noted that the communication control apparatus 40 and the proxy apparatus 50 may have a wireless communication function. In this case, the communication control apparatus 40 and the proxy apparatus 50 may also be regarded as wireless communication apparatuses. In the following description, a wireless communication apparatus is sometimes referred to simply as a communication apparatus. It is to be noted that the communication apparatus is not limited to a wireless communication apparatus. For example, an apparatus that does not have a wireless communication function and is able to perform only wired communication may also be regarded as a communication apparatus.

The communication system 2 may include a plurality of base station apparatuses 20, a plurality of terminal apparatuses 30, a plurality of communication control apparatuses 40, and a plurality of proxy apparatuses 50. In the example of FIG. 4, the communication system 1 includes base station apparatuses $20_1$, $20_2$, $20_3$, $20_4$, $20_5$, etc. as the base station apparatus 20. Further, the communication system 2 includes terminal apparatuses $30_1$, $30_2$, $30_3$, $30_4$, etc. as the terminal apparatus 30. The communication system 1 also includes communication control apparatuses $40_1$, $40_2$, etc. as the communication control apparatus 40.

It is to be noted that, in the following description, the wireless communication apparatus is sometimes referred to as a wireless system. For example, the wireless communication apparatus 10 and the base station apparatuses $20_1$ to $20_5$ each are one wireless system. Further, the terminal apparatuses $30_1$ to $30_4$ each are one wireless system. It is to be noted that the communication system 1 is the first wireless system in the following description, but each of one or more wireless communication apparatuses 10 provided in the communication system 1 may be regarded as the first wireless system. Further, each of one or more base station apparatuses 20 provided in the communication system 2 is the second wireless system in the following description, but the communication system 2 itself may be regarded as the second wireless system, or each of one or more terminal apparatuses 30 provided in the communication system 2 may be regarded as the second wireless system. Each communication control apparatus 40 or each proxy apparatus 50 may be regarded as the second wireless system if the communication control apparatus 40 and the proxy apparatus 50 have a wireless communication function.

It is to be noted that the wireless system may be one system including a plurality of communication apparatuses including at least one wireless communication apparatus. For example, a system including one or more base station apparatuses 20 and one or more terminal apparatuses 30 subordinate thereto may be regarded as one wireless system. Further, the communication system 1 or the communication system 2 may each be regarded as one wireless system. In the following description, a communication system including a plurality of communication apparatuses including at least one wireless communication apparatus is sometimes referred to as a wireless communication system or simply a communication system. It is to be noted that one system including a plurality of communication apparatuses including one wireless communication apparatus may be regarded as the first wireless system or the second wireless system.

(Base Station Apparatus)

The base station apparatus 20 (second wireless system) is a wireless communication apparatus that wirelessly communicates with the terminal apparatus 30 or another communication apparatus (another base station apparatus 20 or another proxy apparatus 50). The base station apparatus 20 is a type of communication apparatus. The base station apparatus 20 is, for example, an apparatus corresponding to a wireless base station (Base Station, Node B, eNB, gNB, etc.) or a wireless access point (Access Point). The base station apparatus 20 may be a wireless relay station. The base station apparatus 20 may be a road base station apparatus such as a RSU (Road Side Unit). Further, the base station apparatus 20 may also be an optical feeder called a RRH (Remote Radio Head). In the present embodiment, a base station of the wireless communication system is sometimes referred to as a base station apparatus. It is to be noted that a wireless access technology used by the base station apparatus 20 may be a cellular communication technology or a wireless LAN technology. Needless to say, the wireless access technology used by the base station apparatus 20 is not limited thereto and may be other wireless access technologies.

The base station apparatus 20 may not necessarily be fixed, and may be installed in a moving object like an automobile. In addition, the base station apparatus 20 may not necessarily be present on the ground; objects present in the air or space, such as aircrafts, drones, helicopters, and satellites, or objects present on and in the sea, such as ships and submarines, may be provided with communication apparatus functions. In such a case, the base station apparatus 20 may wirelessly communicate with another fixedly installed communication apparatus.

The coverage size of the base station apparatus 20 may also be a large size as with a macrocell or a small size as with a picocell. Needless to say, the coverage size of the base station apparatus 20 may be an extremely small size as with a femtocell. Further, in a case where the base station apparatus 20 has a beamforming capability, a cell or a service area may be formed for each beam.

The base station apparatus 20 may be used, operated, and/or managed by various entities. For example, a mobile network operator (MNO: Mobile Network Operator), a mobile virtual network operator (MVNO: Mobile Virtual Network Operator), a mobile virtual network enabler (MVNE: Mobile Virtual Network Enabler), a neutral host network (NHN: Neutral Host Network) operator, an enterprise, an educational body (school corporation, local board of education, etc.), a real estate (building, apartment, etc.) administrator, an individual, etc. may be assumed for the base station apparatus 20. Needless to say, a subject responsible for using, operating, and/or managing the base station apparatus 20 is not limited thereto.

The base station apparatus 20 may be installed and/or operated by one operator or may be installed and/or operated by one individual. Needless to say, the subject responsible for installing and operating the base station apparatus 20 is not limited thereto. For example, the base station apparatus 20 may be jointly installed and operated by a plurality of operators or a plurality of individuals. The base station apparatus 20 may also be a shared facility used by a plurality of operators or a plurality of individuals. In this case, installation and/or operation of the facility may be performed by a third party different from the users.

The base station apparatus 20 operated by the operator is typically Internet-connected via a core network. In addition, the base station apparatus 20 is operated and maintained by a function called OA&M (Operation, Administration & Maintenance). It is to be noted that, for example, the communication system 2 may include a network manager that integrates and controls the base station apparatuses 20 in the network.

It is to be noted that the concept of a base station includes access points and wireless relay stations (also called relay apparatuses). Further, the concept of a base station includes not only a structure (Structure) with a function of a base station, but also an apparatus installed in the structure. The structure is, for example, a building (Building) such as an office building, a house, a steel tower, a station facility, an airport facility, a port facility, or a stadium. It is to be noted that the concept of a structure includes not only buildings but also constructions (Non-building structure) such as tunnels, bridges, dams, walls, and steel columns, as well as facilities such as cranes, gates, or wind turbines. Further, the concept of a structure includes not only a structure on the land (a ground in a narrow sense) or underground, but also a structure over water such as piers and mega-floats, and an underwater structure such as oceanographic observation facilities.

The base station may also be a movably configured base station (mobile station). In this case, the base station (mobile station) may be a wireless communication apparatus installed in a mobile body or may be the mobile body itself. Further, the mobile body may be a mobile body (e.g., a vehicle such as an automobile, a bus, a truck, a train, or a linear motor car) that moves over the land (a ground in a narrow sense), or may be a mobile body (e.g., a subway) that moves underground (e.g., in a tunnel). Needless to say, the mobile body may be a mobile terminal such as a smart phone. The mobile body may also be a mobile body moving over water (e.g., a vessel such as a passenger ship, a cargo ship, or a hovercraft), or may be a mobile body moving underwater (e.g., a submersible such as a submersible vessel, a submarine, or an unmanned underwater vehicle). The mobile body may also be a mobile body moving in the atmosphere (e.g., an aircraft such as an airplane, an airship, or a drone), or may be a space mobile body moving outside the atmosphere (e.g., an artificial celestial body such as an artificial satellite, a spacecraft, a space station, or an explorer).

(Terminal Apparatus)

The terminal apparatus 30 is communication equipment having a communication function. The terminal apparatus 30 is typically communication equipment such as a smart phone. The terminal apparatus 30 may be a user terminal such as a cellular phone, a smart device (a smart phone or a tablet), a wearable terminal, a PDA (Personal Digital Assistant), or a personal computer. The terminal apparatus is sometimes referred to as User Equipment, a User Terminal, a User Station, a Mobile Terminal, a Mobile Station, etc.

It is to be noted that the terminal apparatus 30 may not be used by persons. The terminal apparatus 30 may be a sensor installed in a machine or building of a factory, like so-called MTC (Machine Type Communication). The terminal apparatus 30 may also be an M2M (Machine to Machine) device or an IoT (Internet of Things) device. Further, the terminal apparatus 30 may be an apparatus having a relay communication function, as typified by D2D (Device to Device) and V2X (Vehicle to everything). Further, the terminal apparatus 30 may be equipment called CPE (Client Premises Equipment) and used in a wireless backhaul or the like. Further, the terminal apparatus 30 may be a wireless communication apparatus installed in a mobile body or may be the mobile body itself.

In addition, the terminal apparatus 30 may not necessarily be present on the ground, and may be objects present in the air or space, such as aircrafts, drones, helicopters, and satellites, and objects present on and in the sea, such as ships and submarines.

(Communication Control Apparatus)

The communication control apparatus 40 is an apparatus that manages the base station apparatus 20. For example, the communication control apparatus 40 is an apparatus that controls wireless communication of the base station apparatus 20. For example, the communication control apparatus 40 determines communication parameters (also referred to as operation parameters) to be used by the base station apparatus 20, and issues a permission or an instruction to the base station apparatus 20. In this case, the communication control apparatus 40 may be a network manager that integrates and controls the wireless apparatuses in the network. Taking ETSI EN 303 387 and IEEE 802. 19.1-2014 as an example, the communication control apparatus 40 may be a control apparatus such as a Spectrum Manager/Coexistence Manager that performs radio wave interference control between pieces of wireless equipment. Further, for example, a RLSS (Registered Location Secure Server) specified in IEEE 802. 11-2016 may also serve as the communication control apparatus 40. In addition, in a frequency sharing environment, a database (database server, apparatus, or system) such as a GLDB (Geolocation database) or a SAS (Spectrum Access System) may also serve as the communication control apparatus 40. Basically, the control target of the communication control apparatus 40 is the base station apparatus 20, but the communication control apparatus 40 may control the terminal apparatus 30 subordinate thereto.

Figure 5:
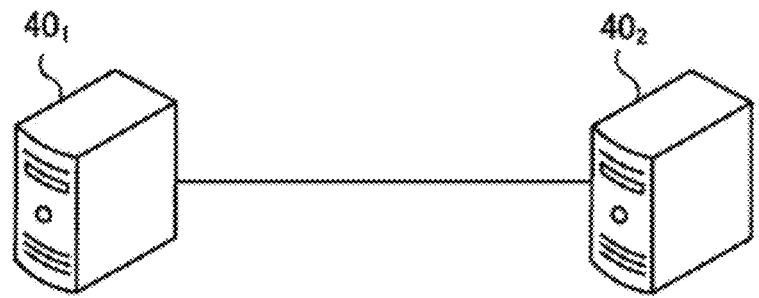
FIG. 5 is a diagram illustrating a model in which communication control apparatuses are disposed in a distributed manner.

It is to be noted that a plurality of communication control apparatuses 40 may be present in one communication system 2. FIG. 5 illustrates a model in which the communication control apparatuses 40 are disposed in a distributed manner. In this case, the plurality of communication control apparatuses 40 (in the example of FIG. 5, the communication control apparatus 40₁ and the communication control apparatus 40₂) exchange information about the base station apparatus 20 managed by each other, and perform necessary frequency allocation and interference control calculation.

Figure 6:
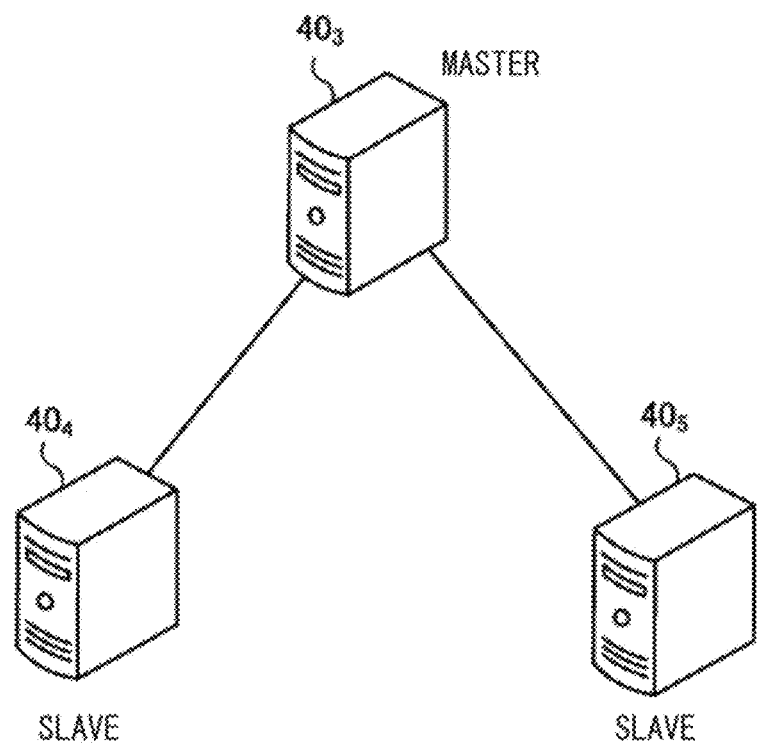
FIG. 6 is a diagram illustrating a model in which one communication control apparatus centrally controls a plurality of communication control apparatuses.

The communication control apparatus 40 may also be a master-slave type apparatus. FIG. 6 is a diagram illustrating a model in which one communication control apparatus centrally controls a plurality of communication control apparatuses (so-called master-slave model). In the example of FIG. 6, the master communication control apparatus is a communication control apparatus 40₃, and the slave communication control apparatuses are communication control apparatuses 40₄ and 40₅. In such a system, the master communication control apparatus is able to control a plurality of slave communication control apparatuses and make decisions intensively. In addition, the master communication control apparatus may delegate and abandon the decision-making authority for the slave communication control apparatuses for load distribution (load balancing) or the like.

It is to be noted that the communication control apparatus 40 may, to play its role, acquire necessary information also from entities other than the base station apparatus 20, the terminal apparatus 30, and the proxy apparatus 50. Specifically, the communication control apparatus 40 may acquire information necessary for protection, such as position information of the primary system, from a database (regulatory database) managed and operated by a national or local radio wave administrative agency, for example. Examples of regulatory databases include a ULS (Universal Licensing System) operated by the U.S. Federal Communications Commissions (Federal Communications Commissions). Other examples of information necessary for protection may include, for example, an out-of-band emission limit (OOBE (Out-of-Band Emission) Limit), an adjacent-channel leakage ratio (ACLR: Adjacent Channel Leakage Ratio), adjacent-channel selectivity (Adjacent Channel Selectivity), a fading margin, and/or a protection ratio (PR: Protection Ratio). For these examples, in a case where numerical values are fixedly given by law, it is desirable to use them.

Further, as other examples, it may be assumed that the communication control apparatus 40 acquires radio wave sensing information from a radio wave sensing system that is installed and operated for radio wave detection of the primary system. As a specific example, the communication control apparatus 40 may acquire radio wave detection information of the primary system from a radio wave sensing system such as an environmental sensing function (ESC: Environmental Sensing Capability) in the U.S. CBRS. Further, in a case where a communication apparatus or a terminal has a sensing function, the communication control apparatus 40 may acquire radio wave detection information of the primary system from them.

(Proxy Apparatus)

The proxy apparatus 50 (proxy system) is an apparatus that acts on behalf of (as a representative for) one or more communication apparatuses (e.g., the base station apparatus 20) to communicate with the communication control apparatus 40. The proxy apparatus 50 is also a type of communication apparatus. The proxy apparatus 50 may be a DP (Domain Proxy) specified in NPTL 2 or the like. Here, the DP refers to an entity that communicates with the SAS on behalf of each of a plurality of CBSDs or a network including a plurality of CBSDs. It is to be noted that the proxy apparatus 50 is not limited to the DP specified in NPTL 2, as long as it has a function of acting on behalf of (as a representative for) one or more communication apparatuses to communicate with the communication control apparatus 40. A network manager that integrates and controls the base station apparatuses 20 in the network may be regarded as the proxy apparatus 50.

(Server Apparatus)

The server apparatus 60 (server system) is an apparatus that records information about a process result of the communication control apparatus 40 (hereinafter referred to as process result information). For example, the server apparatus 60 records communication parameters, etc. of the base station apparatus 20 determined by the communication control apparatus 40. The process result information to be recorded by the server apparatus 60 may include position information of the base station apparatus 20, information about an available frequency to this base station apparatus 20, and information about maximum allowable transmission power at this available frequency.

Interfaces between the entities may be either wired or wireless. For example, as an interface between the communication control apparatus and the communication apparatus, it is possible to use a wireless interface independent of frequency sharing, as well as a wired circuit. In this case, the wireless interface may be, for example, a wireless interface provided by a mobile network operator via a licensed band (Licensed band) or a wireless interface using an existing license-exempt band (License-exempt band) (e.g., a wireless interface using Wi-Fi communication).

(External Apparatus)

Figure 7:
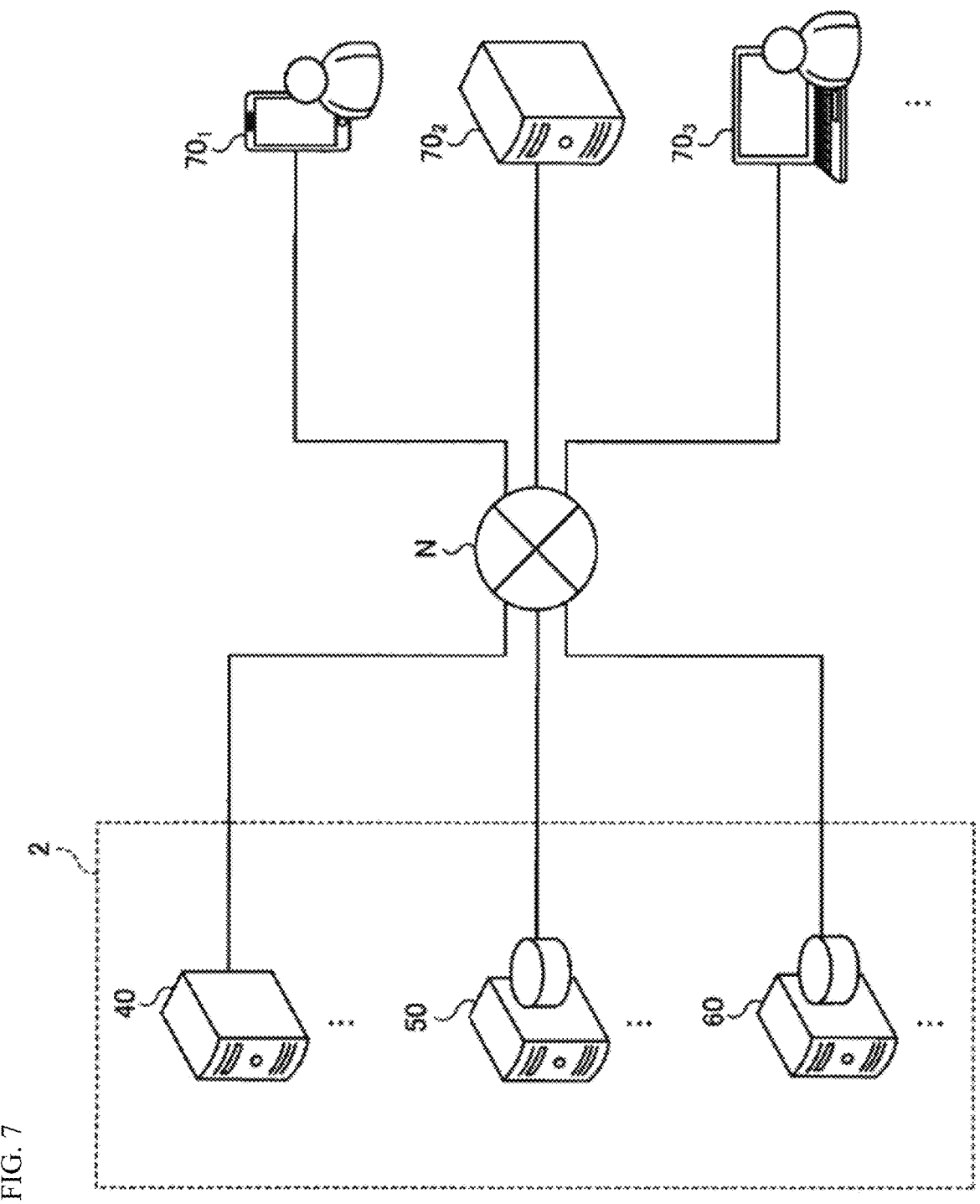
FIG. 7 is a diagram for explaining an external apparatus according to the embodiment of the present disclosure.

FIG. 7 is a diagram for explaining an external apparatus according to an embodiment of the present disclosure. An external apparatus 70 is communication equipment having a communication function. The external apparatus 70 is typically communication equipment such as a smart phone. The external apparatus 70 may be a user terminal such as a cellular phone, a smart device (a smart phone or a tablet), a wearable terminal, a PDA (Personal Digital Assistant), or a personal computer, or may be a server apparatus.

The external apparatus 70 functions as an external entity (External Entity) of the communication system 2. The external entity is a logical entity located outside the communication control apparatus 40 (including an attendant apparatus associated with the communication control apparatus 40). The attendant apparatus of the communication control apparatus 40 is an attendant apparatus that is associated with the communication control apparatus 40 and performs operation related to secondary use of free radio waves, and corresponds to, for example, the proxy apparatus 50 and the server apparatus 60.

In the example of FIG. 7, an external apparatus 70₁ is a smart device, an external apparatus 70₂ is a server apparatus, and an external apparatus 70₃ is a personal computer (notebook PC). The external apparatus 70 is coupled to the communication control apparatus 40 and the attendant apparatuses (the proxy apparatus 50 and the server apparatus 60 in the example of FIG. 7) of the communication control apparatus 40 through a network N. The network N is, for example, a communication network such as a LAN (Local Area Network), a WAN (Wide Area Network), telephone networks (such as a mobile phone network and a fixed-line network), a regional IP (Internet Protocol) network, and the Internet. The network N may be a wired network, or may be a wireless network.

The external apparatus 70 acquires secondary use information from the communication control apparatus 40 (or the attendant apparatus of the communication control apparatus 40), and outputs the secondary use information to the user.

The configurations of the apparatuses constituting the communication system 2 and the configuration of the external apparatus will be specifically described below.

2-2. Configuration of Base Station Apparatus

Figure 8:
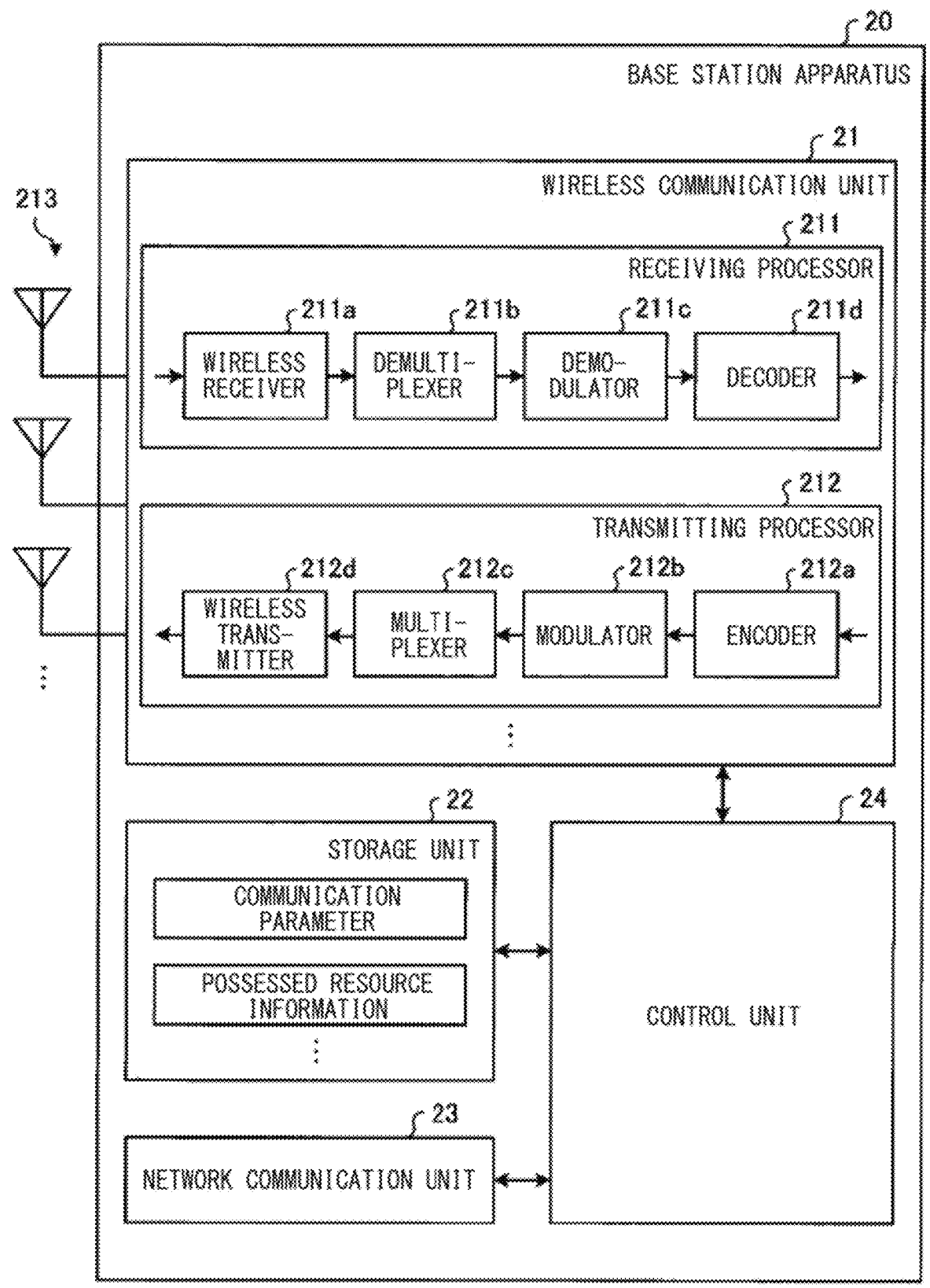
FIG. 8 is a diagram illustrating a configuration example of a communication apparatus according to the embodiment of the present disclosure.

First, the configuration of the base station apparatus 20 will be described. FIG. 8 is a diagram illustrating a configuration example of the base station apparatus 20 according to the embodiment of the present disclosure. The base station apparatus 20 is a wireless communication apparatus (wireless system) that wirelessly communicates with the terminal apparatus 30 under the control of the communication control apparatus 40. For example, the base station apparatus 20 is a base station apparatus (ground station apparatus) located on the ground. In this case, the base station apparatus 20 may be a base station apparatus installed in a structure located on the ground, or may be a base station apparatus installed in a mobile body moving over the ground. More specifically, the base station apparatus 20 may be an antenna installed in a structure, such as a building, and a signal processing apparatus coupled to the antenna. Needless to say, the base station apparatus 20 may be a structure or mobile body itself. The "ground" is a ground in a broad sense that includes not only the land (a ground in a narrow sense) but also underground, over water, and underwater. The base station apparatus 20 is a type of communication apparatus.

It is to be noted that the base station apparatus 20 is not limited to the ground station apparatus. For example, the base station apparatus 20 may be a base station apparatus (non-ground station apparatus) that moves or floats in the air or in space. In this case, the base station apparatus 20 may be an aircraft station apparatus or a satellite station apparatus.

The aircraft station apparatus may be an apparatus mounted on an aircraft or the like, or it may be the aircraft itself. The concept of the aircraft includes not only a heavy aircraft such as airplanes and gliders, but also a light aircraft such as balloons and airships. The concept of the aircraft also includes rotorcrafts such as helicopters and autogyros. It is to be noted that the aircraft station apparatus (or an aircraft on which the aircraft station apparatus is mounted) may be a manned aircraft or an unmanned aircraft such as a drone.

The satellite station apparatus may be an apparatus mounted on a space mobile body such as an artificial satellite, or may be a space mobile body itself. The satellite to be the satellite station apparatus may be any of a low-earth-orbiting (LEO: Low Earth Orbiting) satellite, a medium-earth-orbiting (MEO: Medium Earth Orbiting) satellite, a geostationary-earth-orbiting (GEO: Geostationary Earth Orbiting) satellite, and a highly elliptical orbiting (HEO: Highly Elliptical Orbiting) satellite. Needless to say, the satellite station apparatus may be an apparatus mounted on a low-earth-orbiting satellite, a medium-earth-orbiting satellite, a geostationary satellite, or a highly elliptical orbiting satellite.

The base station apparatus 20 may also be a relay station apparatus. The relay station apparatus is, for example, an aeronautical station or an earth station. The relay station apparatus may be regarded as a type of the relay apparatus described above. The aeronautical station is a wireless station installed on the ground or in a mobile body moving over the ground to communicate with the aircraft station apparatus. In addition, the earth station is a wireless station located on the earth (including in the air) to communicate with the satellite station apparatus. The earth station may be a large earth station, or a small earth station such as a VSAT (Very Small Aperture Terminal). It is to be noted that the earth station may be a VSAT control earth station (also referred to as a master station or a HUB station) or may be a VSAT earth station (also referred to as a slave station). The earth station may also be a wireless station installed in a mobile body moving over the ground. Examples of an earth station to be mounted on a vessel include earth stations on board vessels (ESV: Earth Stations on board Vessels). In addition, the earth station may include an aircraft earth station that is installed in an aircraft (including a helicopter) and communicates with the satellite station. In addition, the earth station may include an aeronautical earth station that is installed in a mobile body moving over the ground and communicates with the aircraft earth station via the satellite station. It is to be noted that the relay station apparatus may be a portable wireless station that communicates with a satellite station or an aircraft station.

The base station apparatus 20 includes a wireless communication unit 21, a storage unit 22, a network communication unit 23, and a control unit 24. It is to be noted that the configuration illustrated in FIG. 8 is a functional configuration, and a hardware configuration may be different from this. Further, the functions of the base station apparatus 20 may be implemented in a distributed manner in a plurality of physically separated apparatuses.

The wireless communication unit 21 is a wireless communication interface that wirelessly communicates with another communication apparatus (e.g., the terminal apparatus 30, the communication control apparatus 40, the proxy apparatus 50, and another base station apparatus 20). The wireless communication unit 21 operates under the control of the control unit 24. The wireless communication unit 21 may support a plurality of wireless access schemes. For example, the wireless communication unit 21 may support both NR and LTE. The wireless communication unit 21 may support other cellular communication schemes such as W-CDMA and cdma2000. Further, the wireless communication unit 21 may support a wireless LAN communication scheme in addition to the cellular communication scheme. Needless to say, the wireless communication unit 21 may only support one wireless access scheme.

The wireless communication unit 21 includes a receiving processor 211, a transmitting processor 212, and an antenna 213. The wireless communication unit 21 may include a plurality of receiving processors 211, a plurality of transmitting processors 212, and a plurality of antennas 213. It is to be noted that, in a case where the wireless communication unit 21 supports a plurality of wireless access schemes, each part of the wireless communication unit 21 may be configured individually for each wireless access scheme. For example, if the base station apparatus 20 supports NR and LTE, the receiving processor 211 and the transmitting processor 212 may be configured individually for the NR and the LTE.

The receiving processor 211 processes uplink signals received via the antenna 213. The receiving processor 211 includes a wireless receiver 211a, a demultiplexer 211b, a demodulator 211c, and a decoder 211d.

The wireless receiver 211a performs, on the uplink signal, down-conversion, removal of unwanted frequency components, control of amplifying levels, quadrature demodulation, conversion to a digital signal, removal of a guard interval, extraction of a frequency domain signal by fast Fourier transform, and the like. For example, assume that the wireless access scheme of the base station apparatus 20 is a cellular communication scheme such as LTE. In this case, the demultiplexer 211b demultiplexes, from the signal outputted from the wireless receiver 211a, uplink channels such as a PUSCH (Physical Uplink Shared Channel) or a PUCCH (Physical Uplink Control Channel) and an uplink reference signal. The demodulator 211c demodulates received signals by using a modulation scheme such as BPSK (Binary Phase Shift Keying) or QPSK (Quadrature Phase shift Keying) for modulation symbols of the uplink channels. The modulation scheme used by the demodulator 211c may be 16QAM (Quadrature Amplitude Modulation), 64QAM, or 256QAM. The decoder 211d performs decoding processing on encoded bits of the demodulated uplink channels. The decoded uplink data and uplink control information are outputted to the control unit 24.

The transmitting processor 212 performs a process of transmitting downlink control information and downlink data. The transmitting processor 212 includes an encoder 212a, a modulator 212b, a multiplexer 212c, and a wireless transmitter 212d.

The encoder 212a encodes the downlink control information and the downlink data inputted from the control unit 24 by using an encoding scheme such as block encoding, convolutional encoding, or turbo-encoding. The modulator 212b modulates the encoded bits outputted from the encoder 212a by a predetermined modulation scheme such as BPSK, QPSK, 16QAM, 64QAM, or 256QAM. The multiplexer 212c multiplexes modulation symbols of the respective channels and a downlink reference signal, and disposes the resulting signal in a predetermined resource element. The wireless transmitter 212d performs various signal processing on the signal from the multiplexer 212c. For example, the wireless transmitter 212d performs processing such as conversion to a time domain by a fast Fourier transform, addition of a guard interval, generation of a baseband digital signal, conversion to an analog signal, quadrature modulation, up-conversion, removal of extra frequency components, and power amplification. The signal generated by the transmitting processor 212 is transmitted from the antenna 213.

The storage unit 22 is a data-readable/writable storage apparatus such as a DRAM, an SRAM, a flash memory, or a hard disk. The storage unit 22 functions as a storage means of the base station apparatus 20. The storage unit 22 stores desired transmission power information, operation parameters, possessed resource information, and the like.

The desired transmission power information is information about transmission power that the base station apparatus 20 requests of the communication control apparatus 40 as information about transmission power necessary to transmit radio waves.

The operation parameters are information (e.g., setting information) related to radio wave transmission operation of the base station apparatus 20. For example, the operation parameter is information about a maximum value of transmission power (maximum allowable transmission power) allowed for the base station apparatus 20. Needless to say, the operation parameter is not limited to information about the maximum allowable transmission power.

Further, the possessed resource information is information related to radio resource possession of the base station apparatus 20. For example, the possessed resource information is information about radio resources currently available for the base station apparatus 20. For example, the possessed resource information is information about an amount of the possessed interference margin allocated from the communication control apparatus 40 to the base station apparatus 20. The information about the possessed amount may be information in units of resource blocks to be described later. That is, the possessed resource information may be information related to resource blocks possessed by the base station apparatus 20 (e.g., an amount of the possessed resource blocks).

The network communication unit 23 is a communication interface for communication with another apparatus (e.g., the communication control apparatus 40, the proxy apparatus 50, and another base station apparatus 20). For example, the network communication unit 23 is a LAN (Local Area Network) interface such as a NIC (Network Interface Card). The network communication unit 23 may be a USB interface including a USB (Universal Serial Bus) host controller, a USB port, and the like. Further, the network communication unit 23 may be a wired interface or may be a wireless interface. The network communication unit 23 functions as a network communication means of the base station apparatus 20. The network communication unit 23 communicates with the other apparatus under the control of the control unit 24.

The control unit 24 is a controller (Controller) that controls each part of the base station apparatus 20. The control unit 24 is, for example, implemented by a processor such as a CPU (Central Processing Unit) or an MPU (Micro Processing Unit). For example, the control unit 24 is implemented by the processor executing a variety of programs stored in the storage apparatus inside the base station apparatus 20 by using a RAM (Random Access Memory), etc. as a work area. It is to be noted that the control unit 24 may be implemented by an integrated circuit such as an ASIC (Application Specific Integrated Circuit) or a FPGA (Field Programmable Gate Array). The CPU, the MPU, the ASIC, and the FPGA may all be regarded as controllers.

2-3. Configuration of Terminal Apparatus

Figure 9:
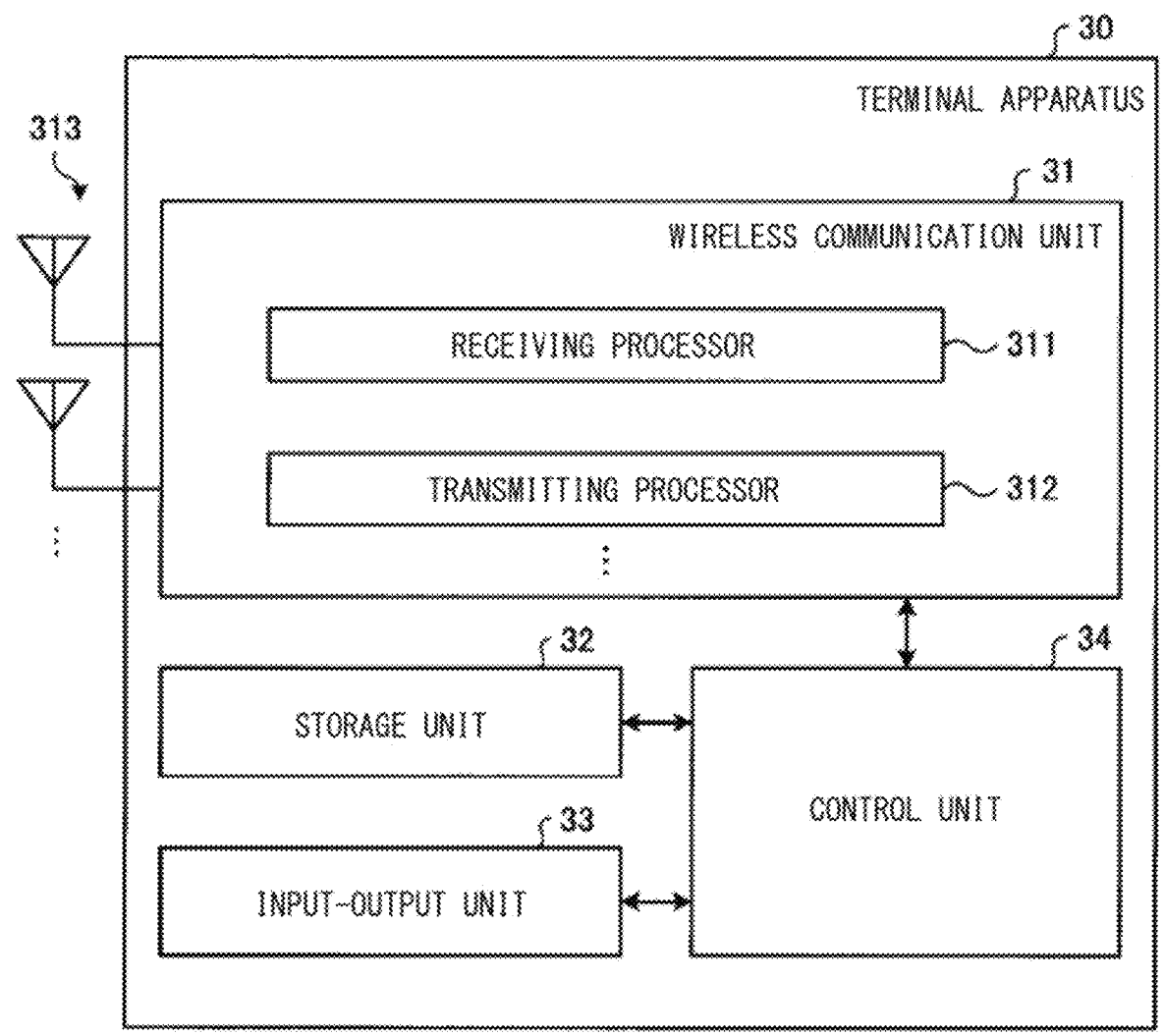
FIG. 9 is a diagram illustrating a configuration example of a terminal apparatus according to the embodiment of the present disclosure.

Next, the configuration of the terminal apparatus 30 will be described. FIG. 9 is a diagram illustrating a configuration example of the terminal apparatus 30 according to the embodiment of the present disclosure. The terminal apparatus 30 is a communication apparatus that wirelessly communicates with the base station apparatus 20 and/or the communication control apparatus 40. It is to be noted that, in the present embodiment, the concept of a communication apparatus (or wireless communication apparatus) includes not only a base station apparatus and a proxy apparatus, but also a terminal apparatus. The communication apparatus (or wireless communication apparatus) may also be referred to as a wireless system.

The terminal apparatus 30 includes a wireless communication unit 31, a storage unit 32, an input-output unit 33, and a control unit 34. It is to be noted that the configuration illustrated in FIG. 9 is a functional configuration, and a hardware configuration may be different from this. Further, the functions of the terminal apparatus 30 may be implemented in a distributed manner in a plurality of physically separated components.

The wireless communication unit 31 is a wireless communication interface that wirelessly communicates with another communication apparatus (e.g., the base station apparatus 20 and another terminal apparatus 30). The wireless communication unit 31 operates under the control of the control unit 34. The wireless communication unit 31 supports one or more wireless access schemes. For example, the wireless communication unit 31 supports both NR and LTE. The wireless communication unit 31 may support another wireless access scheme, such as W-CDMA or cdma2000.

The wireless communication unit 31 includes a receiving processor 311, a transmitting processor 312, and an antenna 313. The wireless communication unit 31 may include a plurality of receiving processors 311, a plurality of transmitting processors 312, and a plurality of antennas 313. It is to be noted that, in a case where the wireless communication unit 31 supports a plurality of wireless access schemes, each part of the wireless communication unit 31 may be configured individually for each wireless access scheme. For example, the receiving processor 311 and the transmitting processor 312 may be configured individually for the LTE and the NR. The configurations of the receiving processor 311 and the transmitting processor 312 are similar to those of the receiving processor 211 and the transmitting processor 212 of the base station apparatus 20.

The storage unit 32 is a data-readable/writable storage apparatus such as a DRAM, an SRAM, a flash memory, or a hard disk. The storage unit 32 functions as a storage means of the terminal apparatus 30.

The input-output unit 33 is a user interface for exchange of information with a user. For example, the input-output unit 33 is an operation apparatus for the user to perform various operations, such as a keyboard, a mouse, an operation key, or a touch panel. Alternatively, the input-output unit 33 is a display apparatus such as a liquid crystal display (Liquid Crystal Display) or an organic EL display (Organic Electroluminescence Display). The input-output unit 33 may be an acoustic apparatus such as a loudspeaker or a buzzer. Further, the input-output unit 33 may be a lighting apparatus such as an LED (Light Emitting Diode) lamp. The input-output unit 33 functions as an input/output means (input means, output means, operation means, or notification means) of the terminal apparatus 30.

The control unit 34 is a controller that controls each part of the terminal apparatus 30. The control unit 34 is, for example, implemented by a processor such as a CPU or an MPU. For example, the control unit 34 is implemented by the processor executing a variety of programs stored in the storage apparatus inside the terminal apparatus 30 by using a RAM, etc. as a work area. It is to be noted that the control unit 34 may be implemented by an integrated circuit such as an ASIC or a FPGA. The CPU, the MPU, the ASIC, and the FPGA may all be regarded as controllers.

It is to be noted that the control unit 34 may have functions similar to those of a control unit of the external apparatus 70 to be described later. For example, the control unit 34 may have functional blocks that perform operations similar to those of functional blocks (an information transmitter to an information output section) constituting the control unit of the external apparatus 70.

2-4. Configuration of Communication Control Apparatus

The communication control apparatus 40 is an apparatus that controls wireless communication of the base station apparatus 20. The communication control apparatus 40 may control wireless communication of the terminal apparatus 30 directly or via the base station apparatus 20. The communication control apparatus 40 may be a network manager that integrates and controls the wireless apparatuses within the network. For example, the communication control apparatus 40 may be a Spectrum Manager/Coexistence Manager. The communication control apparatus 40 may also be a database server such as a GLDB (Geolocation database) or a SAS (Spectrum Access System).

It is to be noted that, if the communication system 2 is a cellular communication system, the communication control apparatus 40 may be an apparatus constituting a core network. A core network CN is, for example, an EPC (Evolved Packet Core) or a 5GC (5G Core network). If the core network is an EPC, the communication control apparatus 40 may be, for example, an apparatus having a function as an MME (Mobility Management Entity). Further, if the core network is a 5GC, the communication control apparatus 40 may be, for example, an apparatus having a function as an AMF (Access and Mobility Management Function). It is to be noted that, even in a case where the communication system 2 is a cellular communication system, the communication control apparatus 40 may not necessarily be an apparatus that constitutes a core network. For example, the communication control apparatus 40 may be an apparatus having a function as an RNC (Radio Network Controller).

It is to be noted that the communication control apparatus 40 may have a function of a gateway. For example, if the core network is an EPC, the communication control apparatus 40 may be an apparatus having a function as a S-GW (Serving Gateway) or a P-GW (Packet Data Network Gateway). Further, if the core network is a 5GC, the communication control apparatus 40 may be an apparatus having a function as a UPF (User Plane Function). It is to be noted that the communication control apparatus 40 may not necessarily be an apparatus constituting the core network. For example, assume that the core network is a core network of W-CDMA or cdma2000. In this case, the communication control apparatus 40 may be an apparatus that functions as an RNC (Radio Network Controller).

The communication control apparatus 40 may also be a system that controls a plurality of secondary systems. In this case, the communication system 2 may be regarded as a system including a plurality of secondary systems.

Figure 10:
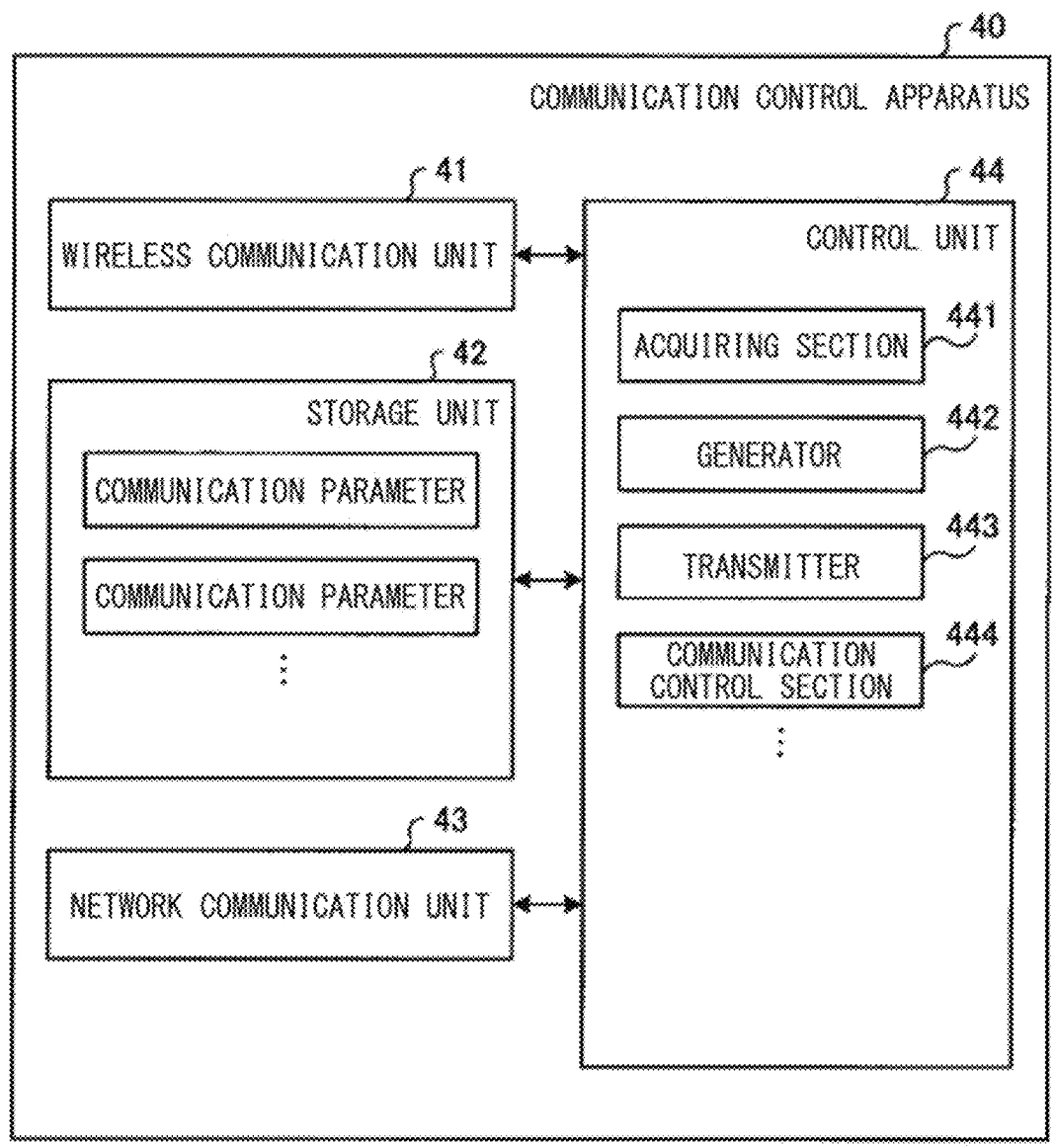
FIG. 10 is a diagram illustrating a configuration example of a communication control apparatus according to the embodiment of the present disclosure.

FIG. 10 is a diagram illustrating a configuration example of the communication control apparatus 40 according to the embodiment of the present disclosure. The communication control apparatus 40 includes a wireless communication unit 41, a storage unit 42, a network communication unit 43, and a control unit 44. It is to be noted that the configuration illustrated in FIG. 10 is a functional configuration, and a hardware configuration may be different from this. Further, the functions of the communication control apparatus 40 may be implemented in a distributed manner in a plurality of physically separated components. For example, the communication control apparatus 40 may include a plurality of server apparatuses.

The wireless communication unit 41 is a wireless communication interface that wirelessly communicates with another communication apparatus (e.g., the base station apparatus 20, the terminal apparatus 30, the proxy apparatus 50, the server apparatus 60, the external apparatus 70, and another communication control apparatus 40). The wireless communication unit 41 operates under the control of the control unit 44. The wireless communication unit 31 supports one or more wireless access schemes. For example, the wireless communication unit 31 supports both NR and LTE. The wireless communication unit 31 may support another wireless access scheme, such as W-CDMA or cdma2000. The configuration of the wireless communication unit 41 is similar to the configuration of the wireless communication unit 21 of the base station apparatus 20.

The storage unit 42 is a data-readable/writable storage apparatus such as a DRAM, an SRAM, a flash memory, or a hard disk. The storage unit 22 functions as a storage means of the base station apparatus 20. The storage unit 22 stores operation parameters of each of the plurality of base station apparatuses 20 constituting the communication system 2. It is to be noted that the storage unit 22 may store the possessed resource information of each of the plurality of base station apparatuses 20 constituting the communication system 2. As described above, the possessed resource information is information related to the possession of radio resources of the base station apparatus 20.

The network communication unit 43 is a communication interface for communication with another apparatus (e.g., the base station apparatus 20, the proxy apparatus 50, the server apparatus 60, the external apparatus 70, and another communication control apparatus 40). The network communication unit 43 may be a network interface or an equipment connection interface. For example, the network communication unit 43 may be a LAN (Local Area Network) interface such as a NIC (Network Interface Card). The network communication unit 43 may also be a USB interface including a USB (Universal Serial Bus) host controller, a USB port, and the like. Further, the network communication unit 43 may be a wired interface or a wireless interface. The network communication unit 43 functions as a communication means of the communication control apparatus 40. The network communication unit 43 communicates with the base station apparatus 20, the terminal apparatus 30, and the proxy apparatus 50 under the control of the control unit 44.

The control unit 44 is a controller that controls each part of the communication control apparatus 40. The control unit 44 is, for example, implemented by a processor such as a CPU or an MPU. For example, the control unit 44 is implemented by the processor executing a variety of programs stored in the storage apparatus inside the communication control apparatus 40 by using a RAM, etc. as a work area. It is to be noted that the control unit 44 may be implemented by an integrated circuit such as an ASIC or a FPGA. The CPU, the MPU, the ASIC, and the FPGA may all be regarded as controllers.

The control unit 44 includes an acquiring section 441, a generator 442, a transmitter 443, and a communication control section 444 as illustrated in FIG. 10. The blocks (the acquiring section 441 to the communication control section 444) constituting the control unit 44 are functional blocks that indicate the functions of the control unit 44. These functional blocks may be software blocks or hardware blocks. For example, the functional blocks described above may each be one software module implemented by software (including a microprogram) or may be one circuit block on a semiconductor chip (die). Needless to say, the functional blocks may each be one processor or one integrated circuit. The functional block may be configured by any method. It is to be noted that the control unit 44 may be configured in functional units different from the functional blocks described above.

The blocks (the acquiring section 441 to the communication control section 444) constituting the control unit 44 may operate as follows.

(Discovery-Related Process)

For example, the blocks constituting the control unit 44 may perform a discovery process described in <6. Discovery-related Operation> to be described later.

For example, the acquiring section 441 may acquire designation information for designating an area or a space together with identification information for identifying a plurality of pieces of secondary use information related to secondary use of radio waves of a frequency band used by the first wireless system. Then, the generator 442 may generate designated secondary use information in a designated area or a designated space designated by the designation information. The designated secondary use information is a designated piece of secondary use information designated by the identification information from among the plurality of pieces of secondary use information. Then, the transmitter 443 may transmit the designated secondary use information generated by the generator 442.

In this case, the communication control apparatus 40 may include the communication control section 444 that performs control related to use, by the second wireless system (e.g., the base station apparatus 20 of the communication system), of the radio waves of the frequency band used by the first wireless system (e.g., the communication system 1). The second wireless system performs wireless communication by making secondary use of the radio waves. Then, the generator 442 may generate designated secondary use information in the designated area or the designated space on the basis of information (e.g., communication parameters of the base station apparatus 20) accumulated in association with control related to secondary use of the radio waves.

It is to be noted that the communication control section 444 may accumulate, in another apparatus (e.g., the server apparatus 60, etc.), information associated with control related to secondary use of radio waves. In this case, the generator 442 may acquire the accumulated information (hereinafter referred to as accumulated information) from the other apparatus. Then, the generator 442 may generate designated secondary use information on the basis of the accumulated information acquired from the other apparatus.

(Available Frequency-Related Process)

Further, the blocks constituting the control unit 44 may perform a process described in <6-4. Available-Frequency Information> to be described later.

For example, a plurality of pieces of secondary use information that is designatable by the identification information may include information about an available frequency that is a frequency of which secondary use is possible in a designated area or a designated space. Then, in a case where information about the available frequency is designated by the identification information, the generator 442 may generate information about the available frequency in the designated area or the designated space as designated secondary use information.

In this case, the generator 442 may generate the information about the available frequency in the designated area or the designated space on the basis of information about the available frequency that is information accumulated in association with control related to use, by the second wireless system, of the radio waves of the frequency band used by the first wireless system, and that is provided to the second wireless system located in the designated area or the designated space. The second wireless system performs wireless communication by making secondary use of the radio waves.

In this case, the generator 442 may acquire, as the information about the available frequency in the designated area or the designated space, information about an available frequency common to a plurality of second wireless systems specified on the basis of information about the available frequency that is information accumulated in association with control related to use of the radio waves by the second wireless system, and that is provided to a plurality of second wireless systems located in the designated area or the designated space.

(Process Related to Maximum Allowable Transmission Power Range at Available Frequency)

Further, the blocks constituting the control unit 44 may perform a process described in <6-5. Maximum Allowable Transmission Power Range at Available Frequency> to be described later.

For example, a plurality of pieces of secondary use information that is designatable by the identification information may include information about a maximum allowable transmission power range at an available frequency that is a frequency of which secondary use is possible in a designated area or a designated space. Then, in a case where the information about the maximum allowable transmission power range is designated by the identification information, the generator 442 may generate, as designated secondary use information, information about the maximum allowable transmission power range at the available frequency in the designated area or the designated space.

In this case, the generator 442 may generate information about the maximum allowable transmission power range at the available frequency in the designated area or the designated space on the basis of information about allowable transmission power that is information accumulated in association with use, by the second wireless system, of the radio waves of the frequency band used by the first wireless system, and that is provided to the second wireless system located in the designated area or the designated space. The second wireless system performs wireless communication by making secondary use of the radio waves.

Alternatively, the generator 442 may acquire, as the information about the maximum allowable transmission power range at the available frequency, information about a range whose minimum value and maximum value are respectively allowable transmission power at the available frequency at a point nearest an interference protection point in the designated area or the designated space and allowable transmission power at the available frequency at a point farthest from the interference protection point in the designated area or the designated space.

(Process Related to Recommended-Frequency Information)

Further, the blocks constituting the control unit 44 may perform a process described in <6-6. Recommended-Frequency Information> to be described later.

For example, a plurality of pieces of secondary use information that is designatable by the identification information may include information about a recommended frequency that is a frequency of which use is recommended in a case where secondary use of radio waves is made in a designated area or a designated space. Then, in a case where the information about the recommended frequency is designated by the identification information, the generator 442 may generate information about a recommended frequency in the designated area or the designated space as the designated secondary use information.

In this case, the generator 442 may generate information about the recommended frequency on the basis of information about a frequency being used by the second wireless system (e.g., the base station apparatus 20 of the communication system 2) that performs wireless communication by making secondary use of the radio waves of the frequency band used by the first wireless system and is located in the designated area or the designated space, and information about the available frequency that is a frequency of which secondary use is possible in the designated area or the designated space.

In this case, the generator 442 may acquire, as the information about the recommended frequency, information about available frequencies excluding the frequency being used.

(Process Related to Recommended Transmission Power Range at Recommended Frequency)

Further, the blocks constituting the control unit 44 may perform a process described in <6-7. Recommended Transmission Power Range at Recommended Frequency> to be described later.

For example, a plurality of pieces of secondary use information that is designatable by the identification information may include information about a maximum allowable transmission power range at a recommended frequency that is a frequency of which use is recommended in a case where secondary use of radio waves is made in a designated area or a designated space. Then, in a case where information about the recommended frequency is designated by the identification information, the generator 442 may generate information about a maximum allowable transmission power range at the recommended frequency as designated secondary use information in the designated area or the designated space.

In this case, the generator 442 may generate information about the maximum allowable transmission power range at the recommended frequency on the basis of information about allowable transmission power that is information accumulated in association with control related to use, by the second wireless system (e.g., the base station apparatus 20 of the communication system 2), of the radio waves of the frequency band used by the first wireless system, and that is provided to the second wireless system located in the designated area or the designated space. The second wireless system performs wireless communication by making secondary use of the radio waves.

Alternatively, the generator 442 may acquire, as the information about the maximum allowable transmission power range at the recommended frequency, information about a range whose minimum value and maximum value are respectively allowable transmission power at the recommended frequency at the point nearest the interference protection point in the designated area or the designated space and allowable transmission power at the recommended frequency at the point farthest from the interference protection point in the designated area or the designated space.

(Process Related to Use Prohibited-Frequency Information)

Further, the blocks constituting the control unit 44 may perform a process described in <6-8. Use Prohibited-Frequency Information> to be described later.

For example, a plurality of pieces of secondary use information that is designatable by the identification information may include information about a use prohibited frequency that is a frequency of which secondary use is not possible in a designated area or a designated space. Then, in a case where information about the use prohibited frequency is designated by the identification information, the generator 442 may generate information about the use prohibited frequency as designated secondary use information in the designated area or the designated space.

(Process Related to Recommended-Installation Position Information)

Further, the blocks constituting the control unit 44 may perform a process described in <6-9. Recommended-Installation Position Information> to be described later.

For example, a plurality of pieces of secondary use information that is designatable by the identification information may include information about a recommended installation position that is a position recommended for installation in a case where a communication apparatus that makes secondary use of radio waves is to be installed in the designated area or the designated space. Then, in a case where information about the recommended installation position is designated by the identification information, the generator 442 may generate information about the recommended installation position as designated secondary use information in the designated area or the designated space.

In this case, the generator 442 may separate the designated area or the designated space into grids, determines whether or not each of the grids is a recommended position for installation, and acquires, as the information about the recommended installation position, a set of positions determined to be recommended.

Other operations of the blocks constituting the control unit 44 will be described later.

2-5. Configuration of Proxy Apparatus

Figure 11:
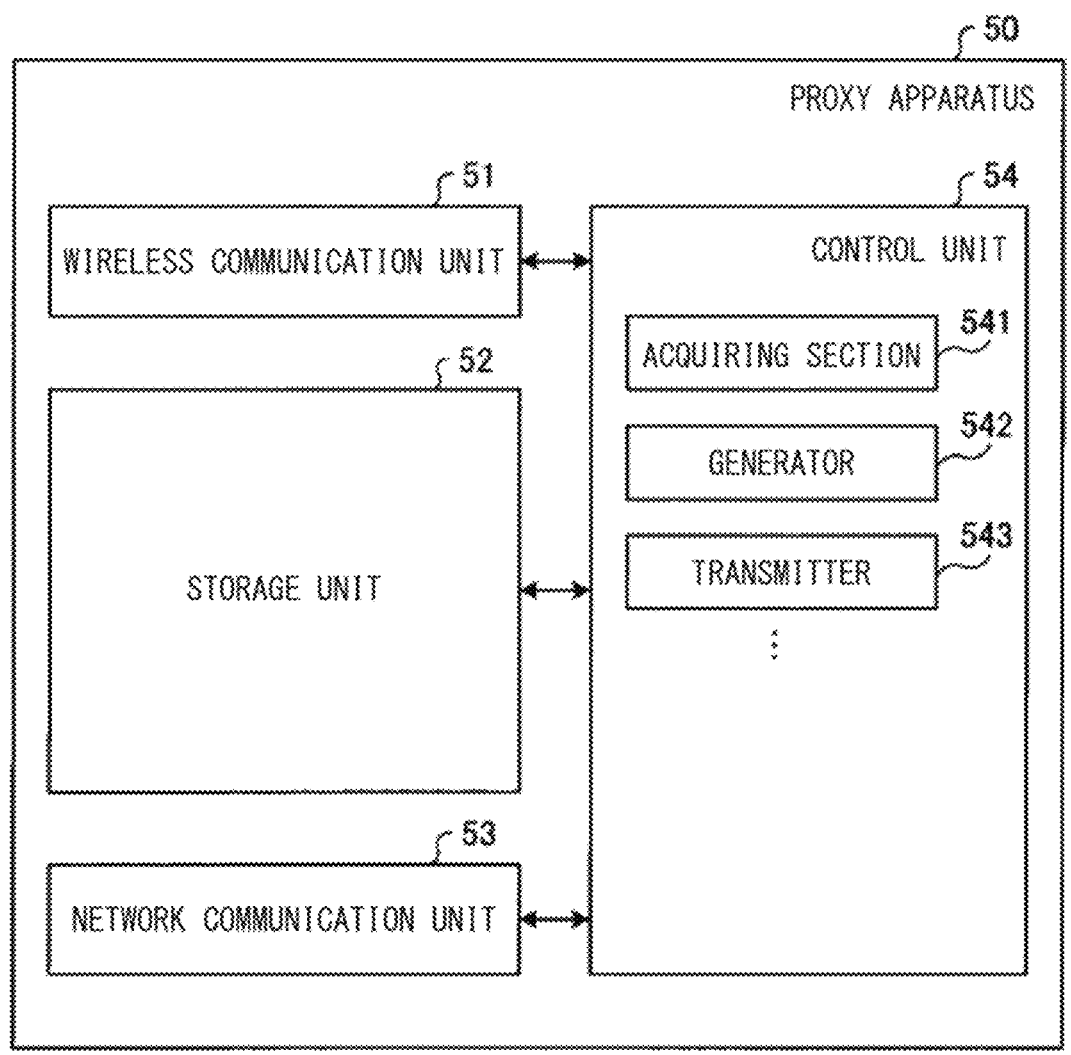
FIG. 11 is a diagram illustrating a configuration example of a proxy apparatus according to the embodiment of the present disclosure.

Next, the configuration of the proxy apparatus 50 will be described. FIG. 11 is a diagram illustrating a configuration example of the proxy apparatus 50 according to the embodiment of the present disclosure. The proxy apparatus 50 is a communication apparatus that communicates with the base station apparatus 20 and the communication control apparatus 40. The proxy apparatus 50 is a proxy system that acts on behalf of (as a representative for) one or more base station apparatuses 20 to communicate with the communication control apparatus 40. For example, the proxy apparatus 50 is a domain proxy (DP: Domain Proxy) that acts on behalf of (as a representative for) a plurality of CBSDs.

It is to be noted that the proxy system may include one apparatus, or may include a plurality of apparatuses. The communication between the proxy apparatus 50 and the base station apparatus 20 may be wired communication or wireless communication. Similarly, the communication between the proxy apparatus 50 and the communication control apparatus 40 may be wired communication or wireless communication.

It is to be noted that the communication apparatus on behalf of which the proxy apparatus 50 acts (as a representative) is not limited to the base station apparatus 20 and may be, for example, the terminal apparatus 30. In the following description, one or more communication apparatuses (e.g., one or more base station apparatuses 20) on behalf of which the proxy apparatus 50 acts (as a representative) may be referred to as subordinate communication apparatuses (e.g., subordinate base station apparatuses 20).

The proxy apparatus 50 includes a wireless communication unit 51, a storage unit 52, a network communication unit 53, and a control unit 54. It is to be noted that the configuration illustrated in FIG. 11 is a functional configuration, and a hardware configuration may be different from this. Further, the functions of the proxy apparatus 50 may be implemented in a distributed manner in a plurality of physically separated components.

The wireless communication unit 51 is a wireless communication interface that wirelessly communicates with another communication apparatus (e.g., the base station apparatus 20, the terminal apparatus 30, the communication control apparatus 40, the server apparatus 60, the external apparatus 70, and another proxy apparatus 50). The wireless communication unit 51 operates under the control of the control unit 54. The wireless communication unit 51 supports one or more wireless access schemes. For example, the wireless communication unit 31 supports both NR and LTE. The wireless communication unit 51 may support another wireless access scheme, such as W-CDMA or cdma2000.

The storage unit 52 is a data-readable/writable storage apparatus such as a DRAM, an SRAM, a flash memory, or a hard disk. The storage unit 52 functions as a storage means of the proxy apparatus 50. The storage unit 22 may store the desired transmission power information, the operation parameters, the possessed resource information, and the like of each of the subordinate base station apparatuses 20.

The network communication unit 53 is a communication interface for communication with another apparatus (e.g., the base station apparatus 20, the communication control apparatus 40, the server apparatus 60, the external apparatus 70, and another proxy apparatus 50). For example, the network communication unit 53 is a LAN interface such as a NIC. The network communication unit 53 may be a USB interface including a USB host controller, a USB port, and the like. Further, the network communication unit 53 may be a wired interface or a wireless interface. The network communication unit 53 functions as a network communication means of the proxy apparatus 50. The network communication unit 53 communicates with the other apparatus under the control of the control unit 54.

The control unit 54 is a controller that controls each part of the proxy apparatus 50. The control unit 54 is, for example, implemented by a processor such as a CPU or an MPU. For example, the control unit 54 is implemented by the processor executing a variety of programs stored in the storage apparatus inside the proxy apparatus 50 by using a RAM, etc. as a work area. It is to be noted that the control unit 24 may be implemented by an integrated circuit such as an ASIC or a FPGA. The CPU, the MPU, the ASIC, and the FPGA may all be regarded as controllers.

The control unit 54 includes an acquiring section 541, a generator 542, and a transmitter 543, as illustrated in FIG. 11. The blocks (the acquiring section 541 to the transmitter 543) constituting the control unit 54 are functional blocks that indicate the functions of the control unit 54. These functional blocks may be software blocks or hardware blocks. For example, the functional blocks described above may each be one software module implemented by software (including a microprogram) or may be one circuit block on a semiconductor chip (die). Needless to say, the functional blocks may each be one processor or one integrated circuit. The functional block may be configured by any method. It is to be noted that the control unit 54 may be configured in functional units different from the functional blocks described above.

The blocks (the acquiring section 541 to the transmitter 543) constituting the control unit 64 may operate as follows, for example.

For example, the acquiring section 541 acquires designation information for designating an area or space together with identification information for identifying a plurality of pieces of secondary use information related to secondary use of radio waves of a frequency band used by the first wireless system (e.g., the communication system 1). Then, the generator 542 generates designated secondary use information in a designated area or a designated space designated by the designation information. The designated secondary use information is a designated piece of secondary use information designated by the identification information from among the plurality of pieces of secondary use information. Then, the transmitter 543 transmits the designated secondary use information generated by the generator 542.

In this case, the acquiring section 541 acquires information accumulated by one or a plurality of communication control apparatuses 40 in association with control related to use of radio waves. The one or plurality of communication control apparatuses 40 performs control related to secondary use, by the second wireless system (e.g., the base station apparatus 20 of the communication system), of radio waves of a frequency band used by the first wireless system. The second wireless system performs wireless communication by making secondary use of the radio waves. Then, the generator 542 generates designated secondary use information in the designated area or the designated space on the basis of the information accumulated in association with control related to use of the radio waves.

It is to be noted that the acquiring section 541 may acquire, from the communication control apparatus 40, information accumulated by the communication control apparatus 40 (hereinafter referred to as accumulated information) in association with control related to secondary use of the radio waves. In a case where the accumulated information has been already recorded in the storage unit 52, the acquiring section 541 may acquire the accumulated information from the storage unit 52. Needless to say, the acquiring section 541 may acquire the accumulated information from another apparatus (e.g., the server apparatus 60).

The operations of the blocks (the acquiring section 541 to the transmitter 543) constituting the control unit 54 may be the same as the operations of the blocks (the acquiring section 441 to the transmitter 443) constituting the control unit 44 of the communication control apparatus 40. The description of the acquiring section 441 to the transmitter 443 appearing in the following description may be replaced with the acquiring section 541 to the transmitter 543.

2-6. Configuration of Server Apparatus

Figure 12:
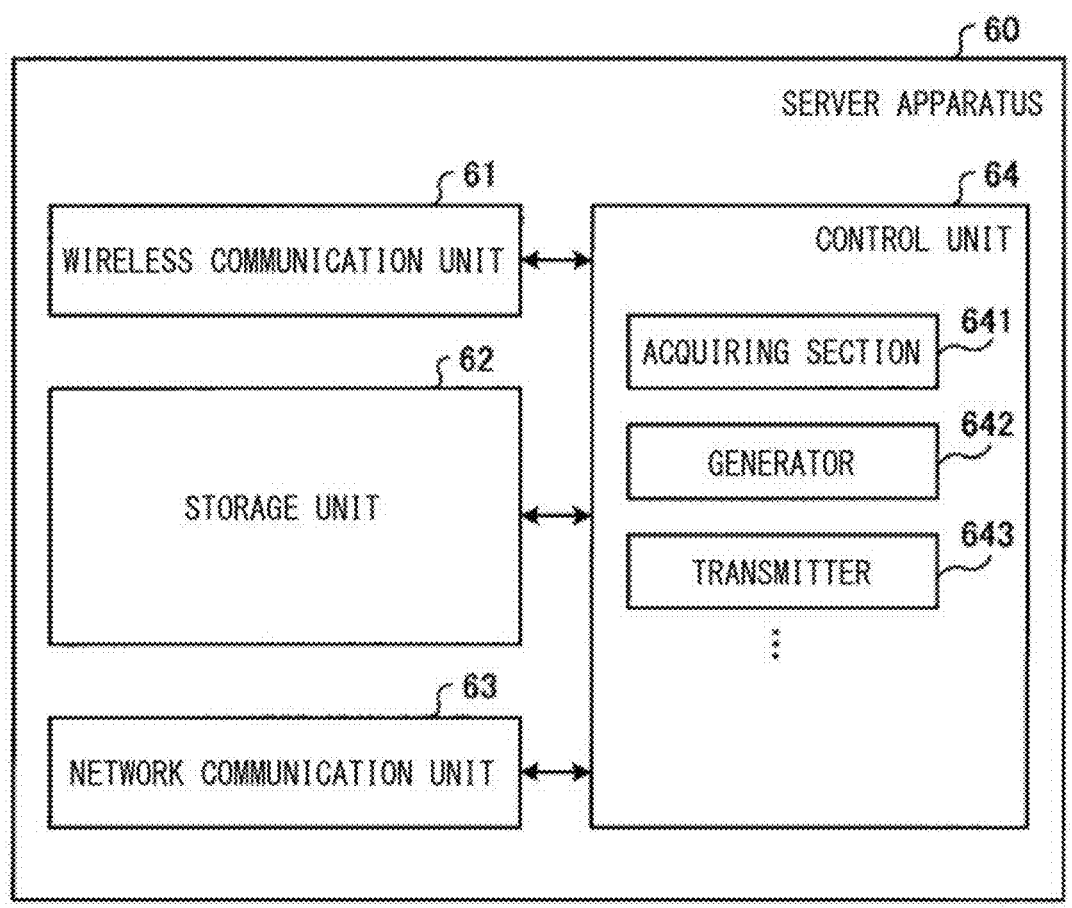
FIG. 12 is a diagram illustrating a configuration example of a server apparatus according to the embodiment of the present disclosure.

Next, the configuration of the server apparatus 60 will be described. FIG. 12 is a diagram illustrating a configuration example of the server apparatus 60 according to the embodiment of the present disclosure. The server apparatus 60 is a communication apparatus that wirelessly communicates with the communication control apparatus 40 or the like. The server apparatus 60 functions as a database that stores process result information (communication parameters, etc. of the base station apparatus 20) of the communication control apparatus 40. It is to be noted that in the present embodiment, the concept of a communication apparatus (or a wireless communication apparatus) includes not only a base station apparatus and a proxy apparatus but also a server apparatus.

The server apparatus 60 includes a wireless communication unit 61, a storage unit 62, a network communication unit 63, and a control unit 64. It is to be noted that the configuration illustrated in FIG. 12 is a functional configuration, and a hardware configuration may be different from this. Further, the functions of the server apparatus 60 may be implemented in a distributed manner in a plurality of physically separated components.

The wireless communication unit 61 is a wireless communication interface that wirelessly communicates with another communication apparatus (e.g., the communication control apparatus 40, the proxy apparatus 50, and another server apparatus 60). The wireless communication unit 61 operates under the control of the control unit 64. The wireless communication unit 61 supports one or more wireless access schemes. For example, the wireless communication unit 61 supports both NR and LTE. The wireless communication unit 61 may support another wireless access scheme, such as W-CDMA or cdma2000. The configuration of the wireless communication unit 61 is similar to the configuration of the wireless communication unit 21 of the base station apparatus 20.

The storage unit 62 is a data-readable/writable storage apparatus such as a DRAM, an SRAM, a flash memory, or a hard disk. The storage unit 62 functions as a storage means of the server apparatus 60. The storage unit 62 stores a process result and the like by the communication control apparatus 40.

The network communication unit 63 is a communication interface for communication with another apparatus (e.g., the communication control apparatus 40, the proxy apparatus 50, and another server apparatus 60). For example, the network communication unit 63 is a LAN interface such as a NIC. The network communication unit 63 may be a USB interface including a USB host controller, a USB port, and the like. Further, the network communication unit 53 may be a wired interface or a wireless interface. The network communication unit 63 functions as a network communication means of the server apparatus 60. The network communication unit 63 communicates with the other apparatus under the control of the control unit 64.

The control unit 64 is a controller that controls each part of the server apparatus 60. The control unit 54 is, for example, implemented by a processor such as a CPU or an MPU. For example, the control unit 54 is implemented by the processor executing a variety of programs stored in the storage apparatus inside the server apparatus 60 by using a RAM, etc. as a work area. It is to be noted that the control unit 24 may be implemented by an integrated circuit such as an ASIC or a FPGA. The CPU, the MPU, the ASIC, and the FPGA may all be regarded as controllers.

The control unit 64 includes an acquiring section 641, a generator 642, and a transmitter 643, as illustrated in FIG. 12. The blocks (the acquiring section 641 to the transmitter 643) constituting the control unit 64 are functional blocks that indicate functions of the control unit 64. These functional blocks may be software blocks or hardware blocks. For example, the functional blocks described above may each be one software module implemented by software (including a microprogram) or may be one circuit block on a semiconductor chip (die). Needless to say, the functional blocks may each be one processor or one integrated circuit. The functional block may be configured by any method. It is to be noted that the control unit 64 may be configured in functional units different from the functional blocks described above.

The blocks (the acquiring section 641 to the transmitter 643) constituting the control unit 64 may operate as follows, for example.

For example, the acquiring section 641 acquires designation information for designating an area or space together with identification information for identifying a plurality of pieces of secondary use information related to secondary use of radio waves of a frequency band used by the first wireless system (e.g., the communication system 1). Then, the generator 642 generates designated secondary use information in a designated area or designated space designated by the designation information. The designated secondary use information is a designated piece of secondary use information designated by the identification information from among the plurality of pieces of secondary use information. Then, the transmitter 643 transmits the designated secondary use information generated by the generator 442.

In this case, the acquiring section 641 acquires information accumulated by one or a plurality of communication control apparatuses 40 in association with control related to use of radio waves. The one or plurality of communication control apparatuses 40 performs control related to secondary use, by the second wireless system (e.g., the base station apparatus 20 of the communication system 2), of radio waves of a frequency band used by the first wireless system. The second wireless system performs wireless communication by making secondary use of the radio waves. Then, the generator 642 generates designated secondary use information in the designated area or the designated space on the basis of the information accumulated in association with control related to use of the radio waves.

It is to be noted that the acquiring section 641 may acquire, from the communication control apparatus 40, information accumulated by the communication control apparatus 40 (hereinafter referred to accumulated information) in association with control related to secondary use of the radio waves. In a case where the accumulated information has been already recorded in the storage unit 62, the acquiring section 641 may acquire the accumulated information from the storage unit 62. Needless to say, the acquiring section 641 may acquire the accumulated information from another apparatus (e.g., the server apparatus 60).

It is to be noted that the operations of the blocks (the acquiring section 641 to the transmitter 643) constituting the control unit 64 may be the same as the operations of the blocks (the acquiring section 441 to the transmitter 443) constituting the control unit 44 of the communication control apparatus 40. The description of the acquiring section 441 to the transmitter 443 appearing in the following description may be replaced with the acquiring section 641 to the transmitter 643.

2-7. Configuration of External Apparatus

Figure 13:
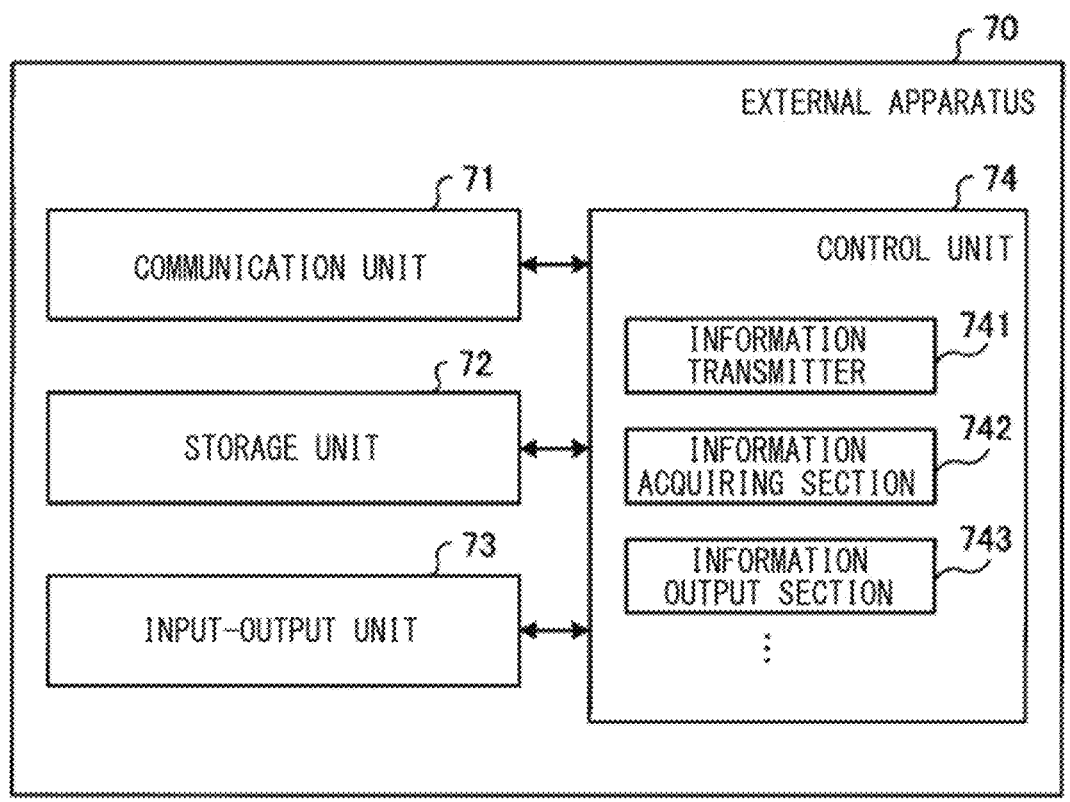
FIG. 13 is a diagram illustrating a configuration example of the external apparatus according to the embodiment of the present disclosure.

Next, the configuration of the external apparatus 70 will be described. FIG. 13 is a diagram illustrating a configuration example of the external apparatus 70 according to the embodiment of the present disclosure. The external apparatus 70 is a communication apparatus that wirelessly communicates with the communication control apparatus 40 or the like. It is to be noted that in the present embodiment, the concept of a communication apparatus (or a wireless communication apparatus) includes not only a base station apparatus and a proxy apparatus but also an external apparatus.

It is to be noted that the configuration of the external apparatus 70 may be similar to the configuration of the terminal apparatus 30. The terminal apparatus 30 may be regarded as the external apparatus 70. The external apparatus 70 is not limited to a user terminal such as a smart device and a personal computer, and may be, for example, a server apparatus. In a case where the server apparatus has a function of receiving secondary information from another apparatus (the communication control apparatus 40, etc.) and presenting the secondary information to the user (e.g., a function of outputting information to a display apparatus through a communication line), the server apparatus is one type of terminal apparatus. The terminal apparatus may also be referred to as an "information processing terminal apparatus", a "processing apparatus", an "information processing apparatus", etc.

The external apparatus 70 includes a communication unit 71, a storage unit 72, an input-output unit 73, and a control unit 74. It is to be noted that the configuration illustrated in FIG. 13 is a functional configuration, and a hardware configuration may be different from this. Further, the functions of the external apparatus 70 may be implemented in a distributed manner in a plurality of physically separated apparatuses.

The communication unit 71 is a wireless communication interface that wirelessly communicates with another communication apparatus (e.g., the base station apparatus 20, the terminal apparatus 30, the communication control apparatus 40, the proxy apparatus 50, the server apparatus 60, and another external apparatus 70). The communication unit 71 operates under the control of the control unit 34. The configuration of the communication unit 71 is similar to the configuration of the wireless communication unit 21 and/or the network communication unit 23 of the base station apparatus 20.

The storage unit 72 is a data-readable/writable storage apparatus such as a DRAM, an SRAM, a flash memory, or a hard disk. The storage unit 72 functions as a storage means of the external apparatus 70.

The input-output unit 73 is a user interface for exchange of information with a user. For example, the input-output unit 73 is an operation apparatus for the user to perform various operations, such as a keyboard, a mouse, an operation key, or a touch panel. Alternatively, the input-output unit 73 is a display apparatus such as a liquid crystal display (Liquid Crystal Display) or an organic EL display (Organic Electroluminescence Display). The input-output unit 73 may be an acoustic apparatus such as a loudspeaker or a buzzer. Further, the input-output unit 73 may be a lighting apparatus such as an LED (Light Emitting Diode) lamp. The input-output unit 73 functions as an input/output means (input means, output means, operation means, or notification means) of the external apparatus 70.

The control unit 74 is a controller that controls each part of the external apparatus 70. The control unit 74 is, for example, implemented by a processor such as a CPU or an MPU. For example, the control unit 74 is implemented by the processor executing a variety of programs stored in the storage apparatus inside the external apparatus 70 by using a RAM, etc. as a work area. It is to be noted that the control unit 74 may be implemented by an integrated circuit such as an ASIC or a FPGA. The CPU, the MPU, the ASIC, and the FPGA may all be regarded as controllers.

The control unit 74 includes an information transmitter 741, an information acquiring section 742, and an information output section 743, as illustrate in FIG. 12. The blocks (the information transmitter 741 to the information output section 743) constituting the control unit 74 are functional blocks that indicate the functions of the control unit 74. These functional blocks may be software blocks or hardware blocks. For example, the functional blocks described above may each be one software module implemented by software (including a microprogram) or may be one circuit block on a semiconductor chip (die). Needless to say, the functional blocks may each be one processor or one integrated circuit. The functional block may be configured by any method. It is to be noted that the control unit 74 may be configured in functional units different from the functional blocks described above.

The blocks (the information transmitter 741 to the information output section 743) constituting the control unit 74 may operate as follows, for example.

For example, the information transmitter 741 may transmit predetermined designation information together with predetermined identification information to an "information processing apparatus including an acquiring section and a generator" (e.g., the communication control apparatus 40, the proxy apparatus 50, and the server apparatus 60). The acquiring section acquires designation information designating an area or space together with identification information for identifying a plurality of pieces of secondary use information related to secondary use of radio waves of a frequency band used by the first wireless system. The generator generates designated secondary use information related to a designated area or a designated space designated by the designation information. The designated secondary use information is a designated piece of secondary use information designated by the identification information from among the plurality of pieces of secondary use information. Then, the information acquiring section 742 may acquire, from the information processing apparatus, predetermined secondary use information related to a designated area or a designated space designated by the predetermined designation information. The predetermined secondary use information is designated by the predetermined identification information. Then, the information output section 743 may output the predetermined secondary use information.

It is to be noted that the "information transmitter", the "information acquiring section", and the "information output section" may also be referred to as a "transmitter", an "acquiring section", and an "output section".

3. INTERFERENCE MODEL

Figure 14:
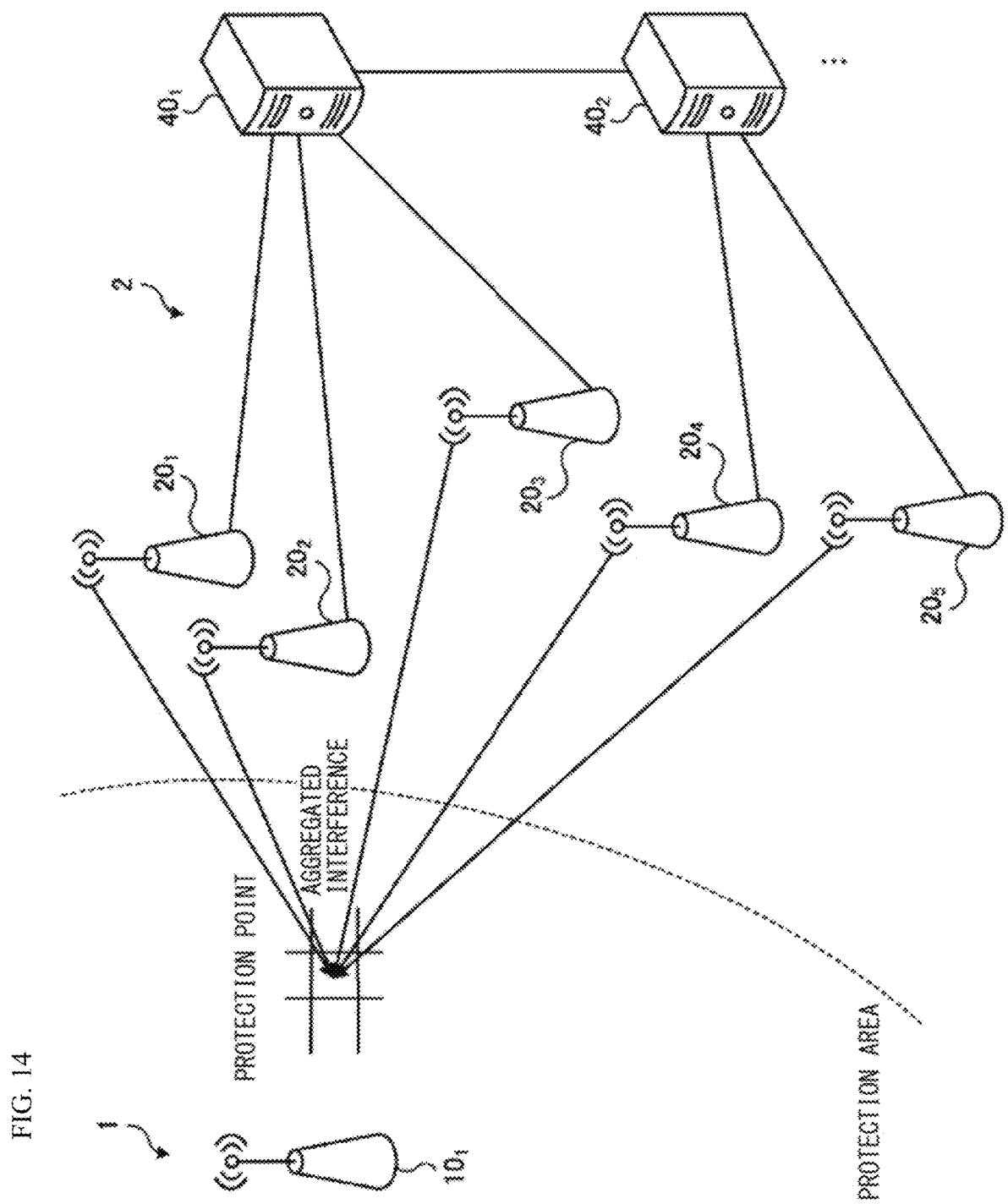
FIG. 14 is an explanatory diagram illustrating an example of an interference model assumed in the embodiment of the present disclosure.

Next, an interference model that is assumed in the present embodiment will be described. FIG. 14 is an explanatory diagram illustrating an example of the interference model assumed in the present embodiment. It is to be noted that the description of the base station apparatus 20 appearing in the following description may be replaced with a word indicating another communication apparatus having a wireless communication function.

The interference model illustrated in FIG. 14 is applied, for example, in a case where the primary system has a service area. In the example of FIG. 14, the communication system 1 (primary system) is a wireless communication system having a service area. This service area serves as, for example, a protection area of the communication system 1. In the protection area, a plurality of interference calculation reference points (hereinafter referred to as protection points) are set. The protection point is set by, for example, the operator of the communication system 1 or a public organization, etc. that manages radio waves (hereinafter referred to as an administrator). For example, the administrator may divide the protection area into grids, and set the center of a predetermined grid as the protection point. The protection point may be determined by any method. The interference margin of each protection point is set by the administrator, etc. FIG. 14 illustrates the interference caused to the protection point by the plurality of base station apparatuses 20 constituting the communication system 2 (secondary system). The communication control apparatus 40 of the communication system 2 controls the transmission power of the plurality of base station apparatuses 20 so that the aggregated interference at each protection point does not exceed the set interference margin.

Figure 15:
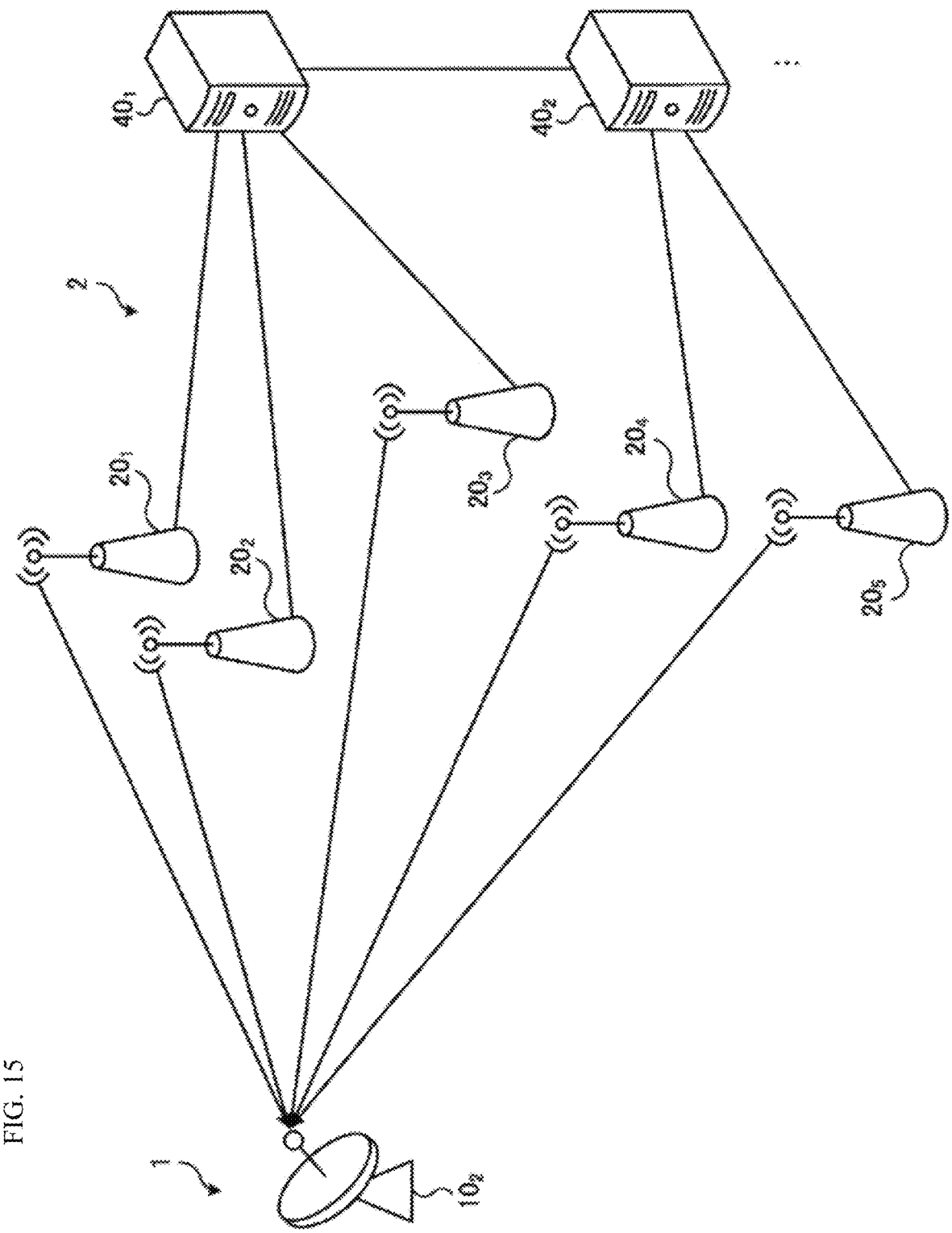
FIG. 15 is an explanatory diagram illustrating another example of an interference model assumed in the embodiment of the present disclosure.

FIG. 15 is an explanatory diagram illustrating another example of the interference model assumed in the present embodiment. The interference model illustrated in FIG. 15 is applied, for example, in a case where the primary system performs only reception. In the example of FIG. 15, the communication system 1 (primary system) includes a receiving antenna as a wireless communication apparatus 102. The wireless communication apparatus 102 is, for example, a receiving antenna of a satellite ground station. The communication control apparatus 40 of the communication system 2 regards the position of the receiving antenna as the protection point, and controls the transmission power of the plurality of base station apparatuses 20 so that the aggregated interference at that point does not exceed the interference margin.

4. PRIMARY SYSTEM PROTECTION METHOD

Next, a primary system protection method will be described. As described above, primary system protection methods are classifiable into the following two types, for example.

(1) Interference Margin Simultaneous Distribution Type
(2) Interference Margin Sequential Distribution Type It is to be noted that examples of the primary system protection method of the interference margin simultaneous distribution type include, for example, a technique disclosed in NPTL 3 (e.g., a technique of calculating the maximum allowable EIRP). Further, examples of the primary system protection method of the interference margin sequential distribution type include, for example, a sequential distribution process (IAP: Iterative Allocation Process) disclosed in NPTL 6.

The primary system protection method of the "interference margin simultaneous distribution type" and the primary system protection method of the "interference margin sequential distribution type" are described below. It is to be noted that the description of the base station apparatus 20 appearing in the following description may be replaced with a word indicating another communication apparatus having a wireless communication function.

4-1. Interference Margin Simultaneous Distribution Type

Figure 16:
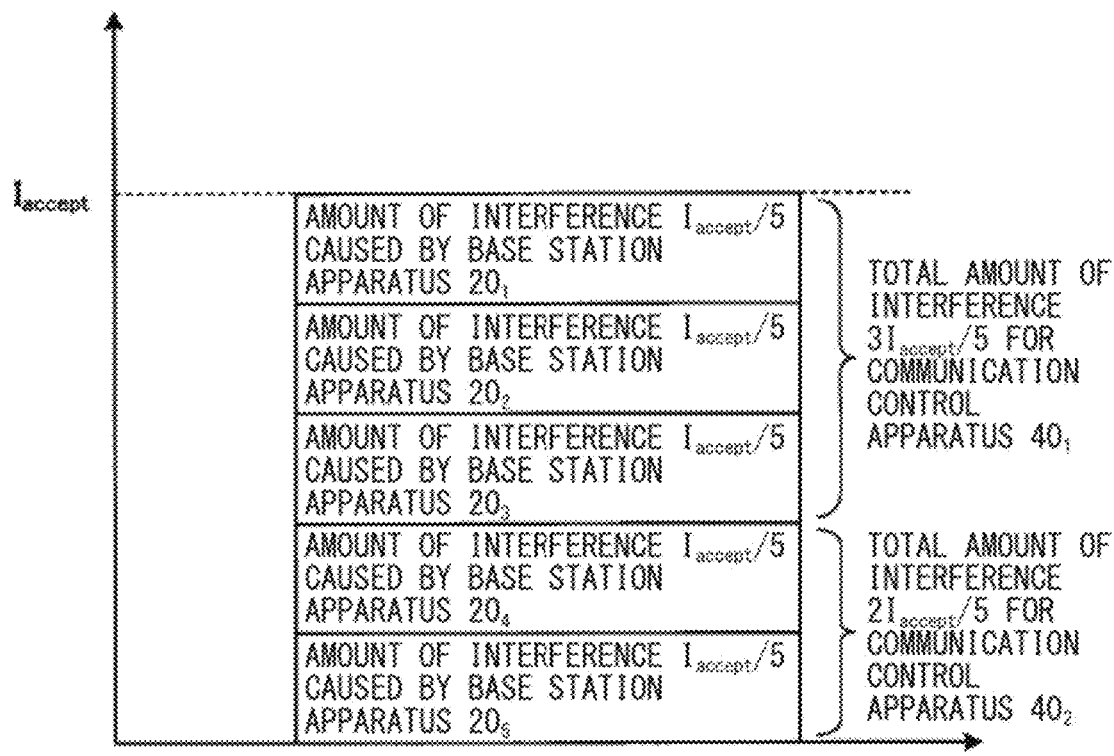
FIG. 16 is an explanatory diagram for explaining a primary system protection method of an interference margin simultaneous distribution type.

The primary system protection method of the interference margin simultaneous distribution type is described first. FIG. 16 is an explanatory diagram for explaining the primary system protection method of the interference margin simultaneous distribution type. As described above, in the interference margin simultaneous distribution type, the communication control apparatus 40 calculates the maximum allowable transmission power of the secondary system by using a "value uniquely determined by the positional relationship between the protection reference point of the primary system and the secondary system" as a reference value. In the example of FIG. 16, the allowable interference threshold of the primary system is $I_{accept}$. This threshold may be an actual threshold, or a value set by factoring in a certain margin (e.g., protection ratio (Protection Ratio)) from the actual threshold, in consideration of a calculation error and interference fluctuation.

In the primary system protection method of the interference margin simultaneous distribution type, interference control means determining transmission power (EIRP, Conducted Power+Antenna gain, etc.) of the wireless apparatus so as not to exceed the allowable interference threshold. In this case, if a large number of base station apparatuses 20 are present and each of them is made not to exceed the allowable interference threshold, interference power received by the communication system 1 (primary system) can exceed the allowable interference threshold. Hence, the interference margin (allowable amount of interference) is "distributed", on the basis of the number of the base station apparatuses 20 registered in the communication control apparatus 40.

For example, in the example of FIG. 16, the total number of the base station apparatuses 20 is five. Therefore, the allowable amount of interference of $I_{accept}/5$ is distributed individually. The base station apparatus 20 is unable to recognize this amount of distribution by itself. It therefore recognizes the amount of distribution through the communication control apparatus, or acquires transmission power determined on the basis of this amount of distribution. The communication control apparatus is unable to recognize the number of wireless apparatuses managed by another communication control apparatus. Therefore, information is exchanged with each other, which makes it possible to recognize the total number and distribute the allowable amount of interference. For example, the allowable amount of interference of $3I_{accept}/5$ is allocated within the communication control apparatus $40_1$.

Figure 17:
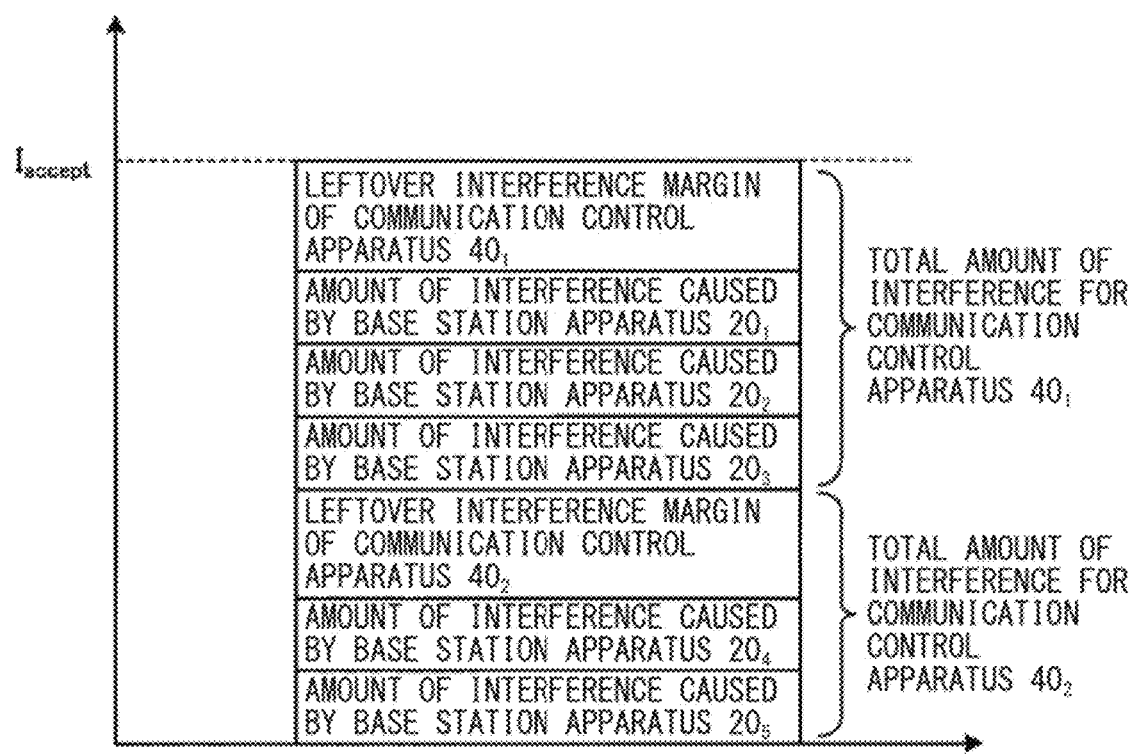
FIG. 17 is a diagram illustrating how a leftover interference margin occurs.

It is to be noted that, in this technique, the interference margin not used by the base station apparatus 20 may serve as a leftover interference margin. FIG. 17 is a diagram illustrating how the leftover interference margin occurs. FIG. 17 illustrates the total amount of interference set for each of the two communication control apparatuses 40 (the communication control apparatuses $40_1$ and $40_2$). FIG. 17 also illustrates the amount of interference (amount of caused interference) that the plurality of base station apparatuses 20 (the base station apparatuses $20_1$ to $20_5$) managed by the two communication control apparatuses 40 cause to a predetermined protection point of the communication system 1. An amount of interference that is obtained by subtracting the amounts of interference provided by the base station apparatuses 20 from the total amount of interference for each of the two communication control apparatuses 40 is the leftover interference margin. In the following description, the extra amount of interference is called a leftover interference margin. The leftover interference margin may also be referred to as a leftover amount of interference.

4-2. Interference Margin Sequential Distribution Type

Figure 18:
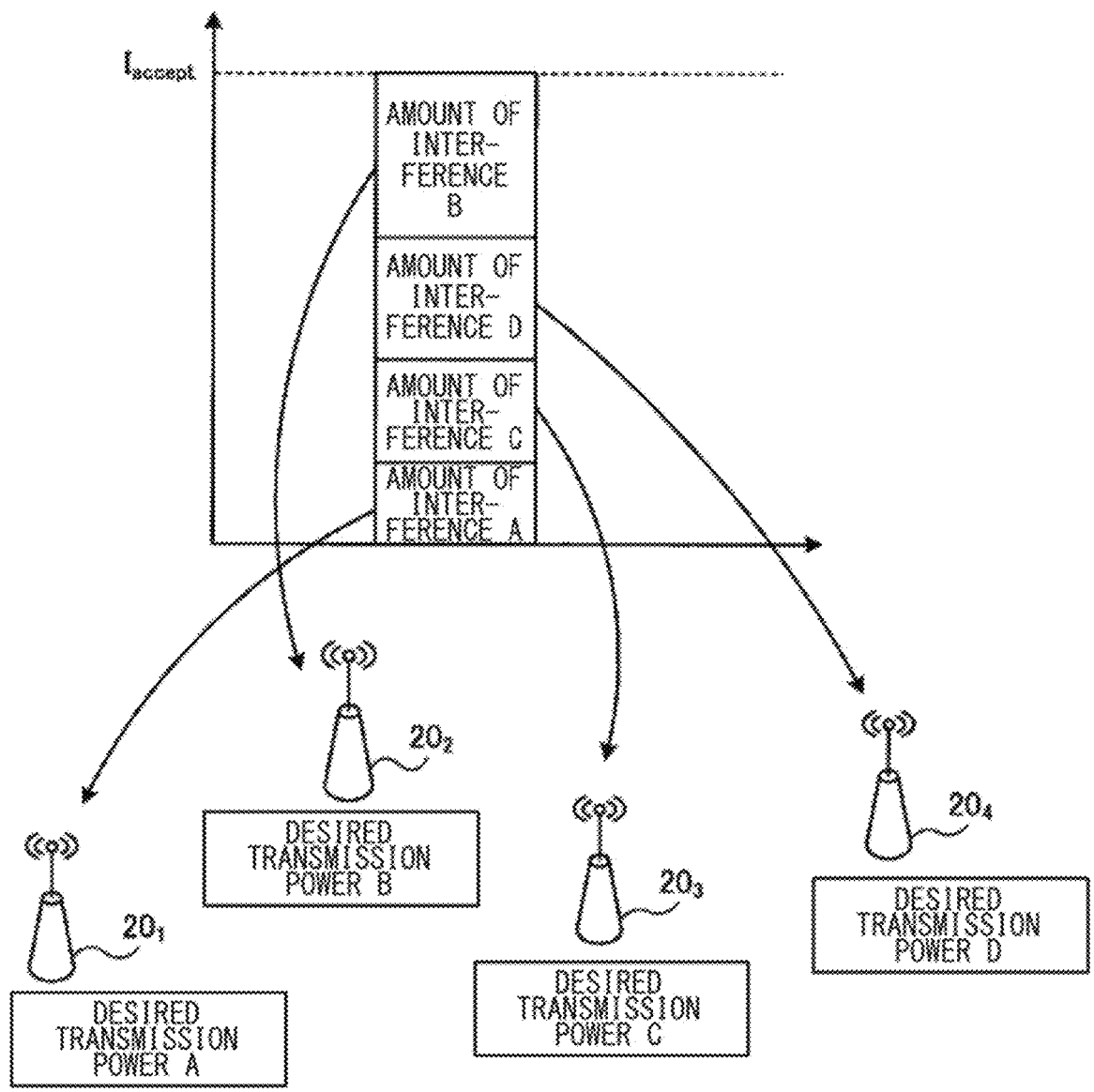
FIG. 18 is an explanatory diagram for explaining a primary system protection method of an interference margin sequential distribution type.

Next, the primary system protection method of the interference margin sequential distribution type will be described. As described above, in the interference margin sequential distribution type, the communication control apparatus 40 calculates the maximum allowable transmission power of the secondary system by using the "desired transmission power of the secondary system" as a reference value. FIG. 18 is an explanatory diagram for explaining the primary system protection method of the interference margin sequential distribution type. In the interference margin sequential distribution type, for example, each of the plurality of base station apparatuses 20 stores the desired transmission power information in the storage unit 22. The desired transmission power information is information about transmission power that the base station apparatus 20 requests of the communication control apparatus 40 as information about transmission power necessary to transmit radio waves. In the example of FIG. 18, the base station apparatuses $20_1$ to $20_4$ hold desired transmission power information A to D, respectively. The communication control apparatus 40 allocates amounts of interference A to D to the base station apparatuses $20_1$ to $20_4$, respectively, on the basis of the desired transmission power information A to D.

5. DESCRIPTION OF PROCEDURES

Next, procedures that may occur between entities in the communication system 2 will be described. It is to be noted that the description of the base station apparatus 20 appearing in the following description may be replaced with a word indicating another communication apparatus having a wireless communication function.

5-1. Registration Procedure (Registration Procedure)

The registration procedure is a procedure of registering device parameters related to the base station apparatus 20 in the communication control apparatus 40. Typically, the registration procedure is started by the base station apparatus 20 or one or more communication systems including a plurality of base station apparatuses 20 notifying the communication control apparatus 40 of a registration request including the device parameters. The registration request may be transmitted by a communication system (e.g., a proxy system such as the proxy apparatus 50) acting on behalf of (as a representative for) the one or more base station apparatuses 20.

In the following description, the communication system acting on behalf of (as a representative for) the plurality of base station apparatuses 20 is assumed to be the proxy apparatus 50. However, the word of the proxy apparatus 50 that appears in the following description may be replaced with a word that indicates another communication system acting on behalf of (as a representative for) a communication apparatus, such as a proxy system.

(Details of Desired Parameters)

Device parameters refer to the following information, for example.

Communication-apparatus-unique information
    Position information
    Antenna information
    Wireless interface information
    Legal information
    Installer information In implementation, information other than these may be treated as device parameters.

The communication-apparatus-unique information is information allowing identification of the base station apparatus 20, information related to hardware of the base station apparatus 20, etc. For example, a serial number, a product model number, and the like may be included.

The information allowing identification of the base station apparatus 20 refers to communication apparatus user information, a communication apparatus serial number, etc. For example, a user ID, a call sign, and the like may be assumed as the communication apparatus user information. The user ID may be originally generated by a communication apparatus user or may be pre-issued by the communication control apparatus 40.

The information related to the hardware of the base station apparatus 20 may include, for example, transmission power class information, manufacturer information, and the like. As the transmission power class information, for example, FCC C.F.R Part 96 specifies two classes of Category A and Category B, and either information may be included. Further, 3GPP TS 36.104 and TS 38.104 specify some classes of eNodeBs and gNodeBs, and these may also be used.

Information related to software of the base station apparatus 20 may include, for example, version information, a build number, etc. related to an executable program that describes processing necessary for interaction with the communication control apparatus 40. It may also include version information, a build number, etc. of software for operation as the base station apparatus 20.

The position-related information is typically information that allows identification of a geolocation of the base station apparatus 20. For example, it is coordinate information acquired by a positioning function typified by a GPS (Global Positioning System), Beidou, a QZSS (Quasi-Zenith Satellite System), Galileo, or an A-GPS (Assisted Global Positioning System). Typically, information related to a latitude, a longitude, an altitude, and a positioning error may be included. Alternatively, it may be, for example, position information registered in an information management apparatus managed by the NRA (National Regulatory Authority) or its consignment organization. Alternatively, it may be, for example, X-axis, Y-axis, and Z-axis coordinates with a specific geolocation as the origin. Further, an identifier indicating outdoor/indoor may be assigned together with such coordinate information.

Further, the position-related information may be information indicating a region where the base station apparatus 20 is located. For example, information defined by the administration, such as a postcode or an address, may be used. Further, for example, the region may be indicated by a set of three or more geographic coordinates. These pieces of information indicating the region may be provided together with the above coordinate information.

Further, the position-related information may be assigned information indicating the floor of a building in a case where the base station apparatus 20 is located indoors. For example, an identifier, etc. indicating the number of stories or ground/underground may be assigned. Further, for example, information indicating a further closed space located indoors, such as a room number or a room name in the building, may be assigned.

The above positioning function is typically desired to be provided for the base station apparatus 20. However, depending on performance of the positioning function or an installation position, it is not necessarily possible to acquire position information that satisfies demanded accuracy. Therefore, the positioning function may be used by an installer. In such a case, it is desirable that position information measured by the installer be written to the base station apparatus 20.

The antenna information is typically information that indicates performance, a configuration, etc. of an antenna provided in the base station apparatus 20. Typically, it may include, for example, information such as an antenna installation height, a tilt angle (Downtilt), a horizontal orientation (Azimuth), aiming (Boresight), antenna peak gain, or an antenna model.

The antenna information may also include information related to formable beams. For example, information such as a beam width, a beam pattern, or analog/digital beamforming capability may be included.

The antenna information may also include information related to performance and a configuration of MIMO (Multiple Input Multiple Output) communication. For example, it may include information such as the number of antenna elements or the maximum number of spatial streams. It may also include codebook (Codebook) information, weighting matrix information (a unitary matrix, a ZF (Zero-Forcing) matrix, or a MMSE (Minimum Mean Square Error) matrix obtained by SVD (Singular Value Decomposition), EVD (Eigen Value Decomposition), BD (Block Diagonalization), etc.), or the like to be used. In addition, in a case where MLD (Maximum Likelihood Detection) or the like involving nonlinear operation is provided, information indicating it may be included.

The antenna information described above may include a ZoD (Zenith of Direction, Departure). The ZoD is a type of radio wave arrival angle. The ZoD described above may be estimated by another base station apparatus 20 from radio waves emitted from the antenna of the base station apparatus 20. In this case, the base station apparatus 20 may be a terminal apparatus that operates as a base station or an access point, an apparatus that performs D2D communication, a moving relay base station, or the like. The ZoD may be estimated by a radio wave arrival direction estimation technology such as MUSIC (Multiple Signal Classification) or ESPRIT (Estimation of Signal Propagation via Rotation Invariance Techniques). It may be used by the communication control apparatus 40 as measurement information.

The wireless interface information typically refers to information that indicates a wireless interface technology provided for the base station apparatus 20. For example, it includes identifier information indicating a technology used in GSM (registered trademark), CDMA2000, UMTS, E-UTRA, 5G NR, or further next-generation cellular systems, an LTE-compliant derivation technology such as MulteFire or LTE-U (LTE-Unlicensed), a MAN (Metropolitan Area Network) such as WiMAX or WiMAX2+, or a standard technology such as an IEEE 802.11 wireless LAN. A version number or release number of a technical specification that defines these may also be assigned. It may not necessarily be a standard technology, and information indicating a proprietary wireless technology may be included.

The wireless interface information may also include frequency band information supported by the base station apparatus 20. For example, it may be expressed by one or more of combinations of an upper limit frequency and a lower limit frequency, one or more of combinations of a center frequency and a bandwidth, one or more 3GPP Operating Band numbers, or the like.

As the frequency band information supported by the base station apparatus 20, capability information of carrier aggregation (CA: Carrier Aggregation) or channel bonding (Channel Bonding) may also be included. For example, combinable band information or the like may be included. Further, for carrier aggregation, information related to bands to be used as a primary component carrier (PCC: Primary Component Carrier) and secondary component carriers (SCC: Secondary Component Carrier) may also be included. The number of CCs aggregable at the same time may also be included.

As the frequency band information supported by the base station apparatus 20, information indicating radio wave utilization priority, such as PAL or GAA, may also be included.

The wireless interface information may also include modulating scheme information supported by the base station apparatus 20. For example, typical examples may include information indicating a primary modulation scheme, such as FSK (Frequency Shift Keying), n-value PSK (Phase Shift Keying) (where n is 2, 4, 8, etc.), or n-value QAM (Quadrature Amplitude Modulation) (where n is 4, 16, 64, 256, etc.), and information indicating a secondary modulation scheme, such as OFDM (Orthogonal Frequency Division Multiplexing), DFT-s-OFDM (DFT spread OFDM), or FBMC (Filter Bank Multi Carrier).

The wireless interface information may also include information related to error-correcting codes. For example, capability of Turbo codes, LDPC (Low Density Parity Check) codes, Polar codes, etc. and coding rate information to be applied may be included.

The modulating scheme information and the information related to the error correcting codes may also be expressed, as another form, by MCS (Modulation and Coding Scheme) indexes.

The wireless interface information may also include information that indicates a function unique to each wireless technology supported by the base station apparatus 20. For example, typical examples include TM (Transmission Mode) information specified in LTE. In addition, for a specific function having two or more modes, the mode may be included in the wireless interface information, like the TM described above. Further, in a case where the base station apparatus 20 supports a function that does not have two or more modes but is not necessary in terms of specifications in the technical specifications, information indicating this may also be included.

The wireless interface information may also include wireless access scheme (RAT: Radio Access Technology) information supported by the base station apparatus 20. For example, it may include orthogonal multiple access schemes (OMA: Orthogonal Multiple Access) such as TDMA (Time Division Multiple Access), FDMA (Frequency Division Multiple Access), or OFDMA (Orthogonal Frequency Division Multiple Access), non-orthogonal multiple access schemes (NOMA: Non Orthogonal Multiple Access) such as PDMA (Power Division Multiple Access, typically implemented by combining Superposition Coding (SPC) and Successive Interference Canceller (SIC)), CDMA (Code Division Multiple Access), SCMA (Sparse Code Multiple Access), IDMA (Interleaver Division Multiple Access), or SDMA (Spatial Division Multiple Access), and opportunistic access schemes (Opportunistic Access) such as CSMA/CA (Carrier Sense Multiple Access/Collision Avoidance) or CSMA/CD (Carrier Sense Multiple Access/Collision Detection).

The wireless interface information may also include information related to a duplex-mode supported by the base station apparatus 20. Typical examples may include, for example, FDD (Frequency Division Duplex), TDD (Time Division Duplex), and FD (Full Duplex). In a case where TDD is included as the wireless interface information, TDD Frame Configuration information used/supported by the base station apparatus 20 may be assigned. Further, the information related to the duplex mode may be included for each frequency band indicated by the above frequency band information.

The wireless interface information may also include information related to a transmit diversity technique supported by the base station apparatus 20. For example, space-time coding (STC: Space Time Coding) or the like may be included.

The wireless interface information may also include guard band information. For example, information related to a standardized guard band size may be included. Alternatively, for example, information related to the guard band size desired by the base station apparatus 20 may be included.

The legal information typically refers to regulatory information that the base station apparatus 20 has to comply with and is defined by a national or local radio wave administrative agency or a similar organization, approval information that the base station apparatus 20 has acquired, etc. As the regulatory information described above, typically, for example, upper limit information of out-of-band emission, information related to blocking characteristics of a receiver, and the like may be included. As the approval information described above, typically, for example, type approval (Type Approval) information (FCC ID, technical standards conformity certification, etc.), legal regulation information to be used as a criterion for approval acquisition (e.g., FCC rule number, ETSI Harmonized Standard number, etc.), and the like may be included.

Of the legal information, information related to numerical values may be substituted by information defined in a specification of a wireless interface technology. For example, in place of the upper limit information of out-of-band emission, an adjacent channel leakage ratio (ACLR: Adjacent Channel Leakage Ratio) may be used to derive and use the upper limit of out-of-band emission. Further, the ACLR itself may be used as necessary. Further, adjacent-channel selectivity (ACS: Adjacent Channel Selectivity) may be used in place of the blocking characteristics. They may also be used in conjunction, or an adjacent-channel interference ratio (ACIR: Adjacent Channel Interference Ratio) may be used.

The installer information may include information allowing identification of a person (installer) who has installed the base station apparatus 20, unique information associated with the installer, etc. For example, NPTL 2 discloses, as the information allowing identification of the installer, a CPIR-ID (Certified Professional Installer Registration ID) and a CPI-name. Also disclosed as the unique information associated with the installer are, for example, a contact address (Mailing/Contact address), an e-mail address, a telephone number, a PM (Public Key Identifier), etc. Without being limited thereto, other information related to the installer may be included, as necessary.

(Supplement to Desired Parameters)

In the registration procedure, in some embodiments, it is assumed to be requested that the device parameters related to not only the base station apparatus 20 but also the terminal apparatus 30 be registered in the communication control apparatus 40. In a such case, the embodiment may be applied by replacing the term "communication apparatus" in the description given above in (Details of Desired Parameters) with the term "terminal apparatus" or a similar term. In addition, "terminal-apparatus"-unique parameters that are not described above in (Details of Desired Parameters) may also be treated as the desired parameters in the registration procedure. Examples include a UE (User Equipment) Category, etc. specified in the 3GPP.

(Details of Registration Process)

Figure 19:
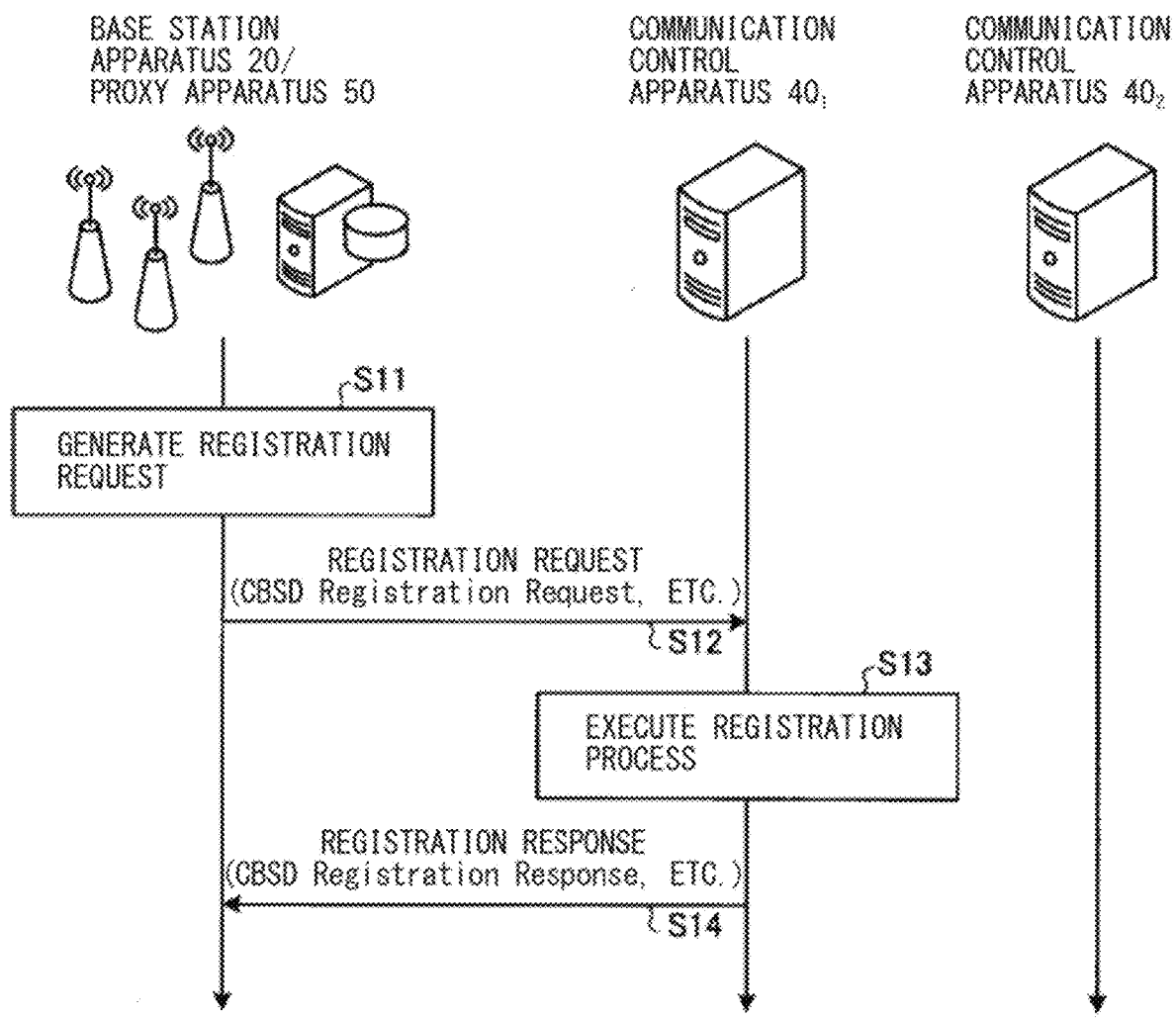
FIG. 19 is a sequence diagram for explaining a registration procedure.

FIG. 19 is a sequence diagram for explaining the registration procedure. The base station apparatus 20 or one or more communication systems including a plurality of base station apparatuses 20 generates a registration request message by using the device parameters described above (step S11), and notifies the communication control apparatus 40 (step S12). The message generation and/or notification may be performed by the proxy apparatus 50.

Here, in a case where the installer information is included in the device parameters, this information may be used to process the registration request to prevent tampering, etc. In addition, some or all of information included in the registration request may be encrypted. Specifically, for example, the following processing may be performed: an installer-unique public key is shared in advance between the installer and the communication control apparatus 40, and information is encrypted by the installer using a private key. Targets of the encryption include, for example, security-sensitive information such as position information.

In addition, the position information may be, for example, directly written by the installer into the communication control apparatus 40, as disclosed in NPTL 2.

After receiving the registration request, the communication control apparatus 40 performs the registration process of the base station apparatus 20 (Step S13), and returns a registration response in accordance with the process result (Step S14). If there is no lack of information necessary for registration or abnormality, the communication control apparatus 40 records information in the storage unit 42 and reports normal completion. Otherwise, the communication control apparatus 40 reports a registration failure. In a case where the registration is normally completed, the communication control apparatus 40 may allocate IDs individually to the communication apparatuses, and report the ID information by enclosing it when responding. In a case where a registration failure occurs, typically, the base station apparatus 20 or one or more communication systems including a plurality of base station apparatuses 20, or an operator (e.g., a mobile network operator or an individual) or installer thereof corrects the registration request, for example, and attempts the registration procedure until the registration is normally completed.

It is to be noted that the registration procedure may be executed a plurality of times. Specifically, for example, the registration procedure may be re-executed in a case where the position information is changed beyond a predetermined criterion, due to movement or an improvement in accuracy. The predetermined criterion is typically defined by a legal system. For example, 47 C.F.R Part 15 makes it compulsory for a Mode II personal/portable white space device to re-access a database in a case where the position information changes by 100 meters or more.

5-2. Available-Frequency Information Query Procedure (Available Spectrum Query Procedure)

The available-frequency information query procedure refers to a procedure in which the base station apparatus 20 or the proxy apparatus 50 queries the communication control apparatus 40 about information related to an available frequency. Typically, the procedure is started by the base station apparatus 20 or the proxy apparatus 50 notifying the communication control apparatus 40 of a query request including information that allows identification of the base station apparatus 20 (or the base station apparatus 20 subordinate to the proxy apparatus 50).

(1) Example 1

Here, the available-frequency information typically refers to information indicating a frequency of which secondary use is safely possible without causing fatal interference to the primary system at the position of the base station apparatus 20 (or the base station apparatus 20 subordinate to the proxy apparatus 50). For example, in order to protect the primary system using a frequency channel F1, in a case where the base station apparatus 20 is installed in a secondary use prohibition area such as an Exclusion Zone, the base station apparatus 20 is not notified of the frequency channel F1 as an available channel.

(2) Example 2

Further, for example, in a case where it is determined that fatal interference will be caused to the primary system, even outside the secondary use prohibited area, the frequency channel may not be reported as an available channel.

(3) Example 3

There may also be a frequency channel that is not reported as available as the available-frequency information on the basis of a condition other than primary system protection requirements of Example 2. Specifically, for example, in order to avoid interference that can occur between the base station apparatuses 20 in advance, a frequency channel being used by another base station apparatus 20 present in the neighborhood of the base station apparatus 20 (or the base station apparatus 20 subordinate to the proxy apparatus 50) may not be reported as an available channel.

(4) Example 4

Even in cases corresponding to these cases (Example 2 and Example 3), it is possible to report, as an available channel, the same frequency as the primary system or the neighboring base station apparatus 20. In such a case, maximum allowable transmission power information is typically included in the available-frequency information. The maximum allowable transmission power is typically expressed by equivalent isotropic radiated power (EIRP: Equivalent Isotropic Radiated Power). It is not necessarily limited thereto and may be, for example, provided by combining the antenna gain with the antenna power (Conducted Power). Feeder loss (Feeder Loss) may also be included. In addition, as the antenna gain, allowable peak gain may be set for each spatial direction.

(Details of Desired Parameters)

Assumed as the information allowing identification of the base station apparatus 20 may be, for example, the communication-apparatus-unique information registered at the time of the above registration procedure or the ID information described above in (Details of Registration Process).

The query request may also include query requirement information. The query requirement information may include, for example, information indicating a frequency band of which availability is to be known. Further, for example, transmission power information may be included. The base station apparatus 20 or the proxy apparatus 50 may include the transmission power information in a case where, for example, only frequency information assumed to allow use of the desired transmission power is to be known. The query requirement information may not necessarily be included.

The query request may also include a measurement report. The measurement report contains a result of measurement performed by the base station apparatus 20 and/or the terminal apparatus 30. For example, raw data as well as processed information may be included. For example, standard metrics typified by RSRP (Reference Signal Received Power), a RSSI (Reference Signal Strength Indicator), and RSRQ (Reference Signal Received Quality) may be used.

(Details of Available Frequency Evaluation Process)

Figure 20:
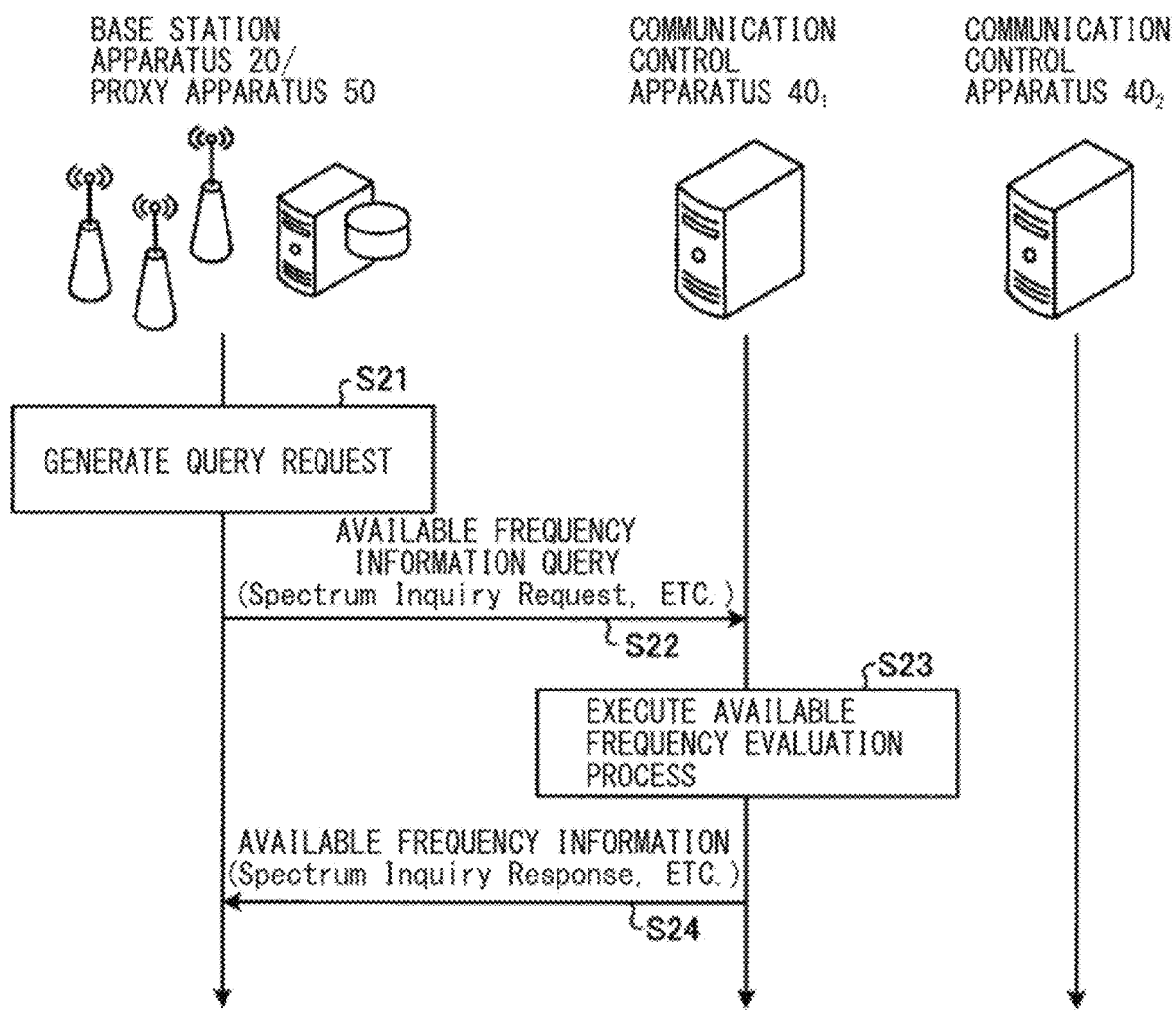
FIG. 20 is a sequence diagram for explaining an available-frequency information query procedure.

FIG. 20 is a sequence diagram for explaining the available-frequency information query procedure. The base station apparatus 20 or the proxy apparatus 50 generates a query request including information allowing identification of the base station apparatus 20 (or the base station apparatus 20 subordinate to the proxy apparatus 50) (step S21), and notifies the communication control apparatus 40 (step S22).

After receiving the query request, the communication control apparatus 40 evaluates the available frequency on the basis of the query requirement information (step S23). For example, as described in Examples 1 to 3 above, it is possible to evaluate the available frequency by considering the presence of the primary system, its secondary use prohibition area, and the neighboring base station apparatus 20.

As described in Example 4 above, the communication control apparatus 40 may derive the maximum allowable transmission power information. Typically, it is calculated by using allowable interference power information in the primary system or its protection region (Protection Zone), the reference position (Reference Point) information for calculation of the interference power level received by the primary system, the registered information of the base station apparatus 20, and a propagation-loss estimation model. Specifically, it is calculated by the following expression, as an example.

$$P_{MaxTx(dBm)} = I_{Th(dBm)} + PL(d)_{(dB)} \quad (1)$$

Here, $P_{MaxTx(dBm)}$ is the maximum allowable transmission power, $I_{Th(dBm)}$ is the allowable interference power, d is a distance between the reference position (Reference Point) and the base station apparatus 20, and $PL(d)_{(dB)}$ is the propagation loss at the distance d. Although this expression does not explicitly indicate the antenna gain in a transmitter/receiver, it may be included depending on how the maximum allowable transmission power is expressed (EIRP, Conducted power, etc.) or a reference point of received power (antenna input point, antenna output point, etc.). A safety margin or the like may also be included to compensate for fluctuations due to fading. Further, feeder loss or the like may be considered as necessary.

Further, the above expression is described on the basis of the assumption that a single base station apparatus 20 is an interference source. For example, in a case where aggregated interference (Aggregated Interference) from a plurality of base station apparatuses 20 are to be considered at the same time, correction values may be factored in. Specifically, for example, the correction value may be determined on the basis of three types of interference margin schemes (Fixed/Predetermined, Flexible, Flexible Minimized) disclosed in NPTL 3.

It is to be noted that, although the above expression is expressed by using logarithms, in implementation, they may be converted to antilogarithms to be used, as a matter of course. Further, all logarithmic parameters described in this specification may be converted to antilogarithms to be used as appropriate.

(1) Technique 1

In addition, as described above in the section of (Details of Desired Parameters), in a case where the transmission power information is included in the query requirement information, it is possible to evaluate the available frequency by a method different from the method described above. Specifically, for example, assuming that the desired transmission power indicated by the transmission power information is used, in a case where the estimated amount of caused interference falls below the allowable interference power in the primary system or its protection region (Protection Zone), the frequency channel is determined as available and reported to the base station apparatus 20 (or the proxy apparatus 50).

(2) Technique 2

Although an example in which a band utilization condition described above is calculated on the basis of the other-system-related information described above has been described, the present disclosure is not limited to such an example. For example, in a case where an area/space in which the base station apparatus 20 is able to use the shared band is predetermined, as with the area of a REM (Radio Environment Map), the available-frequency information may be derived on the basis of only the position-related information and the height-related information described above. Further, for example, also in a case where a look-up table is prepared that associates the position and height with the available-frequency information, the available-frequency information described above may be derived on the basis of only the position-related information and the height-related information described above.

Evaluation of the available frequency may not necessarily be performed after receiving a query request. For example, it may be voluntarily performed by the communication control apparatus 40 after normal completion of the aforementioned registration procedure, without a query request. In such a case, the communication control apparatus 40 may create the REM or look-up table exemplified in Technique 2 or a similar information table.

Either technique may also evaluate radio wave utilization priority such as PAL or GAA. For example, in a case where registered device parameters or query requirements include information related to the radio wave utilization priority, it may be determined and reported whether the frequency is available on the basis of the priority. Further, for example, in a case where information related to the base station apparatus 20 that performs high priority utilization (e.g., PAL) (in NPTL 2, referred to as Cluser List) is registered in advance in the communication control apparatus 40 by the user, as disclosed in NPTL 2, the evaluation may be performed on the basis of the information.

After completion of the evaluation of the available frequency, the communication control apparatus 40 notifies the base station apparatus 20 (or the proxy apparatus 50) of the evaluation result (step S24). The base station apparatus 20 may select desired communication parameters by using the evaluation result received from the communication control apparatus 40.

5-3. Frequency Utilization Permission Procedure (Spectrum Grant Procedure)

The frequency utilization permission procedure is a procedure for the base station apparatus 20 to receive permission for secondary use of a frequency from the communication control apparatus 40. Typically, after the normal completion of the registration procedure, the procedure is started by the base station apparatus 20 or one or more communication systems including a plurality of base station apparatuses 20 notifying the communication control apparatus 40 of a frequency utilization permission request including information that allows identification of the base station apparatus 20. This notification may be provided by the proxy apparatus 50. It is to be noted that "after the normal completion of the registration procedure" also means that the available-frequency information query procedure may not necessarily be performed.

The present invention assumes that at least the following two types of frequency utilization permission request schemes may be used.

Designation scheme
Flexible scheme

The designation scheme is a request scheme in which the base station apparatus 20 designates, as the desired communication parameters, at least the frequency band to be used and the maximum transmission power, and requests the communication control apparatus 40 to permit operation based on the desired communication parameters. Parameters are not necessarily limited to these parameters, and parameters unique to a wireless interface technology (such as a modulation scheme and a duplex mode) may be designated. Information indicating the radio wave utilization priority, such as PAL or GAA may also be included.

The flexible scheme is a request scheme in which the base station apparatus 20 designates only requirements related to communication parameters, and requests the communication control apparatus 40 to designate the communication parameters that allow secondary use permission while satisfying the requirements. The requirements related to the communication parameters may include the bandwidth or the desired maximum transmission power or desired minimum transmission power. Parameters are not necessarily limited to these parameters, and parameters unique to a wireless interface technology (such as a modulation scheme and a duplex mode) may be designated. Specifically, for example, one or more of the TDD Frame Configuration may be selected and reported in advance.

In either scheme, a measurement report may be included. The measurement report contains a result of measurement performed by the base station apparatus 20 and/or the terminal apparatus 30. For example, raw data as well as processed information may be included. For example, standard metrics typified by RSRP (Reference Signal Received Power), a RSSI (Reference Signal Strength Indicator), and RSRQ (Reference Signal Received Quality) may be used.

(Details of Frequency Utilization Permission Process)

Figure 21:
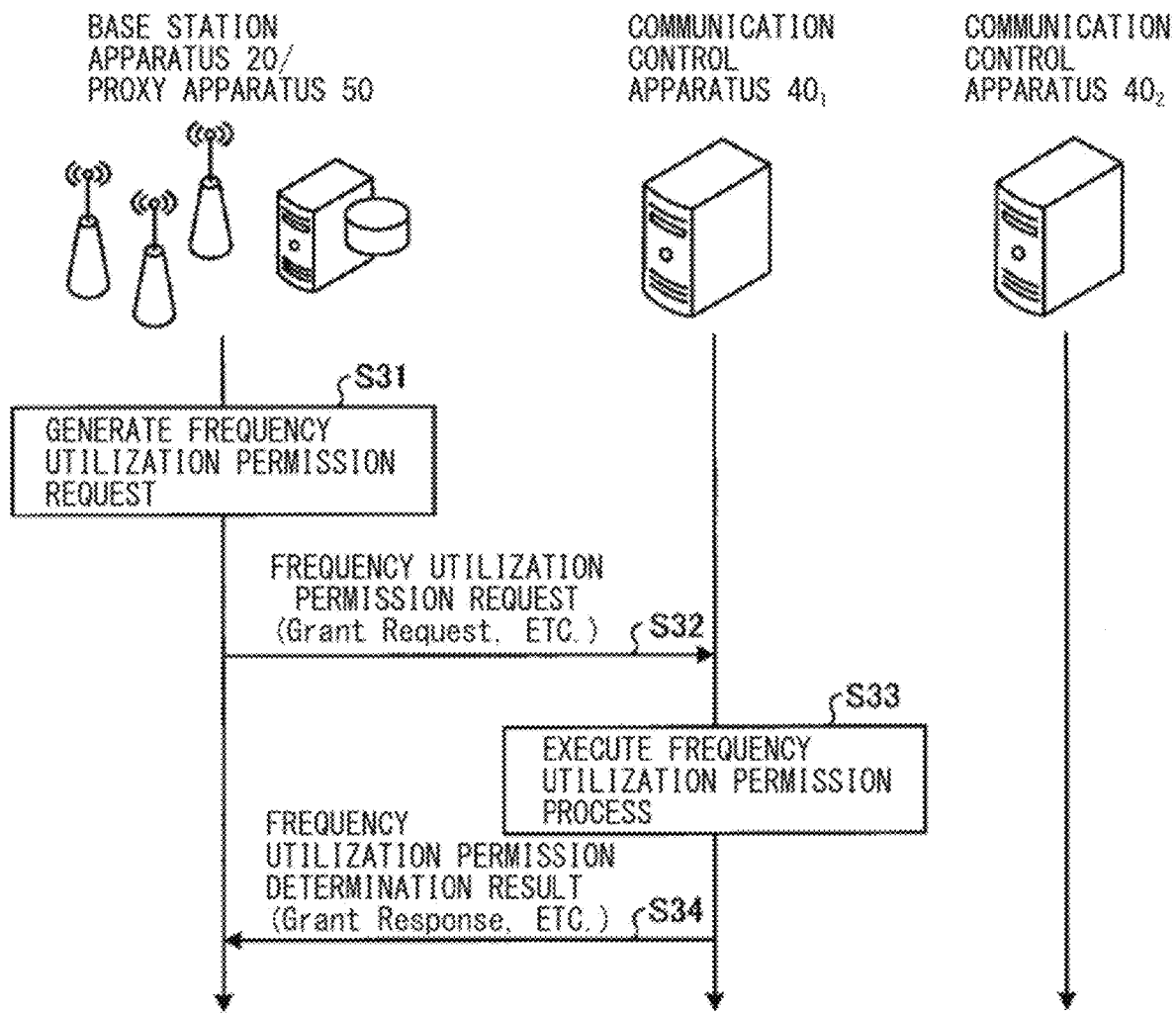
FIG. 21 is a sequence diagram for explaining a frequency utilization permission procedure.

FIG. 21 is a sequence diagram for explaining the frequency utilization permission procedure. The base station apparatus 20 or one or more communication systems including a plurality of base station apparatuses 20 generates a frequency utilization permission request including information that allows identification of the base station apparatus 20 (step S31) and notifies the communication control apparatus 40 (step S32). The request generation and/or notification may be performed by the proxy apparatus 50. The frequency utilization permission request is acquired, for example, by the acquiring section 441 of the communication control apparatus 40.

After acquiring the frequency utilization permission request, the communication control apparatus 40 performs the frequency utilization permission process on the basis of the frequency utilization permission request scheme (step S33). For example, it is possible for the communication control apparatus 40 to perform the frequency utilization permission process by considering the presence of the primary system, its secondary use prohibited area, and the neighboring base station apparatus 20, by using the techniques described in Examples 1 to 3 in <5-2. Available-Frequency Information Query Procedure>.

In a case where the flexible scheme is used, the communication control apparatus 40 may derive the maximum allowable transmission power information by using the technique described in Example 4 of <5-2. Available-Frequency Information Query Procedure>. Typically, the communication control apparatus 40 calculates the maximum allowable transmission power by using the allowable interference power information in the primary system or its protection region (Protection Zone), the reference position (Reference Point) information for calculation of the interference power level received by the primary system, the registered information of the base station apparatus 20, and the propagation-loss estimation model. For example, the communication control apparatus 40 calculates the maximum allowable transmission power by the following expression (2).

$$P_{MaxTx(dBm)} = I_{Th(dBm)} + PL(d)_{(dB)} \quad (2)$$

Here, $P_{MaxTx(dBm)}$ is the maximum allowable transmission power, $I_{Th(dBm)}$ is the allowable interference power, d is a distance between the reference position (Reference Point) and the base station apparatus 20, and $PL(d)_{(dB)}$ is the propagation loss at the distance d. Although this expression does not explicitly indicate the antenna gain in a transmitter/receiver, the expression may be deformed to be used depending on how the maximum allowable transmission power is expressed (EIRP, Conducted power, etc.) or a reference point of received power (antenna input point, antenna output point, etc.). A safety margin or the like may also be included to compensate for fluctuations due to fading. Further, feeder loss or the like may be considered as necessary.

Further, the above expression is described on the basis of the assumption that a single base station apparatus 20 is an interference source. For example, in a case where aggregated interference (Aggregated Interference) from a plurality of base station apparatuses 20 are to be considered at the same time, correction values may be factored in. Specifically, for example, the correction value may be determined on the basis of three types of schemes (Fixed/Predetermined, Flexible, Flexible Minimized) disclosed in NPTL 3.

Various models may be used as the propagation-loss estimation model. In a case where a model is designated for each application, it is desirable to use the designated model. For example, in NPTL 6, the propagation-loss model such as eHATA (Extended Hata) or an ITM (Irregular Terrain Model) is adopted for each application. As a matter of course, the propagation-loss model may not be limited thereto in implementation of the present invention.

In a case where the model is not designated in a predetermined application, different models may be used as necessary. As a specific example, it is possible to use different models as follows, for example: using an aggressive model, such as the free space loss model, in estimating interference power caused to another base station apparatus 20, and using a conservative model in estimating the coverage of the base station apparatus 20.

In addition, in a case where the designation scheme is used, it is possible to perform the frequency utilization permission process by using the technique described in Technique 1 of <5-2. Available-Frequency Information Query Procedure>. Specifically, for example, assuming that the desired transmission power indicated by the transmission power information is used, in a case where the estimated amount of caused interference falls below the allowable interference power in the primary system or its protection region (Protection Zone), the utilization of the frequency channel is determined as permittable and reported to the base station apparatus 20 (or the proxy apparatus 50).

Either technique may also evaluate radio wave utilization priority such as PAL or GAA. For example, in a case where registered device parameters or query requirements include information related to the radio wave utilization priority, it may be determined and reported whether the frequency is available on the basis of the priority. Further, for example, in a case where information related to the base station apparatus 20 that performs high priority utilization (e.g., PAL) (in NPTL 2, referred to as Cluser List) is registered in advance in the communication control apparatus 40 by the user, as disclosed in NPTL 2, the availability may be evaluated on the basis of the information.

The frequency utilization permission process may not necessarily be performed when a request is received. For example, it may be voluntarily performed by the communication control apparatus 40 after the aforementioned registration procedure is normally completed, without a frequency utilization permission request. Further, for example, the frequency utilization permission determination process may be performed at regular intervals. In such a case, the REM or look-up table exemplified in Technique 2 of <5-2. Available-Frequency Information Query Procedure> or a similar information table may be created.

After completion of the frequency utilization permission process, the communication control apparatus 40 notifies the base station apparatus 20 of the determination result (step S34).

5-4. Frequency Utilization Notification (Spectrum Use Notification/Heartbeat)

The frequency utilization notification is a procedure in which the base station apparatus 20 or the proxy apparatus 50 notifies the communication control apparatus 40 of the frequency utilization based on the communication parameters allowed for use in the above frequency utilization permission procedure. Typically, the procedure is started by the base station apparatus 20 or the proxy apparatus 50 notifying the communication control apparatus 40 of a notification message including information allowing identification of the base station apparatus 20.

It is desirable that this procedure be performed periodically until the frequency utilization is rejected from the communication control apparatus 40. If this procedure is normally completed, the base station apparatus 20 may start or continue radio wave transmission. For example, if the state of a grant (Grant) is Granted, the state of the grant shifts to Authorized due to success of this procedure. Further, if the state of the grant is Authorized, the state of the grant shifts to Granted or Idole due to failure of this procedure.

Here, the grant indicates radio wave transmission authorization that the communication control apparatus 40 (e.g., the SAS) gives to the base station apparatus 20 (e.g., the CBSD). The grant is described in NPTL 2, for example. In NPTL 2, a signaling protocol between a database (SAS) and a base station (CBSD) is standardized for 3550-3700 MHz frequency sharing in the United States. In this standard, radio wave transmission authorization that the SAS gives to the CBSD is referred to as a "grant (Grant)". Operation parameters authorized by the grant are defined by two factors: maximum allowable EIRP (Equivalent Isotropic Radiated Power) and a frequency channel. That is, in order to perform radio wave transmission using a plurality of frequency channels, it is necessary for the CBSD to acquire a plurality of grants from the SAS.

Figure 22:
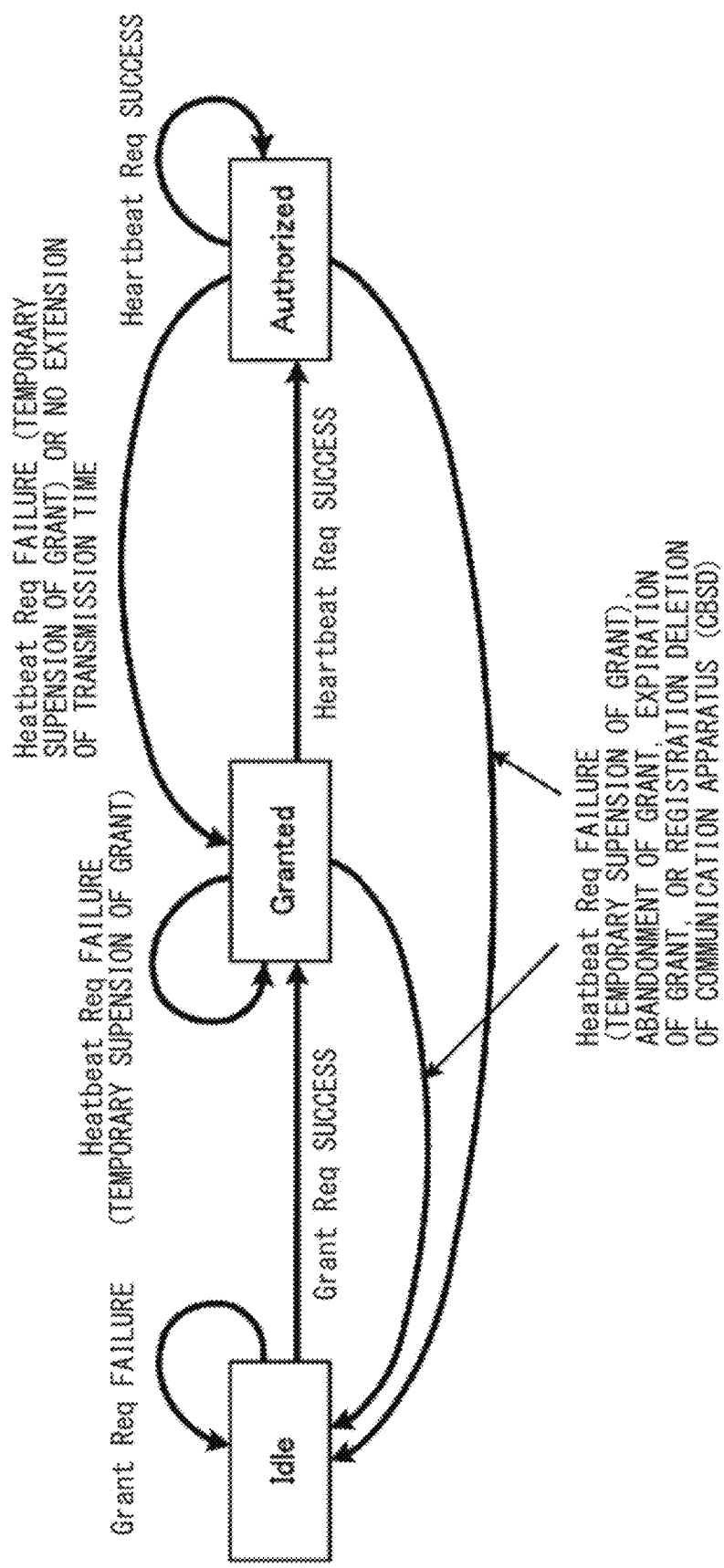
FIG. 22 is a state transition diagram illustrating a permission state of radio wave transmission.

A state (State) indicating a permission state of radio wave transmission is defined by the grant. FIG. 22 is a state transition diagram illustrating the permission state of radio wave transmission. In FIG. 22, a Granted state indicates a state in which the grant is possessed but radio wave transmission is not permitted, and an Authorized state indicates a state in which radio wave transmission is permitted on the basis of operation parameter values defined by the grant. Transition occurs between these two states depending on a result of a heartbeat procedure (Heartbeat Procedure) specified in the same standard.

In the following description, the frequency utilization notification may be referred to as heartbeat request (Heartbeat Request) or simply as heartbeat (Heartbeat). Further, the heartbeat request transmission interval is sometimes referred to as a heartbeat interval (Heartbeat Interval). It is to be noted that the description of the heartbeat request (Heartbeat Request) or the heartbeat (Heartbeat) appearing in the following description may be replaced as appropriate with another description indicating a "request for starting or continuing radio wave transmission". Similarly, the heartbeat interval may be replaced with another description (e.g., transmission interval) indicating the transmission interval of the frequency utilization notification.

Figure 23:
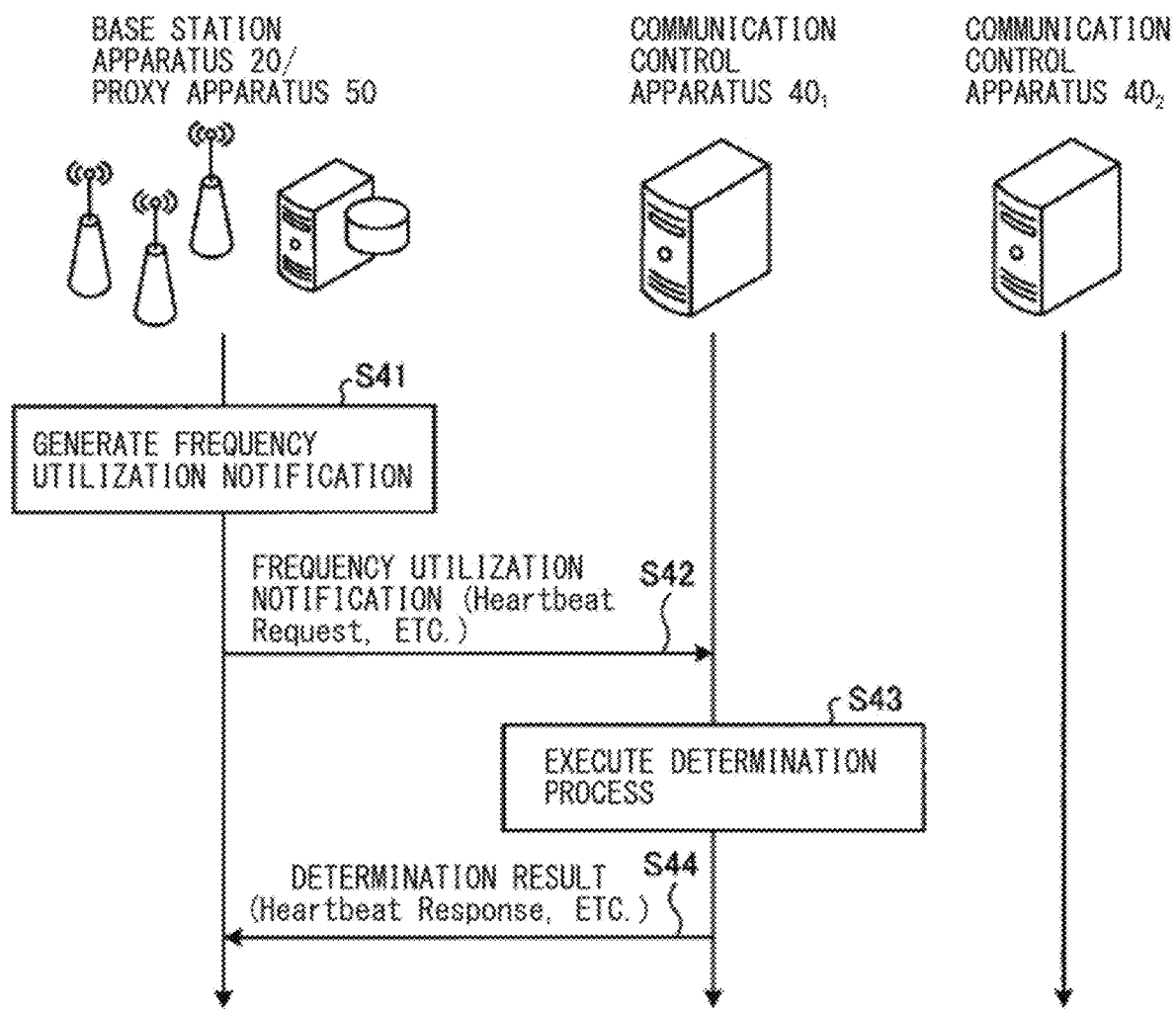
FIG. 23 is a sequence diagram for explaining a frequency utilization notification procedure.

FIG. 23 is a sequence diagram for explaining the frequency utilization notification procedure. The base station apparatus 20 or one or more communication systems including a plurality of base station apparatuses 20 generates a notification message including information that allows identification of the base station apparatus 20 (step S41), and notifies the communication control apparatus 40 (step S42). The message generation and/or notification may be performed by the proxy apparatus 50.

After receiving the frequency utilization notification, the communication control apparatus 40 may determine whether the start/continuation of radio wave transmission is allowed (step S43). Examples of a determination method include checking the frequency utilization information of the primary system. Specifically, it is possible to determine whether to permit or reject start/continuation of radio wave transmission on the basis of a change in the frequency used by the primary system, a change in the frequency utilization situation of the primary system (e.g., ship-based radar) whose radio wave utilization is not stationary, or the like.

Upon completion of the determination process, the communication control apparatus 40 notifies the base station apparatus 20 (or the proxy apparatus 50) of the determination result (step S44).

In this procedure, a command for communication parameter reconfiguration (Reconfiguration) may be issued to the base station apparatus 20 (or the proxy apparatus 50) from the communication control apparatus 40. Typically, it may be performed in a response to the frequency utilization notification. For example, recommended communication parameter information may be provided.

5-5. Supplement to Procedures

Here, the procedures may not necessarily be individually implemented, as described below. For example, two different procedures may be implemented by being substituted by a third procedure with the roles of the two different procedures. Specifically, for example, the registration request and the available-frequency information query request may be reported integrally. Further, for example, the frequency utilization permission procedure and the frequency utilization notification may be performed integrally. Needless to say, it is not limited to these combinations, and may be a combination of three or more. Further, the above procedure may be separated and performed.

Further, in a case where the present embodiment is applied for frequency sharing with an existing system, as the procedures or equivalent procedures, it is desirable to select and use appropriate procedures on the basis of the radio law related to the frequency band in a country or a region where the technology of the present embodiment is implemented. For example, in a case where registration of communication apparatuses is mandated for use of a specific frequency band in a specific country or region, it is desirable to perform the registration procedure described above.

In addition, the expression "acquire information" or a similar expression in this specification does not necessarily mean acquiring the information according to the above procedure. For example, it is described that the position information of the base station apparatus 20 is used in the available frequency evaluation process, but it means that information acquired in the registration procedure may not necessarily be used and, in a case where the available frequency query procedure request includes position information, the position information may be used. In other words, it means that the described parameters may be included in other procedures within the scope described in the present embodiment and within the scope of technical feasibility.

Further, information that may be included in the response from the communication control apparatus 40 to the base station apparatus 20 (or the proxy apparatus 50) described in the above procedure may be reported as a push notification. As a specific example, the available-frequency information, recommended communication parameter information, radio wave transmission continuation rejection notification, etc. may be reported as a push notification.

5-6. Procedures Related to Terminal Apparatus

Basically, it is possible to use the procedures described in <5-1> to <5-4> also for the terminal apparatus 30. However, the terminal apparatus 30 has mobility, unlike the base station apparatus 20. That is, the position information is dynamically updated. Some legal systems may make re-registration in the communication control apparatus 40 compulsory in a case where the position information changes more than a certain amount. Hence, in an operation form (see NPTL 4) defined by the Office of Communications (Ofcom: Office of Communication), the following two types of communication parameters are specified.

Individual parameters (Specific Operational Parameters)
General parameters (Generic Operational Parameters)

The individual parameters (Specific Operational Parameters) are defined in the NPTL as "operation parameters unique to a specific slave-WSD (White Space Device)". In other words, they refer to communication parameters calculated using the device parameters of the slave-WSD corresponding to the terminal apparatus 30. A feature is that they are calculated by a WSDB (White Space Database) by using position information of the slave-WSD.

Due to such a feature, the individual parameters are assumed to be suitable for the terminal apparatus 30 having low mobility or fixedly installed.

The general parameters (Generic Operational Parameters) are defined in the NPTL as "operation parameters available for any slave WSD located within the coverage area of a predetermined master WSD (corresponding to the base station apparatus 20)". A feature is that they are calculated by the WSDB without using position information of the slave-WSD.

Due to such a feature, the general parameters are assumed to be suitable for the terminal apparatus 30 with high mobility.

These pieces of information for the terminal apparatus 30 may be provided by unicast/broadcast from the base station apparatus 20. For example, broadcast signals typified by a CVS (Contact Verification Signal) specified by the FCC rules Part 15 Subpart H may be used. Alternatively, it may be provided by wireless-interface-unique broadcast signals. Specifically, for example, it may be provided by a PBCH (Physical Broadcast Channel), a NR-PBCH, or the like used in LTE or 5G NR.

5-7. Procedure Occurring Between Communication Control Apparatuses (Information Exchange)

Figure 24:
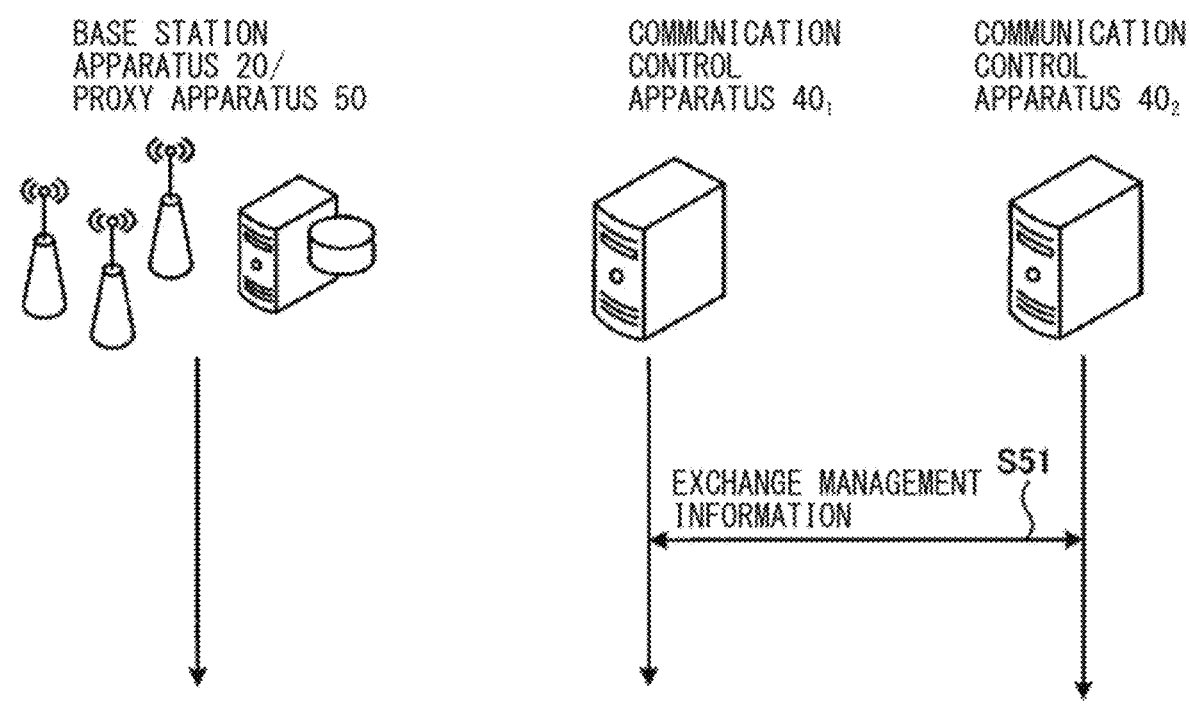
FIG. 24 is a sequence diagram for explaining a management information exchange procedure.

The communication control apparatus 40 is able to exchange the management information with another communication control apparatus 40. FIG. 24 is a sequence diagram for explaining the management information exchange procedure. In the example of FIG. 24, information is exchanged between the communication control apparatus $40_1$ and the communication control apparatus $40_2$. Needless to say, the communication control apparatuses that exchange information are not limited to the two: the communication control apparatus $40_1$ and the communication control apparatus $40_2$.

It is desired that at least the following information be exchanged in the management information exchange procedure.

Communication apparatus registered information
Communication apparatus communication parameter information
Area information The communication apparatus registered information typically refers to the device parameters of the base station apparatus 20 registered in the communication control apparatus 40 in the above registration procedure. Not all registered information has to be exchanged. For example, information that can fall under personal information may not be exchanged. In addition, in a case of exchanging the communication apparatus registered information, encrypted and ambiguous information may be exchanged. For example, information converted to binary values or information signed using a digital signature mechanism may be exchanged.

The communication apparatus communication parameter information typically refers to information related to communication parameters currently used by the base station apparatus 20. It is desirable to include at least information indicating the used frequency and the transmission power. Other communication parameters may be included.

The area information typically refers to information that indicates a predetermined geographic region. This information may include region information of various attributes in a variety of forms.

For example, protection region information of the base station apparatus 20 to be a high priority secondary system may be included, like a PPA (PAL Protection Area) disclosed in NPTL 5. The area information in this case may be expressed, for example, by a set of three or more geolocation coordinates. Further, for example, in a case where a plurality of communication control apparatuses 40 is able to refer to a common external database, it may be expressed by an ID indicating the information.

Further, for example, information indicating the coverage of the base station apparatus 20 may be included. The area information in this case may also be expressed, for example, by a set of three or more geolocation coordinates. In addition, for example, it may be expressed by information indicating a radial size, assuming a circle with the geographical position of the base station apparatus 20 as the origin. Further, for example, in a case where a plurality of communication control apparatuses 40 is able to refer to a common external database, it may be expressed by an ID indicating the information.

As another form, information related to area-division predefined by the administration, etc. may be included. Specifically, it is possible to indicate a certain region by, for example, indicating the address. Further, for example, a licensed area or the like may be expressed in a similar manner.

As still another form, the area information may not necessarily express a planar area, but may express a three-dimensional space. For example, it may be expressed using a spatial coordinate system. Further, for example, information indicating a predetermined closed space, such as the number of stories, the floor, or a room number of the building, may be used.

These pieces of information may be exchanged by a variety of schemes. Examples are described below.

ID designation scheme
Period designation scheme
Region designation scheme
Dump scheme The ID designation scheme is a scheme that uses an ID assigned in advance for identification of information managed by the communication control apparatus 40, to acquire the information corresponding to the above ID. For example, assume that the communication control apparatus $40_1$ manages the base station apparatus 20 with an ID: AAA. In this case, the communication control apparatus $40_2$ issues an information acquisition request designating the ID: AAA to the communication control apparatus $40_1$. After receiving the request, the communication control apparatus $40_1$ searches for information related to the ID: AAA, and reports the registered information and the communication parameter information of the corresponding base station apparatus 20 in a response.

The period designation scheme designates a specific time period, and information that satisfies predetermined conditions in the time period may be exchanged.

The predetermined conditions include, for example, whether or not information is updated. For example, in a case where a request designates acquisition of communication apparatus information in a specific time period, the registered information of the base station apparatus 20 newly registered during the time period, or the registered information and the communication parameter information of the base station apparatus 20 whose communication parameters have been changed may be reported in a response.

The predetermined conditions include, for example, whether it is recorded in the communication control apparatus 40. For example, in a case where a request designates acquisition of communication apparatus information in a specific time period, the registered information and the communication parameter information of the base station apparatus 20 recorded by the communication control apparatus 40 during the time period may be reported in a response. In addition, latest information during the time period may be reported. Alternatively, an update history may be reported for each information.

The region designation scheme designates a specific region, and information belonging to the region is exchanged. For example, in a case where a request designates acquisition of communication apparatus information in a specific region, the registered information and the communication parameter information of the base station apparatus 20 installed in the region may be reported in a response.

The dump scheme is a scheme that provides all information recorded by the communication control apparatus 40. It is desirable that at least information related to the base station apparatus 20 and area information be provided by the dump scheme.

The descriptions of the information exchange between the communication control apparatuses 40 up to this point are all based on a pull scheme. That is, it is a form in which information corresponding to parameters designated in the request is reported in a response, and may be implemented by a HTTP GET method, as an example. However, it may not be limited to the pull scheme, and information may be actively provided to another communication control apparatus 40 by a push scheme. The push scheme may be implemented, as an example, by a HTTP POST method.

(Command and Request Procedures)

The communication control apparatuses 40 may issue commands and/or requests to each other. Specifically, an example is communication parameter reconfiguration (Reconfiguration) of the base station apparatus 20. For example, the communication control apparatus $40_1$ may request the communication control apparatus $40_2$ to change the communication parameters of the base station apparatus $20_4$ in a case where it is determined that the base station apparatus $20_1$ managed by the communication control apparatus $40_1$ is heavily interfered with by the base station apparatus $20_4$ managed by the communication control apparatus $40_2$.

Another example is area information reconfiguration (Reconfiguration). For example, in a case where there is a deficiency in the calculation of the coverage information and the protection region information related to the base station apparatus $20_4$ managed by the communication control apparatus $40_2$, the communication control apparatus $40_1$ may request the communication control apparatus $40_2$ to reconfigure the area information. Other than this, requests for area information reconfiguration may be made for a variety of reasons.

6. DISCOVERY-RELATED OPERATION

Next, discovery-related operation will be described. Discovery refers to searching secondary use information in a designated area or a designated space by an information processing apparatus. The information processing apparatus is, for example, the communication control apparatus 40, or an attendant apparatus (e.g., the proxy apparatus 50 or the server apparatus 60) of the communication control apparatus 40. In the following description, the information processing apparatus performing discovery is assumed to be the communication control apparatus 40 such as SAS. However, the information processing apparatus performing discovery is not limited to the communication control apparatus 40. The "communication control apparatus 40" and the "SAS" appearing in the following description may be replaced as appropriate with the "proxy apparatus 50" or the "server apparatus 60". Further, the "CBSD" appearing in the following description may be replaced with the "base station apparatus 20".

6-1. Assumed Scenario

Figure 25:
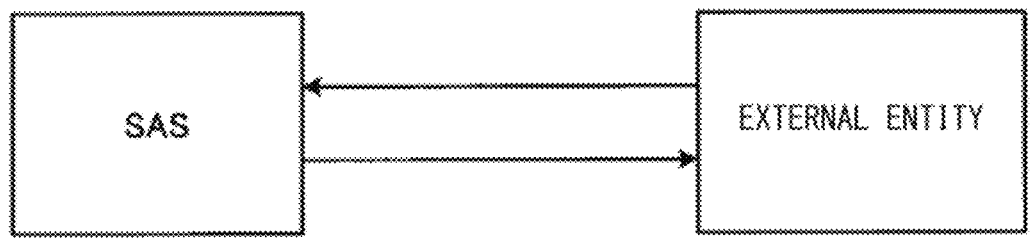
FIG. 25 is a diagram illustrating an example of an entity relationship.

FIG. 25 is a diagram illustrating an example of an entity relationship. In the present embodiment, description is given on the basis of the entity relationship illustrated in FIG. 25. The entity relationship illustrated in FIG. 25 takes the CBRS as an example, but the entity relationship according to the present embodiment is not limited to the example of the CBRS.

Figure 26:
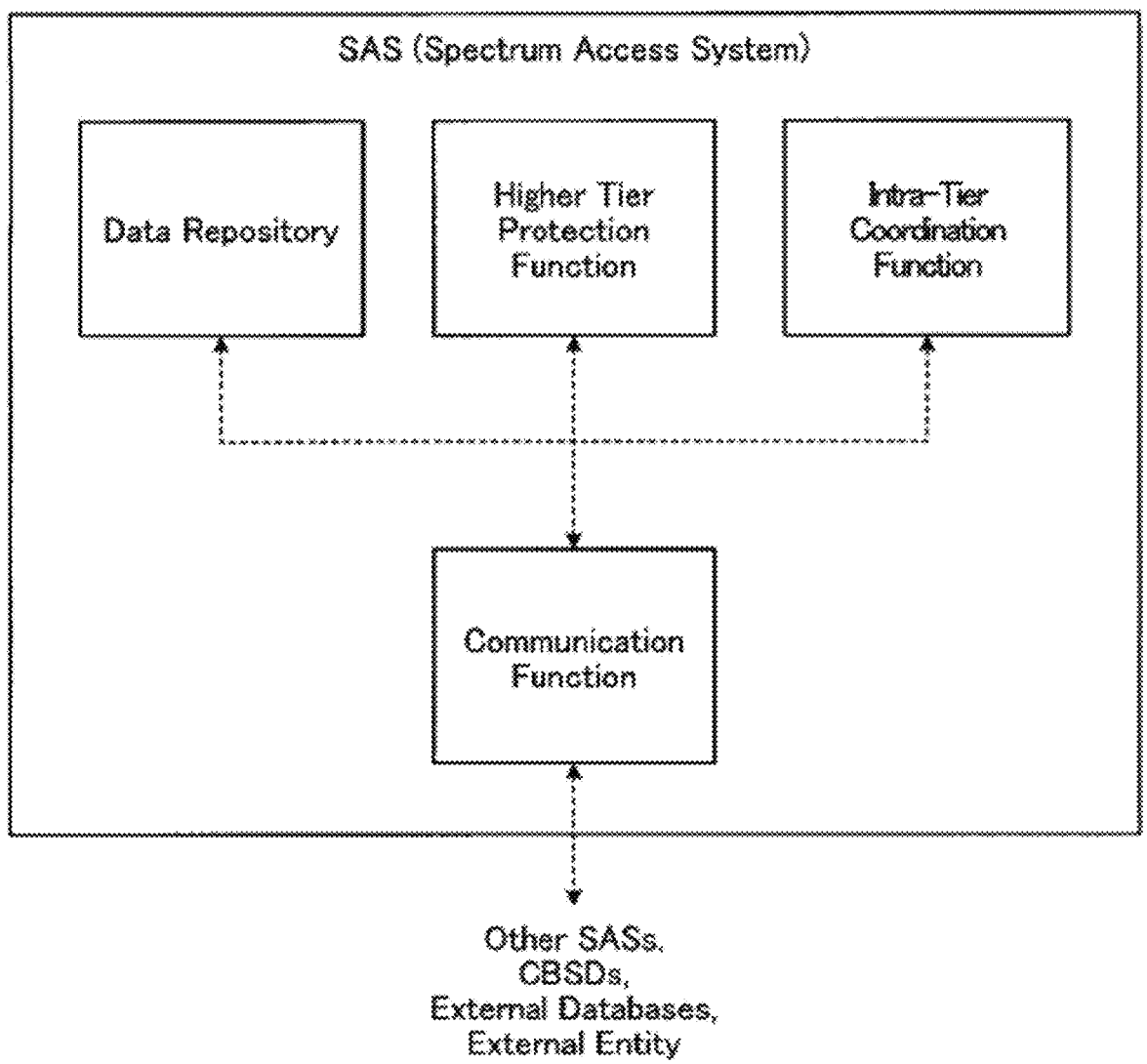
FIG. 26 is a diagram illustrating an example of a functional configuration of a SAS.

The SAS is an example of the communication control apparatus 40. The SAS is a database server that manages secondary use of frequencies in the CBRS. FIG. 26 is a diagram illustrating an example of a functional configuration of the SAS. Here, the SAS is assumed to have a configuration illustrated in FIG. 26.

A "Higher Tier Protection Function" refers to a functional block that performs protection calculation of a wireless system with high frequency utilization priority. Here, the "high frequency utilization priority" may be determined by various criteria. For example, whether or not the "frequency utilization priority" is high may be determined by criteria such as "being a primary user of the frequency (Incumbent User, system)", "having a license for the frequency", and "guaranteeing preferential/exclusive frequency allocation by service level agreement (SLA, Service Level Agreement)". Further, the "protection calculation" may include any process that is able to be performed in order to satisfy desired communication quality of the wireless system with high frequency utilization priority, such as "inside/outside determination of the Exclusion zone", "interference power control (transmission power control) satisfying an allowable amount of interference", and "avoidance of utilization of the same channel (channel allocation, securement of a detuning frequency)".

An "Intra-Tier Coordination Function" is a functional block for promoting cooperative frequency utilization among wireless systems with the same frequency utilization priority. "Among wireless systems with the same frequency utilization priority" refers to "among wireless systems belonging to a tier (Tier) with the same priority". In the CBRS, "among wireless systems with the same frequency utilization priority" refers to, for example, "among wireless systems belonging to the Priority Access Tier" and "among wireless systems belonging to the General Authorized Access (GAA) Tier". Further, "promoting cooperative frequency utilization" indicates, for example, performing "transmission power control", "channel allocation (securement of a detuning frequency)", "provision of recommended communication parameter information," etc. to minimize a possibility that an interference issue occurs among the wireless systems.

A "Data Repository" is a functional block that stores wireless system operator information, wireless system registration information (e.g., information described in <5.1>), frequency utilization information, a calculation result in each functional block, etc.

An "external entity (External Entity)" is a logical entity located outside the SAS (or an attendant apparatus of the SAS). The external entity is, for example, the external apparatus 70. The external entity may be the terminal apparatus 30. The external entity is typically an "apparatus" such as the terminal apparatus 30 and the external apparatus 70, but may have any of various forms as an entity.

For example, a Web browser is one form of the external entity. Accessing a dedicated website provided by the SAS with use of an apparatus having web browser software, such as a PC, a smart phone, and a game machine also corresponds to a relationship diagram illustrated in FIG. 25.

Further, for example, accessing the SAS (or an attendant apparatus of the SAS) with use of a software function other than the Web browser also corresponds to the external entity. For example, a command line tool such as cURL is also one form of the external entity. Further, for example, OA&M in a cellular system is also one form of the external entity.

6-2. Information Processing Apparatus

It is to be noted that a discovery process execution entity to be described below may be the SAS or may be an apparatus other than the SAS. for example, the discovery process execution entity may be an information processing apparatus to be described below.

Figure 27:
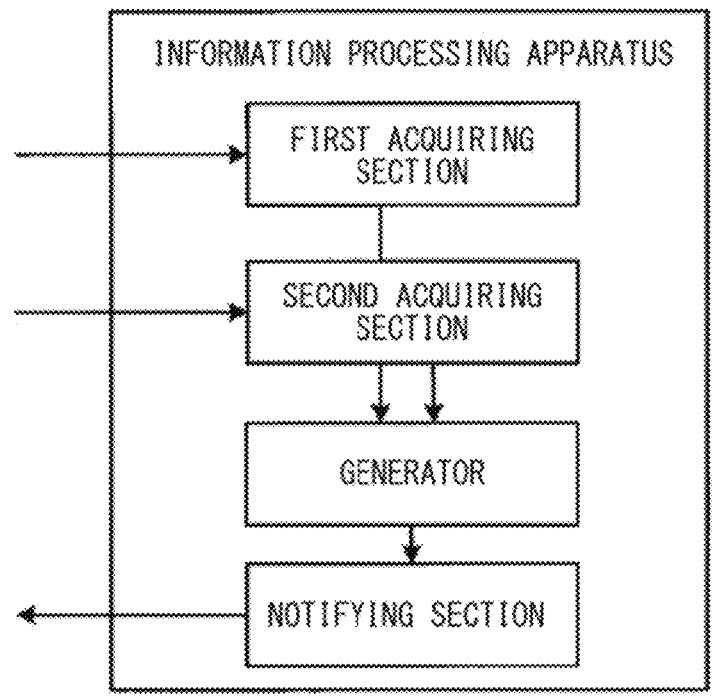
FIG. 27 is a diagram for explaining a functional configuration of an information processing apparatus.

FIG. 27 is a diagram for explaining a functional configuration of the information processing apparatus. The information processing apparatus illustrated in FIG. 27 is an example of the communication control apparatus 40, the proxy apparatus 50, or the server apparatus 60. The information processing apparatus includes a first acquiring section, a second acquiring section, a generator, and a notifying section. The first acquiring section has a configuration corresponding to the acquiring sections 441, 541, and 641. The first acquiring section acquires identification information for identifying a type of information related to secondary use of a frequency band used by a primary system (e.g., the communication system 1) and information related to a region. The second acquiring section has a configuration corresponding to the acquiring sections 441, 541, and 641. The second acquiring section acquires information (e.g., communication parameters, processed resource information, etc. reported to the base station apparatus 20) accumulated in association with control related to secondary use of a frequency band of the primary system (e.g., the communication system 1) by one or more secondary systems (e.g., the base station apparatus 20 of the communication system 2) that make secondary use of the frequency band. The generator has a configuration corresponding to the generators 442, 542, and 642. The generator generates information related to secondary use of the frequency band on the basis of the information acquired by the first acquiring section and the second acquiring section. The notifying section has a configuration corresponding to the transmitters 443, 543, and 643. The notifying section reports the information related to secondary use generated by the generator.

Figure 28:
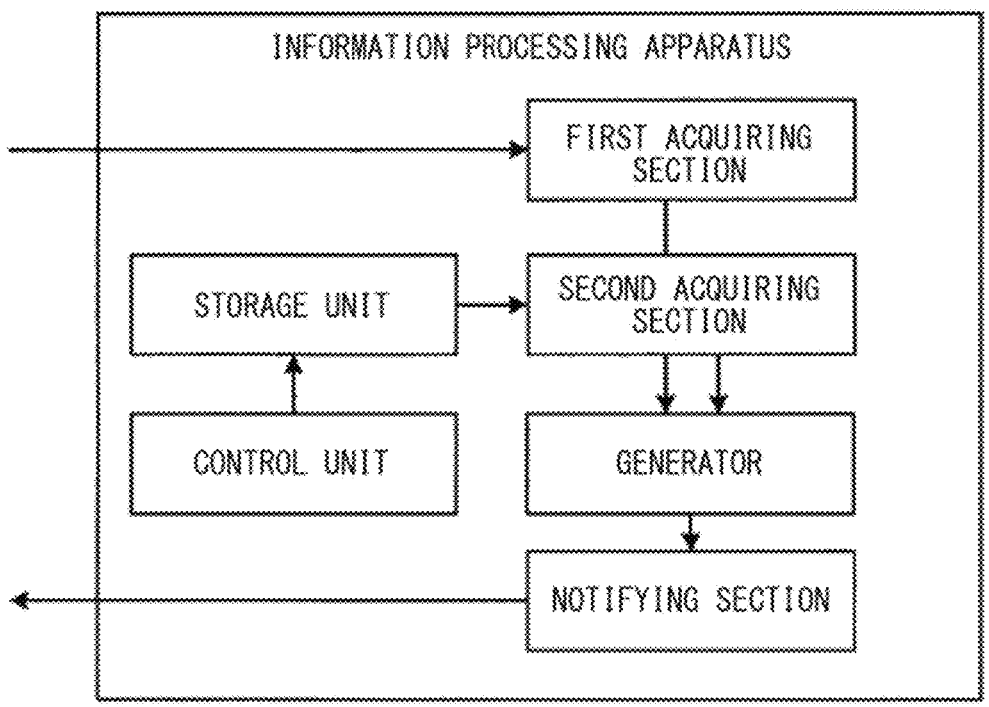
FIG. 28 is a diagram for explaining the functional configuration of the information processing apparatus.

It is to be noted that in a case where the information processing apparatus is the SAS, the functional configuration illustrated in FIG. 27 may be configured like FIG. 28. FIG. 28 is a diagram for explaining a functional configuration of the information processing apparatus. The information processing apparatus illustrated in FIG. 28 is, for example, one example of the communication control apparatus 40. The information processing apparatus includes a control unit and a storage unit in addition to the first acquiring section, the second acquiring section, the generator, and the notifying section. The control unit has a configuration corresponding to the communication control section 444. The control unit performs control related to secondary use, by one or more secondary systems, of a frequency band used by the primary system. The one or more secondary systems make secondary use of the frequency band. The storage unit has a configuration corresponding to the storage unit 42. The storage unit accumulates at least information used in the control unit and information outputted from the control unit. The second acquiring section acquires accumulated information from the storage unit. The generator extracts information corresponding to the identification information and the information related to the region acquired by the first acquiring section from the information acquired by the second acquiring section, and generates information related to secondary use on the basis of the corresponding information.

Figure 29:
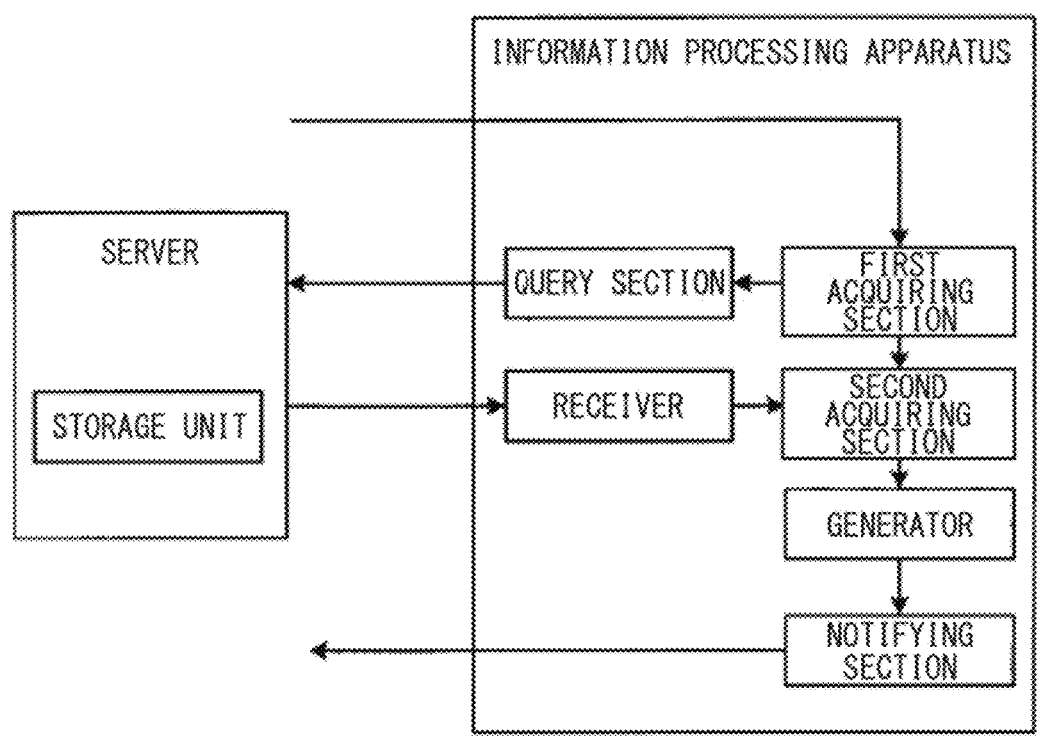
FIG. 29 is a diagram for explaining the functional configuration of the information processing apparatus.

It is to be noted that in a case where the information processing apparatus is an apparatus other than the SAS, the functional configuration illustrated in FIG. 27 may be configured like FIG. 29. FIG. 29 is a diagram for explaining a functional configuration of the information processing apparatus. The information processing apparatus illustrated in FIG. 29 is, for example, one example of the server apparatus 60 or the proxy apparatus 50. A query section has a configuration corresponding to the transmitters 543 and 643. The query section uses information acquired by the first acquiring section to put a query to a server (the server apparatus 60 or another server apparatus 60) including a storage unit that accumulates information accumulated in association with control related to secondary use of the frequency band used by the primary system. A receiver has a configuration corresponding to the acquiring sections 541 and 641. The receiver receives, from the server described above, information corresponding to the identification information and the information related to the region reported from the notifying section in the accumulated information. The generator generates secondary use information on the basis of the corresponding information, the identification information, and the information related to the region.

6-3. Discovery Procedure

Figure 30:
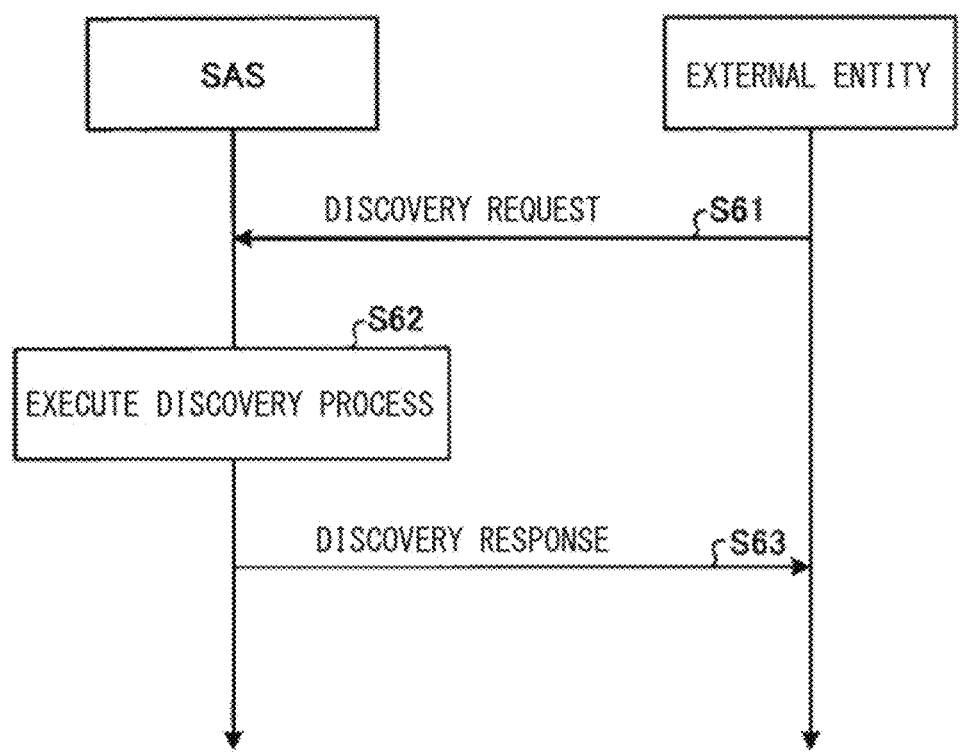
FIG. 30 is a sequence diagram illustrating a discovery procedure.

FIG. 30 is a sequence diagram illustrating a discovery procedure. A procedure of a basic portion of discovery may be similar to a procedure disclosed in PTL 1.

First, the external entity notifies the SAS of a discovery request (Discovery Request) (step S61). In this case, the discovery request includes at least "area-space information" and "desired information identification information". For example, the information transmitter 741 of the external apparatus 70 notifies the communication control apparatus 40 of the discovery request including the "area-space information" and the "desired information identification information". In this case, the acquiring section 441 of the communication control apparatus 40 acquires the discovery request including the "area-space information" and the "desired information identification information".
(Area-Space Information)

The "area-space information" is information related to a region. More specifically, the "area-space information" is designation information for designating a search range (an area and/or a space). The range designated by the "area-space information" may include one of the "area" and the "space" or both.

The "area information" is information indicating a geographic (or two-dimensional" search range. The area information may be, for example, information based on identification information indicating divisions defined by the administration, such as a postcode or an address. Further, the area information may be information about a region indicated by a set of geographic coordinates. Further, the area information may be information based on a name indicating a predetermined area (e.g., a name of a park).

The "Space information" is information indicating a spatial (or three-dimensional) search range. The space information may be, for example, information indicating a predetermined closed space (e.g., building floor information, etc.), or information indicating a building (e.g., a building name, a stadium name, etc.). Further, the space information may be, for example, spherical space information (e.g., a combination of an origin (position information+height information) and a radius, etc.).

The "area-space information" included in the discovery request may be one of the area information and the space information. Alternatively, the "area-space information" included in the discovery request may include both the area information and the space information. The discovery request includes at least one of the area information or the space information.

It is desirable that the SAS be able to recognize at least the "area information". It is desirable to notify the external entity of which information the SAS is able to recognize in advance.

It is to be noted that the smaller the search range indicated by the "area-space information" is, the closer to a "point" the search range becomes, which can cause loss of confidentiality of information. Further, a larger search range indicated by the "area-space information" can cause not only an increase in a calculation load of the SAS, but also a decrease in an information value. It is therefore desirable to put limitations corresponding to a maximum size and/or a minimum size (hereinafter referred to as size limitations) on the "area-space information".

In this case, the SAS may notify the external entity of the size limitations in advance. Then, the external entity may set the "area-space information" included in the discovery request on the basis of the size limitations reported by the SAS.

Further, upon receiving a request with the area-space information, the SAS may determine whether or not the search range indicated by the area-space information exceeds the size limitations, and in a case where the search range exceeds the size limitations, the SAS may notify the external entity that the search range exceeds the size limitations. It is to be noted that values of the size limitations may be set on the basis of values determined in advance by standards, regulations, or the like.

It is to be noted that the external entity may use the values determined in advance by standards, regulations, or the like as size limitations for setting the "area-space information" to generate (or designate) the "area-space information".
(Desired Information Identification Information)

The "desired information identification information" is information indicating what information the external entity desires. Specifically, the desired information identification information is identification information for identifying the type of information (secondary use information) related to secondary use of the frequency band used by the primary system. Examples of identifiers that may be used as the desired information identification information are listed in the following (A) to (F). It is to be noted that the desired information identification information may also include information other than the following (A) to (F).

(A) Available-frequency information in a designated area or a designated space
(B) Maximum allowable transmission power range at an available frequency in a designated area or a designated space
(C) Recommended-frequency information in a designated area or a designated space
(D) Recommended transmission power range at a recommended frequency in a designated area or a designated space
(E) Use prohibited-frequency information in a designated area or a designated space
(F) Recommended-installation position information in a designated area or a designated space After receiving the discovery request, the SAS performs a discovery process (Discovery Process) on the basis of the "desired information identification information" and the "area-space information" included in the request to generate response information (step S62). For example, assuming that the SAS is the communication control apparatus 40, the generator 442 of the communication control apparatus 40 generates secondary use information in a designated area (or a designated space) designated by the "area-space information". The secondary use information generated by the generator 442 is secondary use information designated by the "desired information identification information". It is to be noted that the generator 442 may generate this secondary use information on the basis of information (e.g., communication parameters of the base station apparatus 20) accumulated in the storage unit 42 by the communication control section 444 in association with control of the base station apparatus 20. An execution example of the discovery process corresponding to the "desired information identification information" will be described later.

The SAS notifies the external entity of the generated response information as a discovery response (Discovery Response) (step S63). For example, the transmitter 443 of the communication control apparatus 40 transmits the secondary use information designated by the "desired information identification information" to the external apparatus 70. The information acquiring section 742 of the external apparatus 70 acquires the secondary use information. Then, the information output section 743 of the external apparatus 70 outputs the secondary use information to the input-output unit 73 (e.g., a display).

Execution examples of the discovery process corresponding to (A) to (F) will be described below. It is to be noted that area information is assumed to be designated as the "area-space information". Needless to say, space information may be designated as the "area-space information". It is to be noted that even in a case where the space information is designated, the SAS is able to generate a response by a process similar to the following process. In the following description, an area (or a space) designated as the search range by the discovery request is sometimes referred to as a designated area. Further, a space designated as the search range by the discovery request is sometimes referred to as a designated space.

6-4. Available-Frequency Information

First, a discovery process in a case where (A) "Available-frequency information in a designated area or a designated space" is designated as the "desired information identification information" will be described.

Figure 31:
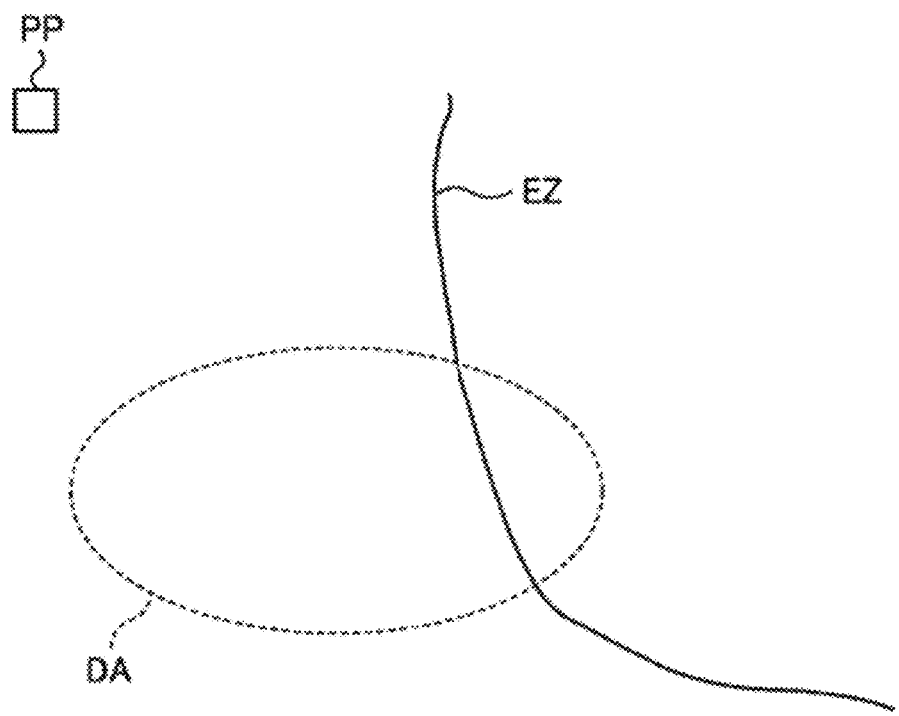
FIG. 31 is a diagram for explaining a discovery process in a case where available-frequency information in a designated area or a designated space is designated as desired information identification information.

FIG. 31 is a diagram for explaining a discovery process in a case where available-frequency information in a desig-nated area or a designated space is designated as the desired information identification information. In the present embodiment, for ease of understanding, an interference model illustrated in FIG. 31 is assumed. In a region illustrated in FIG. 31, a protection point PP and an exclusion zone EZ are specified by a legal system or the like. In the example of FIG. 31, an area indicated by a broken line (a designated area DA) is an area designated as a search range by the external entity.

Here, the protection point (Protection Point) is, for example, an interference calculation reference point set by an administrator of the primary system (e.g., the communication system 1). The exclusion zone (Exclusion Zone) is an area where secondary use of a portion or the entirety of a predetermined frequency is prohibited to protect the primary system (e.g., the communication system 1) using the predetermined frequency.

In the example of FIG. 31, the designated area DA partially overlaps with the exclusion zone EZ. Assuming that an entire frequency range is [fmin, fmax] and a frequency range (or a channel) associated with the exclusion zone EZ is $[f_{min,\ exz}, f_{max,\ exz}]$, the SAS is able to calculate the available-frequency information (a set of available channels $C_{available}$) in the area by the following expression (3).

[Math. 1]

$$\begin{cases} C_{available} \in [f_{min}, f_{max}] \\ C_{available} \notin [f_{min,exz}, f_{max,exz}] \end{cases} \quad (3)$$

In the example of FIG. 31, the protection point PP is also present. In such a case, the SAS generates the "available-frequency information in the designated area DA" by considering interference that may be caused at the protection point PP. In this case, the SAS may generate the "available-frequency information in the designated area DA" on the basis of information (e.g., communication parameters, possessed resource information, etc. reported to the CBSD) accumulated in association with control related to secondary use of a frequency band used by the primary system. For example, the SAS sets the "available-frequency information in the designated area DA" by using the "available-frequency information" that has been provided to the CBSD that is under management and belongs to the designated area DA. The CBSD may be the base station apparatus 20. Here, the "available-frequency information" that has been provided by the SAS is, for example, available-frequency information that has been provided to the base station apparatus 20 (e.g., the CBSD) by the communication control apparatus 40 (e.g., the SAS) by the process described in <5-2. Available-Frequency Information Query Procedure>.

It is to be noted that the available frequency is assumed to differ depending on the position of the CBSD. For this reason, in a case where a plurality of CBSDs is present in the designated area DA, available-frequency information to be provided to each of the plurality of CBSDs is assumed to be information about a combination of channels that differs depending on the position of each of the CBSDs. Accordingly, the SAS may set, as available-frequency information, information about a common available frequency channel in the available-frequency information that has been provided to each of the plurality of CBSDs belonging to the designated area DA.

Figure 32:
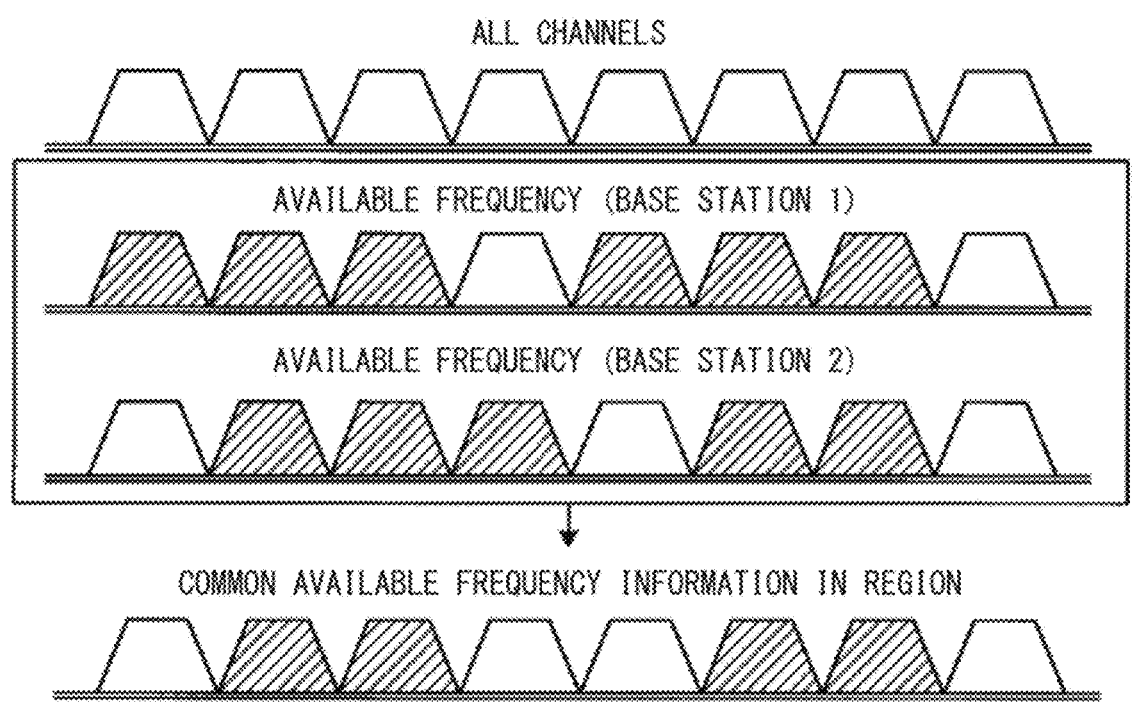
FIG. 32 is a diagram illustrating an example of generation of available-frequency information in a designated area.

FIG. 32 is a diagram illustrating an example of generation of available-frequency information in the designated area DA. For example, assume that a base station 1 and a base station 2 are present in the designated area DA and the SAS has notified the base station 1 of six channels (the second tier in FIG. 32) as the available frequencies of total eight channels and has notified the base station 2 of five channels (the third tier in FIG. 32) as the available frequencies of total eight channels. In this case, the SAS notifies the external entity of four channels that are common to both the base stations as the "available-frequency information in the designated area DA".

It is to be noted that for generation of the "available-frequency information in the designated area DA", the SAS may refer to an information generation time of the available-frequency information provided to the CBSD (e.g., a time stamp indicating a time when the available-frequency information is generated). Then, the SAS may take measures such as not regarding available-frequency information with a lapse of a predetermined time or more from being provided to the CBSD as a target of the discovery process. For example, in the example described above, assume that at the time of receiving the discovery request by the communication control apparatus 40 (or at the time of executing the discovery process), of three pieces of used-frequency information provided to the respective base station apparatuses $20_1$ to $20_3$, only one piece of used number frequency information ("frequencies F1 to F2") provided to the base station apparatus $20_1$ with a lapse of a predetermined time or more from being provided to the base station apparatus $20_1$. In this case, the communication control apparatus 40 notifies the external entity of "frequencies F3 to F5" common to other two pieces of used number frequency information ("frequencies F2 to F5" and "frequencies F3 to F6") as the "available-frequency information in the designated area DA".

Such a method makes it possible for the SAS to set available-frequency information by considering interference power without additionally performing interference calculation. Further, information (such as an ID and a position) allowing identification of individual CBSDs, operation parameters (such as transmission power and frequencies), or operator information (such as an operator name and a call sign) is not disclosed, which makes it possible to keep confidentiality of information.

It is to be noted that the SAS may generate the "available-frequency information in the designated area DA" by additionally performing interference calculation.

The "desired information identification information" transmitted by the external entity may include information for designating a method of determining a used number frequency in the designated area DA. For example, the "desired information identification information" may include information indicating that one of determination of an available frequency based on region information such as the exclusion zone EZ and determination of an available frequency based on an interference power level such as the protection point PP is to be performed or both are to be performed. Alternatively, the SAS may notify the external entity of a determination method providable by SLA (Service Level Agreement), etc. in advance.

Further, the SAS may add information such as a maximum bandwidth to the "available-frequency information in the designated area DA".

6-5. Maximum Allowable Transmission Power Range at Available Frequency

Next, a discovery process in a case where (B) the "maximum allowable transmission power range at an available frequency in a designated area or a designated space" is designated as the "desired information identification information" will be described.

The maximum allowable transmission power range is a maximum allowable transmission power range at an available frequency in a predetermined area or a predetermined space. Maximum allowable transmission power is a maximum value of transmission power allowed by the base station apparatus 20 (e.g., the CBSD), and the maximum allowable transmission power differs depending on a position in an area or in a space. For this reason, in a case where the SAS provides the maximum allowable transmission power at the available frequency in the designated area or the designated space to the external entity, it is necessary to provide the maximum allowable transmission power as information with ranges (range information).

This discovery process is implementable by application of the process described in <6-4. Available-Frequency Information>. Specifically, in a case where the "maximum allowable transmission power information" is included in available-frequency information that has been provided to the CBSD that is under management and belongs to the designated area DA, the SAS sets a "maximum allowable transmission power range at an available frequency of available-frequency information in the designated area DA" on the basis of the "maximum allowable transmission power information". Here, the "maximum allowable transmission power information" is, for example, a maximum value of transmission power allowed by the base station apparatus 20 (e.g., the CBSD), and is information to be provided to the base station apparatus 20 by the communication control apparatus 40 (e.g., the SAS) by the process described in <5-2. Available-Frequency Information Query Procedure>.

Here, the SAS may specify a maximum value and a minimum value of a plurality of maximum allowable transmission powers reported to a plurality of CBSDs belonging to the designated area DA, and notify the external entity of range information that the specified maximum value and the specified minimum value are respectively a maximum value and a minimum value of a range, as the maximum allowable transmission power range.

Figure 33:
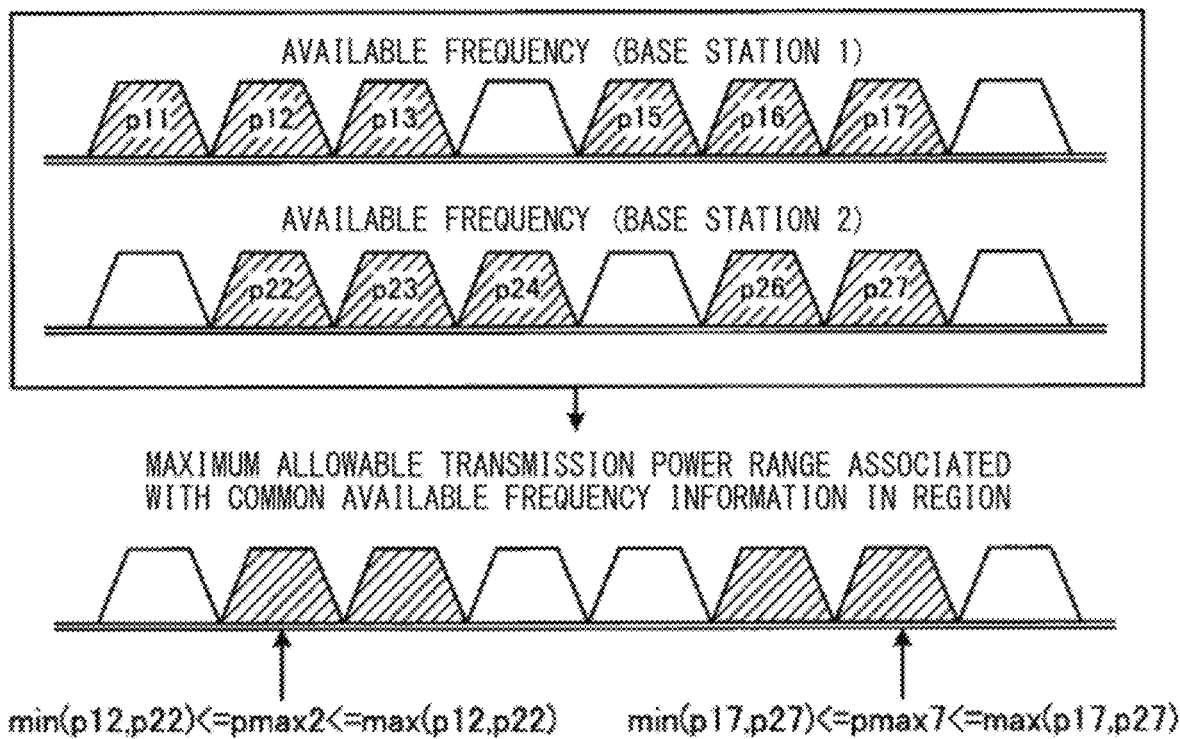
FIG. 33 is a diagram for explaining a maximum allowable transmission power range in available-frequency information in a designated area.

FIG. 33 is a diagram for explaining a maximum allowable transmission power range in available-frequency information in the designated area DA. For example, assume that the base station 1 and the base station 2 are present in the designated area DA and the SAS has notified the base station 1 of six channels (the second tier in FIG. 33) as the available frequencies of total eight channels and has notified the base station 2 of five channels (the third tier in FIG. 33) as the available frequencies of total eight channels. In this case, the SAS regards four channels that are common to both the base stations as the "available-frequency information in the designated area DA". Then, the SAS specifies the maximum value and the minimum value of the maximum allowable transmission power for each of available frequencies of the four channels.

For example, in the example of FIG. 33, a frequency p12 available to the base station 1 and a frequency p22 available to the base station 2 are the same channel, which is one of the four channels of the "available frequencies in the designated area DA". The SAS specifies the maximum value and the minimum value of the maximum allowable transmission power allocated to each of the frequency p12 and the frequency p22. Then, the specified maximum value and the specified minimum value are regarded as the maximum allowable transmission power range at the available frequency.

Further, a frequency p17 available to the base station 1 and a frequency p27 available to the base station 2 are the same channel, which is one of the four channels of the "available frequencies in the designated area DA". The SAS specifies the maximum value and the minimum value of the maximum allowable transmission power allocated to each of the frequency p17 and the frequency p27. Then, the specified maximum value and the specified minimum value are regarded as the maximum allowable transmission power range at the available frequency.

Needless to say, the SAS may specify the maximum values and the minimum values of the maximum allowable transmission powers of all the four channels of the available frequencies instead of the maximum value and the minimum value of the maximum allowable transmission power of one channel of the four channels of the "available frequencies in the designated area DA", and may regard the specified maximum values and the specified minimum values as the maximum allowable transmission power range at the available frequencies.

It is to be noted that this is a value outputted on the basis of information of the registered CBSD. Accordingly, it is desirable that the SAS notify the external entity that "there is a possibility that in a case where a wireless device is actually installed, the maximum allowable transmission power falls below the minimum value included in this information".

Figure 34:
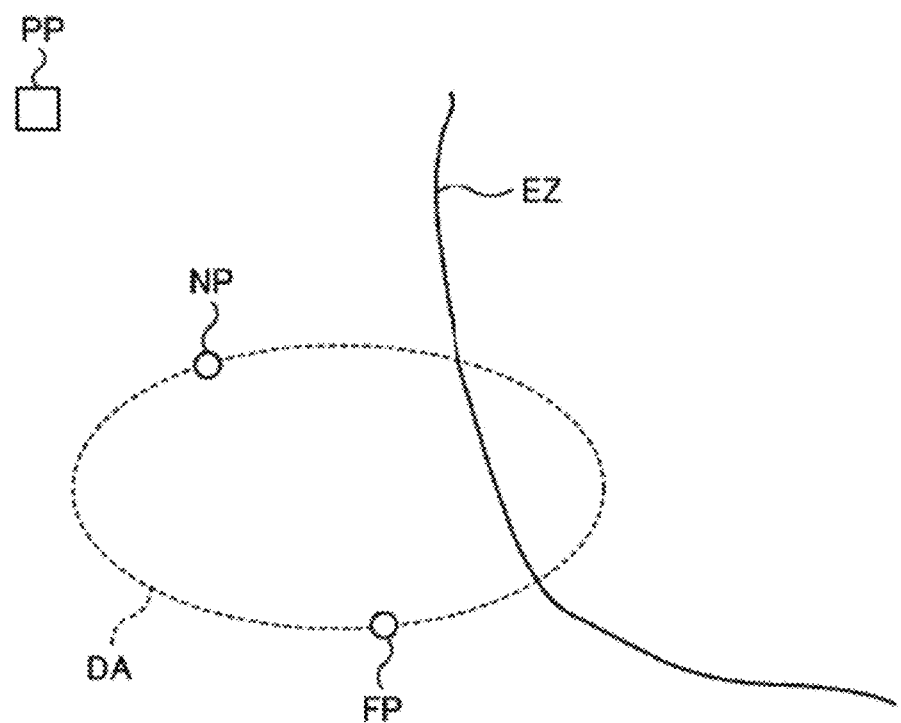
FIG. 34 is a diagram for explaining an example of setting the maximum allowable transmission power range by performing interference calculation.

It is to be noted that the SAS may set the maximum allowable transmission power range by actually performing interference calculation. FIG. 34 is a diagram for explaining an example of setting the maximum allowable transmission power range by performing interference calculation. For example, as illustrated in FIG. 34, the SAS specifies a nearest point NP and a farthest point FP with respect to the protection point PP. Then, the SAS may regard transmission powers allowed at the respective points as the maximum value of the maximum allowable transmission power range and the minimum value of the maximum allowable transmission power range. More specifically, the SAS regards a range whose maximum value and minimum value are respectively the maximum allowable transmission power at the available frequency at the farthest point FP and the maximum allowable transmission power at the available frequency at the nearest point NP as the "maximum allowable transmission power range at the available frequency in the designated area DA". In addition, for example, in a case where aggregated interference power is considered, the SAS may perform calculation by factoring in a predetermined interference margin value.

6-6. Recommended-Frequency Information

Next, a discovery process in a case where (C) the "recommended-frequency information in a designated area or designated space" is designated as the "desired information identification information" will be described.

The recommended-frequency information is information about a frequency recommended in a predetermined area or a predetermined space.

It is desirable to perform this discovery process on the basis of the "available-frequency information in the designated area or the designated space" described in <6-4. Available-Frequency Information>. For example, the SAS generates "recommended-frequency information in a designated area or a designated space" on the basis of a frequency channel (hereinafter referred to as $C_{used}$) being used by a wireless system belonging to the designated area or the designated space of the CBSDs managed by the SAS, and the set of available channels $C_{available}$. In this case, the SAS is able to calculate a set of recommended frequencies $C_{recommended}$ in the designated area or the designated space by the following expression (4). In the expression (4), "\" indicates set difference.

[Math. 2]

$$C_{recommended} = C_{available} \backslash C_{used} \qquad (4)$$

Figure 35:
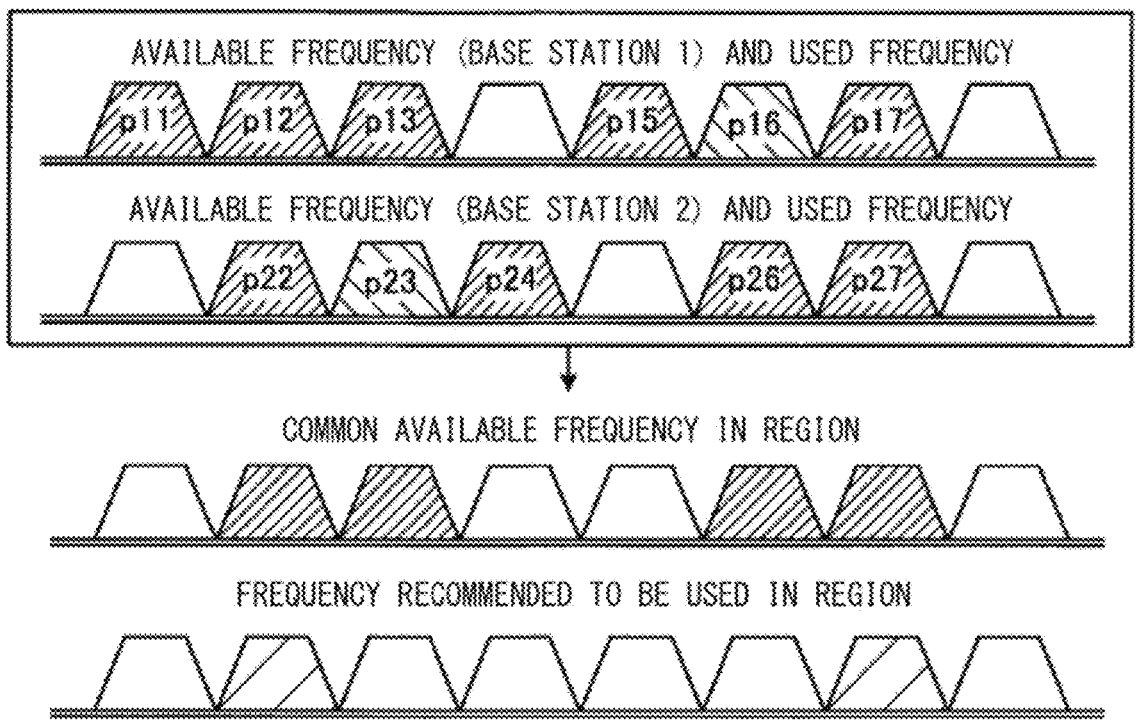
FIG. 35 is a diagram illustrating an example of generation of recommended-frequency information in a designated area.

FIG. 35 is a diagram illustrating an example of generation of recommended-frequency information in the designated area DA. For example, assume that the base station 1 and the base station 2 are present in the designated area DA and the SAS has notified the base station 1 of six channels (the first tier in FIG. 35) as the available frequencies of total eight channels and has notified the base station 2 of five channels (the second tier in FIG. 35) as the available frequencies of total eight channels. In this case, the SAS specifies four channels (the third tier in FIG. 35) that are common to both the base stations as the "available-frequency information in the designated area DA". Then, the SAS specifies a channel being used by each of the base station 1 and the base station 2. In this case, the SAS may specify the channel being used by detecting radio waves by itself, or may specify the channel being used by information from another apparatus (e.g., the base stations 1 and 2). In the example of FIG. 35, the base station 1 is using a frequency p16, and the base station 2 is using a frequency p23. The SAS regards two channels (the fourth tier in FIG. 35) excluding two channels being used of the four channels (the third tier in FIG. 35) of the available frequencies as recommended frequencies in the designated area DA.

It is to be noted that if a channel in $C_{available}$ does not perfectly match $C_{used}$ but partially overlaps with $C_{used}$, the SAS may set $C_{recommended}$ by excluding the channel.

Such a method makes it possible to set the recommended-frequency information by considering interference power without additionally performing interference calculation. Further, information (such as an ID and a position) allowing identification of individual CBSDs, operation parameters (such as transmission power and frequencies), or operator information (such as an operator name and a call sign) is not disclosed, which makes it possible to keep confidentiality of information.

Further, the SAS may add information such as a maximum bandwidth to the "recommended-frequency information in the designated area or the designated space".

6-7. Recommended Transmission Power Range at Recommended Frequency

Next, a discovery process in a case where (D) "Recommended transmission power range at a recommended frequency in a designated area or a designated space" is designated as the "desired information identification information" will be described.

The recommended allowable transmission power range is a maximum allowable transmission power range at a recommended frequency in a predetermined area or a predetermined space. As described above, the maximum allowable transmission power is the maximum value of transmission power allowed by the base station apparatus 20 (e.g., the CBSD), and the maximum allowable transmission power differs depending on a position in an area or a space. For this reason, in a case where the SAS provides the maximum allowable transmission power at the recommended frequency in the designated area or the designated space to the external entity, it is necessary to provide information with ranges (range information).

This discovery process is implementable by application of the process described in <6-5. Maximum Allowable Transmission Power Range at Available Frequency> and <6-6. Recommended-Frequency Information>. Specifically, the SAS is able to generate the "recommended transmission power range at the recommended frequency in the designated area or the designated space" by specifying the maximum transmission power range (refer to <6-5>) corresponding to the recommended frequency in the designated area and the designated space (refer to <6-6>).

Figure 36:
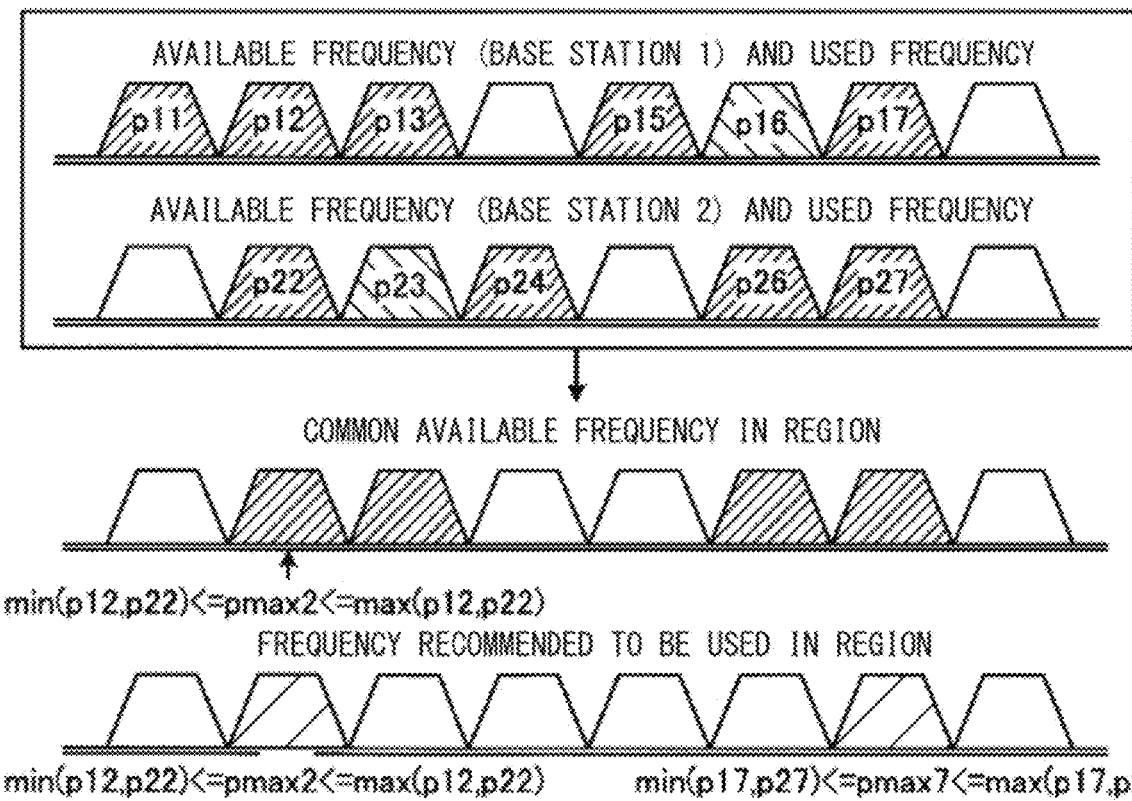
FIG. 36 is a diagram illustrating an example of generation of recommended-frequency information in recommended-frequency information in a designated area DA.

FIG. 36 is a diagram illustrating an example of generation of recommended-frequency information in the recommended-frequency information in the designated area. For example, assume that the base station 1 and the base station 2 are present in the designated area DA and the SAS has notified the base station 1 of six channels (the first tier in FIG. 36) as the available frequencies of total eight channels and has notified the base station 2 of five channels (the second tier in FIG. 36) as the available frequencies of total eight channels. In this case, the SAS specifies four channels (the third tier in FIG. 36) that are common to both the base stations as the "available-frequency information in the designated area DA". Then, the SAS specifies two channels (the fourth tier in FIG. 36) excluding two channels being used of the four channels (the third tier in FIG. 35) of the available frequencies as recommended frequencies in the designated area DA. Then, the SAS specifies the maximum value and the minimum value of the maximum allowable transmission power at each of recommended frequencies of the two channels.

For example, in the example of FIG. 36, the frequency p12 and the frequency p22 are the same channel, which is one of the two channels of the "recommended frequencies in the designated area DA". The SAS specifies the maximum value and the minimum value of the maximum allowable transmission power allocated to each of the frequency p12 and the frequency p22. Then, the specified maximum value and the specified minimum value are regarded as the recommended transmission power range at the recommended frequency.

Further, the frequency p17 and the frequency p27 are the same channel, which is one of the two channels of the "recommended frequencies in the designated area DA". The SAS specifies the maximum value and the minimum value of the maximum allowable transmission power allocated to each of the frequency p17 and the frequency p27. Then, the specified maximum value and the specified minimum value are regarded as the maximum allowable transmission power range at the recommended frequency.

Needless to say, the SAS may specify the maximum values and the minimum values of the maximum allowable transmission powers of all the two channels of the recommended-frequency information instead of the maximum value and the minimum value of the maximum allowable transmission power of one channel of the two channels of the "recommended frequencies in the designated area DA", and may regard the specified maximum values and the specified minimum values as the recommended transmission power range at the recommended frequencies.

It is to be noted that this is a value outputted on the basis of information of the registered CBSD. Accordingly, it is desirable that the SAS notify the external entity that "there is a possibility that in a case where a wireless device is actually installed, the recommended transmission power falls below the minimum value included in this information".

It is to be noted that the SAS may set the recommended transmission power range by actually performing interference calculation. For example, as illustrated in FIG. 34, the SAS specifies the nearest point NP and the farthest point FP with respect to the protection point PP. Then, the SAS may regard transmission powers allowed at the respective points as the maximum value of the recommended transmission power range and the minimum value of the recommended transmission power range. More specifically, the SAS regards a range whose maximum value and minimum value are respectively the maximum allowable transmission power at the recommended frequency at the farthest point FP and the recommended transmission power at the recommended frequency at the nearest point NP as the "recommended transmission power range at the recommended frequency in the designated area DA". In addition, for example, in a case where aggregated interference power is considered, the SAS may perform calculation by factoring in a predetermined interference margin value.

Such a method makes it possible for the SAS to set the recommended transmission power range by considering interference power without additionally performing interference calculation. Further, information (such as an ID and a position) allowing identification of individual CBSDs, operation parameters (such as transmission power and frequencies), or operator information (such as an operator name and a call sign) is not disclosed, which makes it possible to keep confidentiality of information.

6-8. Use Prohibited-Frequency Information

Next, a discovery process in a case where (E) "Use prohibited-frequency information in a designated area or a designated space" is designated as the "desired information identification information" will be described.

The recommended-frequency information is information about a frequency of which use is prohibited in a designated area or a designated space.

This discovery process is implementable by application of the process described in <6-4. Available-Frequency Information>. Specifically, the SAS specifies an available frequency in the designated area DA on the basis of the available-frequency information that has been provided to the CBSD that is under management and belongs to the designated area DA. Then, the SAS specifies, as a use prohibited frequency, a frequency other than the specified available frequencies of frequencies of which use is allowed by regulations, standards, or the like.

It is to be noted that the SAS may specify, as the use prohibited frequency, a frequency of which output from a higher level system is prohibited as it is, such as a use prohibited frequency set as the exclusive zone EZ.

6-9. Recommended-Installation Position Information

Next, a discovery process in a case where (F) "Recommended-installation position information in a designated area or a designated space" is designated as the "desired information identification information" will be described.

As an applied practical example, the SAS may generate recommended-installation position information in a designated area or a designated space as auxiliary information for newly installing a wireless system. In this case, the SAS may report, as a discovery response, for example, area information (recommended-installation range information) indicating a recommended installation position, or information about a set of recommended installation positions (e.g., information about a set of recommended installation points). In this practical example, it is desirable that the external entity notify the SAS of a discovery request enclosed with a frequency range to be inquired.

For example, it is possible to set this information by using the recommended-frequency information (refer to <6-6>). In this case, in a case where a requested frequency range is not included in the recommended-frequency information, the SAS may notify the external entity that the recommended installation position is not present. In this case, in a case where the requested frequency range is included in the available frequency range, the SAS may report a message that "installation may be performed, but operation in the requested frequency range is not recommended".

For example, the SAS may separate the designated area or the designated space into grids, and determine whether or not each of the grids is a recommended position for installation, and set a set of positions that are determined to be recommended as the recommended-installation position information.

6-10. External Entity-Related Implementation Example

Next, an external entity-related implementation example will be described.

The external entity is typically an "apparatus" such as the terminal apparatus 30 and the external apparatus 70, but may be a Web browser. In this case, a server (e.g., the server apparatus 60) that provides a dedicated website for access to the SAS may be prepared. A user who desires secondary use information browses the dedicated website for access to the SAS through the Web browser. It is to be noted that to give browsing rights, the server (or the SAS) may be configured to be able to issue a user account to an accessor on the external entity side.

The server may be configured to display a map in a case where the user who desires the secondary use information accesses the dedicated website. The map may be configured to allow optional designation of a region. In a case where the user designates a region, the region is converted into "area information" (or "space information"), and a discovery request is generated. The Web browser transmits the generated discovery request to the server (or the SAS).

A method of designating a region may be implemented by various means. For example, the method of designating a region may be a method in which an entry field of an area name is provided in a GUI and the area name is inputted to the entry field. Further, the method of designating a region may be a method in which one of divisions overlayed on the map in advance is clicked. Further, the method of designating a region may be a method by voice input. In addition to these methods, the method of designating a region may be implemented by various methods.

The discovery response may also be implemented by various methods. For example, the discovery response may be implemented by notification by e-mail. In this case, data in various file formats such as a kml file and json file may be attached to the response. Further, the discovery response may also be implemented by, for example, a method such as overlaying and displaying contents of the response on a map and displaying a data table outside a map.

Further, an apparatus that performs a process (e.g., the discovery process) of the present embodiment may be provided separately from the SAS. The apparatus that performs the process of the present embodiment may be, for example, another web application server. In such a case, the external entity may be considered as a PC of the user. A web application server having received a request from the external entity is able to perform a necessary process in cooperation with the SAS and return a response.

6-11. Use Examples

The present embodiment is applicable to, for example, GAA Spectrum Coordination.

Enabling to know a frequency utilization situation in an area where installation is considered before installation is beneficial to a CBSD user. Accordingly, the CBSD user access the SAS to know the frequency utilization situation in an area under consideration in advance. It is possible to install the CBSD and perform acquisition of a grant (Grant) and radio wave transmission on the basis of this. Thus, a possibility that a cleaner frequency is available even in GAA is increased.

Needless to say, the present embodiment may be applied not only to this example but also to any example.

7. MODIFICATION EXAMPLES

The embodiments described above illustrate examples, and various changes and applications are possible.

7-1. Modification Examples Related to System Configuration

The communication control apparatus 40 of the present embodiment is not limited to the apparatus described in the above embodiment. For example, the communication control apparatus 40 may be an apparatus having a function other than controlling the base station apparatus 20 that makes secondary use of the frequency band where frequency sharing is performed. For example, the function of the communication control apparatus 40 of the present embodiment may be provided for a network manager. In this case, the network manager may be, for example, a C-BBU (Centralized Base Band Unit) of a network configuration called a C-RAN (Centralized Radio Access Network) or an apparatus including the same. The function of the network manager may also be provided for a base station (including an access point). These apparatuses (e.g., network managers) may also be regarded as communication control apparatuses.

It is to be noted that in the above embodiment, the communication system 1 is the first wireless system, and the base station apparatus 20 is the second wireless system. However, the first wireless system and the second wireless system are not limited to this example. For example, the first wireless system may be a communication apparatus (e.g., the wireless communication apparatus 10), or the second wireless system may be a communication system (the communication system 2). It is to be noted that the wireless system appearing in the present embodiment is not limited to a system including a plurality of apparatuses, and may be replaced with an "apparatus", a "terminal", or the like as appropriate.

Further, in the above-described embodiment, the communication control apparatus 40 is assumed to be an apparatus belonging to the communication system 2, but it may not necessarily be an apparatus belonging to the communication system 2. The communication control apparatus 40 may be an apparatus outside the communication system 2. The communication control apparatus 40 may indirectly control the base station apparatus 20 via an apparatus constituting the communication system 2, without directly controlling the base station apparatus 20. Further, a plurality of secondary systems (communication systems 2) may be present. In this case, the communication control apparatus 40 may manage the plurality of secondary systems. In this case, each secondary system may be regarded as the second wireless system.

It is to be noted that, generally in frequency sharing, the existing system using the target band is referred to as a primary system, and the secondary user is referred to as a secondary system, but the primary system and the secondary system may be replaced with other terms. A macrocell in a HetNET (Heterogeneous Network) may be used as the primary system, and a small cell or a relay station may be used as the secondary system. In addition, a base station may be used as the primary system, and a Relay UE or Vehicle UE present in its coverage and implementing D2D or V2X (Vehicle-to-Everything) may be used as the secondary system. The base station is not limited to a fixed type, and may be a portable/mobile type.

In addition, the interfaces between entities may be either wired or wireless. For example, the interface between the entities (a communication apparatus, a communication control apparatus, or a terminal apparatus) appearing in the present embodiment may be a wireless interface independent of frequency sharing. Examples of the wireless interface independent of frequency sharing include a wireless interface provided by a mobile network operator via a Licensed band, and wireless LAN communication using an existing unlicensed band.

7-2. Other Modification Examples

A control apparatus that controls the wireless communication apparatus 10, the base station apparatus 20, the terminal apparatus 30, the communication control apparatus 40, the proxy apparatus 50, the server apparatus 60, or the external apparatus 70 of the present embodiment may be implemented by a dedicated computer system or may be implemented by a general-purpose computer system.

For example, a program for execution of the above-described operations is stored in a computer-readable recording medium such as an optical disk, a semiconductor memory, a magnetic tape, or a flexible disk, and distributed. Then, for example, the control apparatus is configured by installing the program in a computer and executing the above-described process. In this case, the control apparatus may be an apparatus (e.g., a personal computer) outside the wireless communication apparatus 10, the base station apparatus 20, the terminal apparatus 30, the communication control apparatus 40, the proxy apparatus 50, the server apparatus 60, or the external apparatus 70. The control apparatus may also be an apparatus (e.g., the control unit 24, the control unit 34, the control unit 44, the control unit 54, the control unit 64, or the control unit 74) inside the wireless communication apparatus 10, the base station apparatus 20, the terminal apparatus 30, the communication control apparatus 40, the proxy apparatus 50, the server apparatus 60, or the external apparatus 70.

In addition, the above-described communication program may be stored in a disk apparatus provided in a server apparatus on a network such as the Internet to be able to be downloaded to a computer, for example. Further, the above-described functions may be implemented by collaboration between an operating system (Operating System) and application software. In this case, a portion other than the OS may be stored in a medium and distributed, or a portion other than the OS may be stored in a server apparatus to be able to be downloaded to a computer, for example.

Further, among the processes described in the above embodiment, all or part of the process described as being performed automatically may also be manually performed, or all or part of the process described as being performed manually may also be performed automatically by a known method. In addition to this, the processing steps, specific names, and information including various data and parameters illustrated in the above specification and in the drawings may be freely changed, unless otherwise noted. For example, various information illustrated in the drawings is not limited to the illustrated information.

Further, the illustrated components of each apparatus are functional concepts and do not necessarily have to be physically configured as illustrated. That is, a specific form of the distribution and integration of each apparatus is not limited to the illustrated one, and all or part thereof may be functionally or physically distributed and integrated in any unit depending on various loads, use situations, etc.

Further, it is possible to appropriately combine the above-described embodiments within a scope that does not cause contradiction in the processing contents. Further, it is possible to appropriately change the order of the steps illustrated in the sequence diagrams or flow charts of the present embodiment.

8. CONCLUSION

As described above, according to one embodiment of the present disclosure, the communication control apparatus 40 acquires designation information for designating an area or a space together with identification information for identifying the type of secondary use information related to secondary use of radio waves of a frequency band used by the communication system 1. Then, the communication control apparatus 40 generates secondary use information in a designated area or a designated space designated by the designation information. The secondary use information is secondary use information designated by the identification information. Then, the communication control apparatus 40 transmits the generated secondary use information to the external apparatus 70.

Thus, it is possible to disclose highly valuable secondary use information for the general user while paying attention not to disclose the know-how, etc. of a user who makes secondary use of radio waves of the communication system 1. As a result, efficient use of radio wave resources is achieved.

Although the embodiments of the present disclosure have been described above, the technical scope of the present disclosure is not limited to the above-described embodiments as they are, and various modifications may be made without departing from the scope of the present disclosure. Further, the components may be appropriately combined over different embodiments and modification examples.

In addition, the effects in the embodiments described herein are merely illustrative and not limitative, and other effects may be achieved.

It is to be noted that the present technology may also have the following configurations.

(1)

An information processing apparatus including:
a first acquiring section that acquires identification information and information related to a region, the identification information being for identifying a type of information related to secondary use of a frequency band used by a first wireless system;
a second acquiring section that acquires information accumulated in association with control related to secondary use of the frequency band by one or more second wireless systems that make secondary use of the frequency band;
a generator that generates information related to secondary use of the frequency band on the basis of information acquired by the first acquiring section and the second acquiring section; and
a notifying section that reports the information related to the secondary use generated by the generator.

(2)

The information processing apparatus according to (1), including:
a control unit that performs control related to secondary use of the frequency band by the one or more second wireless systems that make secondary use of the frequency band used by the first wireless system; and
a storage unit that accumulates at least information to be used by the control unit and information to be outputted from the control unit, in which
the second acquiring section acquires the accumulated information from the storage unit, and
the generator extracts information corresponding to the identification information and the information related to the region acquired by the first acquiring section from the information acquired by the second acquiring section, and generates the information related to the secondary use on the basis of the corresponding information.

(3)

The information processing apparatus according to (1), including:
a query section that uses information acquired by the first acquiring section to put a query to a server including a storage unit that accumulates information accumulated in association with control related to secondary use of the frequency band; and
a receiver that receives, from the server, information corresponding to the identification information and the information related to the region reported from the notifying section in the accumulated information, in which
the generator generates the information related to the secondary use on the basis of the corresponding information, the identification information, and the information related to the region.

(4)

The information processing apparatus according to (1), in which
types of the information related to the secondary use that are identifiable by the identification information include available-frequency information indicating a frequency of which secondary use is possible in a region indicated by the information related to the region, and
in a case where the available-frequency information is designated by the identification information, the generator generates the available-frequency information in the region as the information related to the secondary use.

(5)

The information processing apparatus according to (4), in which
the second acquiring section acquires one or more pieces of available-frequency information provided to the one or more second wireless systems installed in a region indicated by the information related to the region, and
the generator extracts available-frequency information common to the one or more pieces of available-frequency information to generate the information related to the secondary use.

(6)

The information processing apparatus according to (1), in which
types of the information related to the secondary use that are identifiable by the identification information include information about a maximum allowable transmission power range at a frequency of which secondary use is possible in a region indicated by the information related to the region, and
in a case where the information about the maximum allowable transmission power range is designated by the identification information, the generator generates, as the information related to the secondary use, the information about the maximum allowable transmission power range at the frequency of which secondary use is possible in the region indicated by the information related to the region.

(7)

The information processing apparatus according to (6), in which
the second acquiring section acquires information about maximum allowable transmission power associated with one or more pieces of available-frequency information and the frequency of which secondary use is possible, the one or more pieces of available-frequency information provided to the one or more second wireless systems installed in the region indicated by the information related to the region, and
the generator generates the information about the maximum allowable transmission power range on the basis of information about maximum allowable transmission power associated with available-frequency information common to the one or more pieces of available-frequency information.

(8)

The information processing apparatus according to (6), in which the generator generates, as the information about the maximum allowable transmission power range at the frequency of which secondary use is possible, information about a range whose minimum value and maximum value are respectively maximum allowable transmission power at the frequency of which the secondary use is possible at a point nearest an interference protection point in the region indicated by the information related to the region and maximum allowable transmission power at the frequency of which the secondary use is possible at a point farthest from the interference protection point in the region indicated by the information related to the region.

(9)

The information processing apparatus according to (1), in which
the information related to the secondary use that is identifiable by the identification information includes information about a recommended frequency that is a frequency recommended to be used in a case where secondary use of the frequency band is made in a region indicated by the information related to the region, and in a case where the information about the recommended frequency is designated by the identification information, the generator generates, as the information related to the secondary use, information about the recommended frequency in the region indicated by the information related to the region.

(10)

The information processing apparatus according to (9), in which the second acquiring section acquires one or more pieces of available-frequency information provided to the one or more second wireless system installed in the region indicated by the information related to the region, and one or more pieces of used-frequency information of which secondary use is being made by the one or more second wireless systems, and the generator generates the information about the recommended frequency in the region indicated by the information related to the region on a basis of the one or more pieces of available-frequency information and the one or more pieces of used-frequency information.

(11)

The information processing apparatus according to (10), in which the generator generates, as the information about the recommended frequency, a set of frequencies excluding a frequency indicated by the one or more pieces of used-frequency information from available frequencies common to the one or more pieces of available-frequency information.

(12)

The information processing apparatus according to (1), in which the information related to the secondary use that is identifiable by the identification information includes information about a recommended transmission power range associated with a recommended frequency that is a frequency recommended to be used in a case where secondary use of the frequency band is made in a region indicated by the information related to the region, and in a case where the information about the recommended transmission power range is designated by the identification information, the generator generates, as the information related to the secondary use, information about the recommended transmission power range at the recommended frequency of which secondary use is recommended in the region indicated by the information related to the region.

(13)

The information processing apparatus according to (12), in which the second acquiring section acquires one or more pieces of available-frequency information provided to the one or more second wireless systems installed in the region indicated by the information related to the region and one or more pieces of used-frequency information of which secondary use is being made by the one or more second wireless systems, and the generator generates the information about the recommended transmission power range in the region indicated by the information related to the region on a basis of the one or more pieces of available-frequency information and the one or more pieces of used-frequency information.

(14)

The information processing apparatus according to (12), in which the generator acquires, as the information about the recommended transmission power range at the recommended frequency, information about a range whose minimum value and maximum value are respectively allowable transmission power at the recommended frequency at a point nearest an interference protection point in the region indicated by the information related to the region and allowable transmission power at the recommended frequency at a point farthest from the interference protection point in the region indicated by the information related to the region.

(15)

The information processing apparatus according to (1), in which the information related to the secondary use that is identifiable by the identification information includes information about a use prohibited frequency that is a frequency of which secondary use is not possible in a region indicated by the information related to the region, and in a case where the information about the use prohibited frequency is designated by the identification information, the generator generates the information about the use prohibited frequency as the information related to the secondary use in the region indicated by the information related to the region.

(16)

The information processing apparatus according to (1), in which the information related to the secondary use that is identifiable by the identification information includes information about a recommended installation position that is a position recommended for installation in a case where a communication apparatus that makes secondary use of the frequency band is to be installed in a region indicated by the information related to the region, and in a case where the information about the recommended installation position is designated by the identification information, the generator generates the information about the recommended installation position as the information related to the secondary use in the region indicated by the information related to the region.

(17)

The information processing apparatus according to (16), in which the generator separates the region indicated by the information related o the region into grids, determines whether or not each of the grids is a recommended position for installation, and acquires, as the information about the recommended installation position, a set of positions determined to be recommended.

(18)

An information processing method including:

acquiring identification information and information related to a region, the identification information being for identifying information related to secondary use of a frequency band used by a first wireless system;

generating the information related to the secondary use on the basis of the identification information and the information related to the region; and transmitting the generated information related to the secondary use.

(19)

An information processing program that causes a computer to function as:
  a first acquiring section that acquires identification information and information related to a region, the identification information being for identifying a type of information related to secondary use of a frequency band used by a first wireless system;
  a second acquiring section that acquires information accumulated in association with control related to secondary use of the frequency band by one or more second wireless systems that make secondary use of the frequency band;
  a generator that generates information related to secondary use of the frequency band on the basis of information acquired by the first acquiring section and the second acquiring section; and
  a notifying section that reports the information related to the secondary use generated by the generator.

(20)

An information processing apparatus including:
  an acquiring section that acquires designation information for designating an area or a space together with identification information for identifying a plurality of pieces of secondary use information related to secondary use of radio waves of a frequency band used by a first wireless system;
  a generator that generates designated secondary use information in a designated area or a designated space designated by the designation information, the designated secondary use information being a designated piece of secondary use information designated by the identification information from among the plurality of pieces of secondary use information; and
  a transmitter that transmits the generated designated secondary use information.

(21)

An information processing method including:
  acquiring designation information for designating an area or a space together with identification information for identifying a plurality of pieces of secondary use information related to secondary use of radio waves of a frequency band used by a first wireless system;
  generating designated secondary use information in a designated area or a designated space designated by the designation information, the designated secondary use information being a designated piece of secondary use information designated by the identification information from among the plurality of pieces of secondary use information; and
  transmitting the generated designated secondary use information.

(22)

An information processing program that causes a computer to function as:
  an acquiring section that acquires designation information for designating an area or a space together with identification information for identifying a plurality of pieces of secondary use information related to secondary use of radio waves of a frequency band used by a first wireless system;
  a generator that generates designated secondary use information in a designated area or a designated space designated by the designation information, the designated secondary use information being a designated piece of secondary use information designated by the identification information from among the plurality of pieces of secondary use information; and
  a transmitter that transmits the generated designated secondary use information.

(23)

An information processing terminal apparatus including:
  a transmitter that transmits identification information and information related to a region, the identification information being for identifying information related to secondary use of a frequency band used by a first wireless system;
  an acquiring section that acquires the information related to the secondary use generated on the basis of the identification information and the information related to the region; and
  an output section that outputs the information related to the secondary use acquired by the acquiring section.

(24)

An information processing method including:
  transmitting identification information and information related to a region, the identification information being for identifying information related to secondary use of a frequency band used by a first wireless system;
  acquiring the information related to the secondary use generated on the basis of the identification information and the information related to the region; and
  outputting the information related to the secondary use acquired by the acquiring section.

(25)

An information processing program that causes a computer to function as:
  a transmitter that transmits identification information and information related to a region, the identification information being for identifying information related to secondary use of a frequency band used by a first wireless system;
  an acquiring section that acquires the information related to the secondary use generated on the basis of the identification information and the information related to the region; and
  an output section that outputs the information related to the secondary use acquired by the acquiring section.

(26)

A terminal apparatus including:
  an information transmitter that transmits predetermined designation information together with predetermined identification information to an information processing apparatus including an acquiring section and a generator, the acquiring section that acquires designation information designating an area or a space together with identification information for identifying a plurality of pieces of secondary use information related to secondary use of radio waves of a frequency band used by a first wireless system, and the generator that generates a designated piece of secondary use information in a designated area or a designated space designated by the identification information, the designated piece of secondary use information designated by the identification information from among the plurality of pieces of secondary use information;
  an information acquiring section that acquires, from the information processing apparatus, predetermined secondary use information related to a designated area or a designated space designated by the predetermined designation information, the predetermined secondary use information being predetermined secondary use information designated by the predetermined identification information; and an information output section that outputs the predetermined secondary use information.

(27) An information processing method including:

transmitting predetermined designation information together with predetermined identification information to an information processing apparatus including an acquiring section and a generator, the acquiring section that acquires designation information designating an area or a space together with identification information for identifying a plurality of pieces of secondary use information related to secondary use of radio waves of a frequency band used by a first wireless system, and the generator that generates a designated piece of secondary use information in a designated area or a designated space designated by the identification information, the designated piece of secondary use information designated by the identification information from among the plurality of pieces of secondary use information;

acquiring, from the information processing apparatus, predetermined secondary use information related to a designated area or a designated space designated by the predetermined designation information, the predetermined secondary use information being predetermined secondary use information designated by the predetermined identification information; and outputting the predetermined secondary use information.

(28) An information processing program that causes a computer to function as:

an information transmitter that transmits predetermined designation information together with predetermined identification information to an information processing apparatus including an acquiring section and a generator, the acquiring section that acquires designation information designating an area or a space together with identification information for identifying a plurality of pieces of secondary use information related to secondary use of radio waves of a frequency band used by a first wireless system, and the generator that generates a designated piece of secondary use information in a designated area or a designated space designated by the identification information, the designated piece of secondary use information designated by the identification information from among the plurality of pieces of secondary use information;

an information acquiring section that acquires, from the information processing apparatus, predetermined secondary use information related to a designated area or a designated space designated by the predetermined designation information, the predetermined secondary use information being predetermined secondary use information designated by the predetermined identification information; and an information output section that outputs the predetermined secondary use information.

REFERENCE SIGNS LIST

1, 2: communication system
10: wireless communication apparatus
20: base station apparatus
30: terminal apparatus
40: communication control apparatus
50: proxy apparatus
60: server apparatus
70: external apparatus
21, 31, 41, 51, 61: wireless communication unit
22, 32, 42, 52, 62, 72: storage unit
23, 43, 53, 63: network communication unit
33, 73: input-output unit
24, 34, 44, 54, 64, 74: control unit
71: communication unit
211, 311: receiving processor
212, 312: transmitting processor
441, 541, 641: acquiring section
442, 542, 642: generator
443, 543, 643: transmitter
444: communication control section
741: information transmitter
742: information acquiring section
743: information output section

The invention claimed is:

1. An information processing apparatus comprising:

a first acquiring circuit that acquires identification information and information related to a region, the identification information being for identifying a type of information related to a secondary use of a frequency band used by a first wireless system;

a second acquiring circuit that acquires information accumulated in association with control related to the secondary use of the frequency band by one or more second wireless systems that make secondary use of the frequency band;

a generation circuit that generates information related to the secondary use of the frequency band on a basis of information acquired by the first acquiring circuit and the second acquiring circuit; and a notifying circuit that reports the information related to the secondary use of the frequency band that is generated by the generation circuit, wherein types of the information related to the secondary use that are identifiable by the identification information include transmission power range information, and wherein the generation circuit generates, as the information related to the secondary use, the transmission power range information at a frequency of which secondary use is possible in the region indicated by the information related to the region, wherein the types of the information related to the secondary use that are identifiable by the identification information include information about a maximum allowable transmission power range at the frequency of which secondary use is possible in a region indicated by the information related to the region, wherein, in a case where the information about the maximum allowable transmission power range is designated by the identification information, the generation circuit generates, as the information related to the secondary use, the information about the maximum allowable transmission power range at the frequency of which secondary use is possible in the region indicated by the information related to the region, and wherein the generation circuit generates, as the information about the maximum allowable transmission power range at the frequency of which secondary use is possible, information about a range whose minimum value and maximum value are respectively a maximum allowable transmission power at the frequency of which the secondary use is possible at a point nearest an interference protection point in the region indicated by the information related to the region and a maximum allowable transmission power at the frequency of which the secondary use is possible at a point farthest from the interference protection point in the region indicated by the information related to the region.

2. The information processing apparatus according to claim 1, further comprising:
a control circuit that performs control related to the secondary use of the frequency band by the one or more second wireless systems that make secondary use of the frequency band used by the first wireless system; and
a memory that accumulates at least information to be used by the control circuit and information to be outputted from the control circuit, wherein
the second acquiring circuit acquires the accumulated information from the memory, and
the generation circuit extracts information corresponding to the identification information and the information related to the region acquired by the first acquiring circuit from the information acquired by the second acquiring circuit, and generates the information related to the secondary use on a basis of the corresponding information.

3. The information processing apparatus according to claim 1, further comprising:
a query circuit that uses information acquired by the first acquiring circuit to put a query to a server including a memory that accumulates information accumulated in association with control related to the secondary use of the frequency band; and
a receiver that receives, from the server, information corresponding to the identification information and the information related to the region reported from the notifying circuit in the accumulated information, wherein
the generation circuit generates the information related to the secondary use on a basis of the corresponding information, the identification information, and the information related to the region.

4. The information processing apparatus according to claim 1, wherein
the types of the information related to the secondary use that are identifiable by the identification information further include available-frequency information indicating the frequency of which secondary use is possible in a region indicated by the information related to the region, and
in a case where the available-frequency information is designated by the identification information, the generation circuit generates the available-frequency information in the region as the information related to the secondary use.

5. The information processing apparatus according to claim 4, wherein
the second acquiring circuit acquires one or more pieces of available-frequency information provided to the one or more second wireless systems installed in a region indicated by the information related to the region, and
the generation circuit extracts available-frequency information common to the one or more pieces of available-frequency information to generate the information related to the secondary use.

6. The information processing apparatus according to claim 1, wherein
the second acquiring circuit acquires information about a maximum allowable transmission power associated with one or more pieces of available-frequency information and the frequency of which secondary use is possible, the one or more pieces of available-frequency information provided to the one or more second wireless systems installed in the region indicated by the information related to the region, and
the generation circuit generates the information about the maximum allowable transmission power range on a basis of information about a maximum allowable transmission power associated with available-frequency information common to the one or more pieces of available-frequency information.

7. The information processing apparatus according to claim 1, wherein
the information related to the secondary use that is identifiable by the identification information further includes information about a recommended frequency that is a frequency recommended to be used in a case where secondary use of the frequency band is made in a region indicated by the information related to the region, and
in a case where the information about the recommended frequency is designated by the identification information, the generation circuit generates, as the information related to the secondary use, information about the recommended frequency in the region indicated by the information related to the region.

8. The information processing apparatus according to claim 7, wherein
the second acquiring circuit acquires one or more pieces of available-frequency information provided to the one or more second wireless system installed in the region indicated by the information related to the region, and one or more pieces of used-frequency information of which secondary use is being made by the one or more second wireless systems, and
the generation circuit generates the information about the recommended frequency in the region indicated by the information related to the region on a basis of the one or more pieces of available-frequency information and the one or more pieces of used-frequency information.

9. The information processing apparatus according to claim 8, wherein the generation circuit generates, as the information about the recommended frequency, a set of frequencies excluding a frequency indicated by the one or more pieces of used-frequency information from available frequencies common to the one or more pieces of available-frequency information.

10. The information processing apparatus according to claim 1, wherein
the second acquiring circuit acquires one or more pieces of available-frequency information provided to the one or more second wireless systems installed in the region indicated by the information related to the region and one or more pieces of used-frequency information of which secondary use is being made by the one or more second wireless systems, and
the generation circuit generates the information about the recommended transmission power range in the region indicated by the information related to the region on a basis of the one or more pieces of available-frequency information and the one or more pieces of used-frequency information.

11. An information processing apparatus comprising:
a first acquiring circuit that acquires identification information and information related to a region, the identification information being for identifying a type of information related to a secondary use of a frequency band used by a first wireless system;

a second acquiring circuit that acquires information accumulated in association with control related to the secondary use of the frequency band by one or more second wireless systems that make secondary use of the frequency band;

a generation circuit that generates information related to the secondary use of the frequency band on a basis of information acquired by the first acquiring circuit and the second acquiring circuit; and a notifying circuit that reports the information related to the secondary use of the frequency band that is generated by the generation circuit, wherein types of the information related to the secondary use that are identifiable by the identification information include transmission power range information, and wherein the generation circuit generates, as the information related to the secondary use, the transmission power range information at a frequency of which secondary use is possible in the region indicated by the information related to the region, wherein the frequency of which secondary use is possible in the region indicated by the information related to the region is a recommended frequency, wherein the information related to the secondary use that is identifiable by the identification information includes information about a recommended transmission power range associated with the recommended frequency that is a frequency recommended to be used in a case where secondary use of the frequency band is made in a region indicated by the information related to the region, wherein, in a case where the information about the recommended transmission power range is designated by the identification information, the generation circuit generates, as the information related to the secondary use, the information about the recommended transmission power range at the recommended frequency of which secondary use is recommended in the region indicated by the information related to the region, and wherein the generation circuit acquires, as the information about the recommended transmission power range at the recommended frequency, information about a range whose minimum value and maximum value are respectively allowable transmission power at the recommended frequency at a point nearest an interference protection point in the region indicated by the information related to the region and allowable transmission power at the recommended frequency at a point farthest from the interference protection point in the region indicated by the information related to the region.

12. The information processing apparatus according to claim 1, wherein the information related to the secondary use that is identifiable by the identification information further includes information about a use prohibited frequency that is a frequency of which secondary use is not possible in a region indicated by the information related to the region, and in a case where the information about the use prohibited frequency is designated by the identification information, the generation circuit generates the information about the use prohibited frequency as the information related to the secondary use in the region indicated by the information related to the region.

13. The information processing apparatus according to claim 1, wherein the information related to the secondary use that is identifiable by the identification information further includes information about a recommended installation position that is a position recommended for installation in a case where a communication apparatus that makes secondary use of the frequency band is to be installed in a region indicated by the information related to the region, and in a case where the information about the recommended installation position is designated by the identification information, the generation circuit generates the information about the recommended installation position as the information related to the secondary use in the region indicated by the information related to the region.

14. The information processing apparatus according to claim 13, wherein the generation circuit separates the region indicated by the information related to the region into grids, determines whether or not each of the grids is a recommended position for installation, and acquires, as the information about the recommended installation position, a set of positions determined to be recommended.

15. An information processing method performed by a wireless communication device, the method comprising:

acquiring identification information and information related to a region, the identification information being for identifying information related to a secondary use of a frequency band used by a first wireless system;

acquiring information accumulated in association with control related to the secondary use of the frequency band by one or more second wireless systems that make secondary use of the frequency band generating the information related to the secondary use of the frequency band on a basis of the identification information and the information related to the region and the information accumulated in association with control related to the secondary use of the frequency band; and transmitting the generated information related to the secondary use, wherein types of the information related to the secondary use that are identifiable by the identification information include transmission power range information, and wherein the method further comprises generating, as the information related to the secondary use, the transmission power range information, wherein the types of the information related to the secondary use that are identifiable by the identification information include information about a maximum allowable transmission power range at the frequency of which secondary use is possible in a region indicated by the information related to the region, wherein, in a case where the information about the maximum allowable transmission power range is designated by the identification information, the generating comprise generating, as the information related to the secondary use, the information about the maximum allowable transmission power range at the frequency of which secondary use is possible in the region indicated by the information related to the region, and wherein the generating comprises generating, as the information about the maximum allowable transmission power range at the frequency of which secondary use is possible, information about a range whose minimum value and maximum value are respectively a maximum allowable transmission power at the frequency of which the secondary use is possible at a point nearest an interference protection point in the region indicated by the information related to the region and a maximum allowable transmission power at the frequency of which the secondary use is possible at a point farthest from the interference protection point in the region indicated by the information related to the region.

16. An information processing method performed by a wireless communication device, the method comprising:
acquiring identification information and information related to a region, the identification information being for identifying information related to a secondary use of a frequency band used by a first wireless system;
acquiring information accumulated in association with control related to the secondary use of the frequency band by one or more second wireless systems that make secondary use of the frequency band
generating the information related to the secondary use of the frequency band on a basis of the identification information and the information related to the region and the information accumulated in association with control related to the secondary use of the frequency band; and
transmitting the generated information related to the secondary use,
wherein types of the information related to the secondary use that are identifiable by the identification information include transmission power range information, and
wherein the method further comprises generating, as the information related to the secondary use, the transmission power range information,
wherein the frequency of which secondary use is possible in the region indicated by the information related to the region is a recommended frequency,
wherein the information related to the secondary use that is identifiable by the identification information includes information about a recommended transmission power range associated with the recommended frequency that is a frequency recommended to be used in a case where secondary use of the frequency band is made in a region indicated by the information related to the region,
wherein, in a case where the information about the recommended transmission power range is designated by the identification information, the generating comprises generating, as the information related to the secondary use, the information about the recommended transmission power range at the recommended frequency of which secondary use is recommended in the region indicated by the information related to the region, and
wherein the method further comprises acquiring, as the information about the recommended transmission power range at the recommended frequency, information about a range whose minimum value and maximum value are respectively allowable transmission power at the recommended frequency at a point nearest an interference protection point in the region indicated by the information related to the region and allowable transmission power at the recommended frequency at a point farthest from the interference protection point in the region indicated by the information related to the region.

* * * * *